US012381356B2

(12) United States Patent
Sugiki et al.

(10) Patent No.: US 12,381,356 B2
(45) Date of Patent: Aug. 5, 2025

(54) CONNECTOR SET

(71) Applicant: IRISO ELECTRONICS CO., LTD., Yokohama (JP)

(72) Inventors: Toshiaki Sugiki, Yokohama (JP); Nagisa Asai, Yokohama (JP); Katsumasa Sato, Yokohama (JP)

(73) Assignee: IRISO ELECTRONICS CO., LTD., Yokohama (JP)

( * ) Notice: Subject to any disclaimer, the term of this patent is extended or adjusted under 35 U.S.C. 154(b) by 370 days.

(21) Appl. No.: 17/961,632

(22) Filed: Oct. 7, 2022

(65) Prior Publication Data

US 2023/0115234 A1 Apr. 13, 2023

(30) Foreign Application Priority Data

Oct. 12, 2021 (JP) ................................ 2021-167700

(51) Int. Cl.

| | |
|---|---|
| ***H01R 13/631*** | (2006.01) |
| ***H01R 13/11*** | (2006.01) |
| ***H01R 13/24*** | (2006.01) |
| ***H01R 13/40*** | (2006.01) |
| ***H01R 13/502*** | (2006.01) |

(52) U.S. Cl.

CPC ......... *H01R 13/6315* (2013.01); *H01R 13/11* (2013.01); *H01R 13/2407* (2013.01); *H01R 13/40* (2013.01); *H01R 13/502* (2013.01)

(58) Field of Classification Search

CPC .......................... H01R 13/6315; H01R 13/11; H01R 13/2407; H01R 13/40; H01R 13/502; H01R 31/06; H01R 12/57; H01R 12/91; H01R 13/2492; H01R 13/74; H01R 12/724; H01R 13/629; H01R 24/60; H01R 2107/00; H01R 2201/26

See application file for complete search history.

(56) References Cited

U.S. PATENT DOCUMENTS

| | | | | |
|---|---|---|---|---|
| 5,562,461 | A | 10/1996 | Obara et al. | |
| 6,824,419 | B1 * | 11/2004 | Wu ................... | H01R 13/6315 439/378 |
| 10,454,202 | B2 | 10/2019 | Shimoji | |

(Continued)

FOREIGN PATENT DOCUMENTS

| | | |
|---|---|---|
| JP | S6356583 U | 4/1988 |
| JP | H07211402 A | 8/1995 |

(Continued)

OTHER PUBLICATIONS

Extended European Search Report, for European Patent Application No. 22200818.7, dated Feb. 24, 2023, 8 pages.

(Continued)

*Primary Examiner* — Abdullah A Riyami
*Assistant Examiner* — Nader J Alhawamdeh
(74) *Attorney, Agent, or Firm* — Westman, Champlin & Koehler, P.A.

(57) ABSTRACT

A connector set includes a right angle type inner connector and a relay connector. First external-side contact portions and second external-side contact portions are disposed at different positions in a substrate perpendicular direction. However, first inner-side contact portions and second inner-side contact portions are disposed at the same position in the substrate perpendicular direction.

6 Claims, 35 Drawing Sheets

(56) References Cited

U.S. PATENT DOCUMENTS

| | | | | |
|---|---|---|---|---|
| 10,498,082 | B2 | 12/2019 | Suzuki et al. | |
| 10,594,080 | B2 | 3/2020 | Sugiki et al. | |
| 2003/0017728 | A1* | 1/2003 | Ogawa | H01R 31/06 439/79 |
| 2010/0009570 | A1 | 1/2010 | Abramov | |
| 2010/0075536 | A1 | 3/2010 | Kubo | |
| 2016/0294111 | A1* | 10/2016 | Kobayashi | H01R 12/91 |
| 2016/0308311 | A1* | 10/2016 | Hori | H01R 12/91 |
| 2017/0214161 | A1* | 7/2017 | Yamada | H01R 12/7005 |
| 2018/0351297 | A1 | 12/2018 | Suzuki et al. | |
| 2019/0109396 | A1* | 4/2019 | Shimba | H01R 13/112 |
| 2019/0148884 | A1* | 5/2019 | Sugiki | H01R 12/91 439/247 |
| 2019/0229455 | A1 | 7/2019 | Shimoji | |
| 2023/0110901 | A1* | 4/2023 | Sugiki | H01R 13/502 439/382 |
| 2023/0115234 | A1* | 4/2023 | Sugiki | H01R 13/11 439/247 |

FOREIGN PATENT DOCUMENTS

| | | | |
|---|---|---|---|
| JP | H0992413 | A | 4/1997 |
| JP | 2012177665 | A | 9/2012 |
| JP | 2018206623 | A | 12/2018 |
| JP | 2019091649 | A | 6/2019 |
| JP | 2019129084 | A | 8/2019 |
| WO | 2008000931 | A1 | 1/2008 |

OTHER PUBLICATIONS

Translation of Japanese Office Action for Japanese Application No. 2021-167700, dated Apr. 18, 2025, 6 pages.

* cited by examiner

CONNECTOR SET

CROSS-REFERENCE TO RELATED APPLICATION

This application claims priority under 35 USC 119 from Japanese Patent application No. 2021-167700 filed on Oct. 12, 2021, the disclosure of which is incorporated by reference herein in its entirety.

BACKGROUND

Technical Field

The present disclosure is related to a connector, a manufacturing method thereof, a counterpart connector, and a connector set.

Background Art

In a floating connector described in Patent Document 1, a terminal includes a displacing portion that displaces together with a movable housing. The displacing portion includes a one-side contact portion to contact a connection target from one side, an other-side contact portion to contact the connection target from another side, and a coupling portion to couple the one-side contact portion and the other-side contact portion together into a single body.

A configuration is accordingly achieved in which the movable housing is not directly pressed by the connection target, suppressing a creep phenomenon from occurring in the movable housing.

Movable housings of right angle floating connectors described in Patent Documents 2 and 3 include leg portions that project out downward.

Excessive downward displacement of the movable housing is accordingly limited by the leg portions abutting a substrate or a fixed housing, which are members on a fixed-side.

A connector described in Patent Document 3 includes a housing and a terminal press-fitted into the housing in a specific press-fit direction and retained thereby. The terminal includes a press-fit portion formed to an extending portion that extends along the press-fit direction, a displacing portion displaceable with respect to the press-fit portion, and an intermediate portion disposed between the extending portion and the displacing portion. The intermediate portion also includes plural bent portions that are bent in a plate thickness direction.

Displacement of the displacing portion is accordingly permitted by the intermediate portion deforming.

A connector set described in Patent Document 4 includes a right angle type inner connector mounted to an inner substrate disposed inside a case, and a relay connector that is installed at an opening of the case and that relays between the inner connector and a connection target (an external connection target) external to the case.

This enables connection of the inner substrate, which is disposed perpendicularly to a wall in which the opening is formed, and the external connection target to be realized across the case opening.

PRIOR ART LITERATURE

Patent Documents

Patent Document 1: Japanese Patent Application Laid-Open (JP-A) No. 2018-206623.
Patent Document 2: JP-A No. 2019-091649
Patent Document 3: JP-A No. 2019-129084
Patent Document 4: JP-A No. 2012-177665

SUMMARY OF INVENTION

Technical Problem

In cases in which a floating connector such as the one described in Patent Document 1 is, for example, employed in a vibration environment such as in a car or the like, the displacing portion will sometimes vibrate vigorously together with the connection target when a frequency of the vibration matches a resonance frequency of the floating connector in a state connected to the connection target (hereafter referred to simply as the connector resonance frequency), and this will sometimes cause abrasion of contact portions. Recently there have accordingly been demands to raise the resonance frequencies for connectors.

In response thereto an object of a first aspect of the present disclosure is, for a floating connector, to raise the resonance frequency of the connector while also suppressing a creep phenomenon from occurring in a movable housing thereof.

Moreover, a general issue with connectors is that when an electrical device featuring connectors is changed, the dimensions of a connection target the changed connector is going to be connected to, and the properties demanded of the changed connector, also normally change. This means that there is a need to design and manufacture the connector from a zero-base start so as to accommodate the number of variations in dimension of the connection target and in the specification demanded.

Thus an object of a second aspect of the present disclosure is to facilitate variation evolution for connectors.

The present inventors have considered the importance of raising the connector resonance frequency for right angle floating connectors such as those described in Patent Document 2, 3.

To address this, an object of a third aspect of the present disclosure is, for a right angle floating connector, to raise the resonance frequency while limiting excessive downward displacement of a movable housing.

There is also an issue with the connector described in Patent Document 3 in that stress readily concentrates at a bent portion, configuring an intermediate portion, when the displacing portion displaces and the intermediate portion has deformed.

Thus an object of a fourth aspect of the present disclosure is, for a connector with a terminal that includes an intermediate portion including one or more bent portions, to suppress stress from concentrating at a bent portion.

In the connector set described in Patent Document 4, in order to match a structure of an external connection target, consideration might be given to a configuration in which a relay connector includes a first relay terminal and a second relay terminal disposed at different positions in a substrate perpendicular direction (a direction perpendicular to an inner substrate). However, in such cases this generates a need to provide an inner connector with a first inner terminal and a second inner terminal that respectively contact the first relay terminal and the second relay terminal and that have different shapes from each other, with this resulting in an increase in the design cost of the inner connector.

Thus an object of a fifth aspect of the present disclosure is, for a connector set including an inner connector and a relay connector, to lower the design cost of the inner connector.

Solution

Although directional concepts such as up and down directions are employed in the following description of a connector and the like of the present disclosure, these directional concepts are directional concepts with reference to the connector and the like, and do not limit the placement direction or the installation orientation when using the connector and the like.

First Aspect

A connector according to a first aspect-mode-one is a connector mountable to a mounting target, the connector including: a terminal; a movable housing capable of displacing with respect to the mounting target; and an add member formed as a separate body from the terminal and retained in the movable housing, wherein: the terminal includes a displacing portion retained in the movable housing and displacing together with the movable housing; the displacing portion includes a one-side contact portion for contacting a connection target from a one-side; and the add member includes an other-side contact portion for contacting the connection target from an other-side.

In the present aspect-mode, the connector includes the terminal and the movable housing capable of displacing with respect to the mounting target. The terminal includes the displacing portion. The displacing portion is retained in the movable housing and displaces together with the movable housing. The displacing portion includes the one-side contact portion for contacting the connection target from the one-side.

Moreover, the connector includes the add member formed as a separate body from the terminal and retained in the movable housing. The add member includes the other-side contact portion for contacting the connection target from the other-side. A configuration is accordingly achieved in which the movable housing is not directly pressed by the connection target, suppressing a creep phenomenon from occurring in the movable housing.

Moreover, the add member is formed as a separate body from the terminal and so there is no need for a coupling portion to couple the one-side contact portion and the other-side contact portion together into a single body, enabling the movable portions of the inner connector to be made lighter in weight by a corresponding amount. The resonance frequency of the connector can accordingly be raised as a result thereof.

The present aspect-mode accordingly enables, in a floating connector, the resonance frequency of the connector to be raised while suppressing a creep phenomenon from occurring in the movable housing.

Note that although in exemplary embodiments described later an example is described in which the connector includes a fixed housing, the connector of the present aspect-mode is not limited thereto.

Moreover, although in exemplary embodiments described later the terminal includes an intermediate deforming portion, the terminal of the present aspect-mode is not limited thereto. Even if the terminal does not include the intermediate deforming portion, a displacing portion displacing together with the movable housing can still be implemented.

A connector according to a first aspect-mode-two is the first aspect-mode-one wherein the add member does not include a portion connecting to the mounting target or a portion between this portion and the other-side contact portion.

In the present aspect-mode, the add member does not include a portion connecting to the mounting target or a portion between this portion and the other-side contact portion. There is accordingly no need to provide the add member with this portion or the portion between this portion and the other-side contact portion, and so the connector can be made more compact compared to an embodiment in which the add member includes these portions.

A connector according to a first aspect-mode-three is the first aspect-mode-one or the first aspect-mode-two wherein the add member does not include a structure for electrically connecting to the terminal.

In the present aspect-mode, the add member does not include a structure for electrically connecting to the terminal, enabling the connector to be made more compact and lighter in weight than an embodiment including such a structure.

A connector according to a first aspect-mode-four is any one of the first aspect-mode-one to the first aspect-mode-three wherein the add member is configured by a material having a lighter specific weight than the terminal.

In the present aspect-mode, the add member is configured by the material having a lighter specific weight than the terminal, enabling the movable portions of the connector to be made lighter in weight.

A connector according to a first aspect-mode-five is any one of the first aspect-mode-one to the first aspect-mode-four wherein the add member is configured from a stainless steel, an aluminum alloy, a titanium alloy, or a nickel alloy.

In the present aspect-mode, the add member is configured from a stainless steel, an aluminum alloy, a titanium alloy, or a nickel alloy, a surface of the add member is accordingly protected by a passive film and does not readily corrode even without performing significant plating processing on the add member or even without performing any plating processing thereon. This accordingly enables the connector to be manufactured cheaply.

A connector according to a first aspect-mode-six is any one of the first aspect-mode-one to the first aspect-mode-five, wherein in the movable housing a portion where the add member is retained and a portion where the displacing portion is retained are formed as a single body.

However, a configuration might also be considered in which the movable housing was configured by two or more members formed as separate bodies to each other and including a member to retain the add member and a separate member to retain the displacing portion. However, the structure of the movable housing becomes complicated in such a configuration.

In the present aspect-mode, in the movable housing the portion to retain the add member and the portion to retain the displacing portion are molded as a single body, enabling the structure of the movable housing to be simplified.

A connector according to a first aspect-mode-seven is any one of the first aspect-mode-one to the first aspect-mode-six, wherein: the one-side contact portion includes a first contact tab for contacting the connection target and a second contact tab for contacting the connection target further toward a connection direction far side than the first contact tab; a displacement amount of a contact point of the first contact tab when the connection target has been connected is configured so as to be greater than a displacement amount of a contact point of the second contact tab; and the second contact tab contact point is not covered or obscured by any member including the first contact tab and the add member when the connector is viewed from the connection direction far side.

In the present aspect-mode, the one-side contact portion includes the first contact tab for contacting the connection target and the second contact tab for contacting the connection target further toward a connection direction far side than the first contact tab. This means that removal of foreign matter adhered to the connection target is performed by the first contact tab, enabling the second contact tab to be brought into contact with the portion of the connection target from which foreign matter has been removed.

Furthermore, the displacement amount (for example, a displacement amount in a direction perpendicular to the connection direction) of the contact point of the first contact tab when the connection target has been connected is configured so as to be greater than the displacement amount of the contact point of the second contact tab. This means that the contact pressure of the first contact tab against the connection target is higher, raising an ability to abrade and remove foreign matter (a so-called wiping ability).

However, in the configuration described above, the contact point of the second contact tab is covered by the first contact tab when viewed from the connection direction near side, with the inconvenience that inspection of the height of the second contact tab contact point becomes difficult.

Thus in the present aspect-mode, the contact point of the second contact tab is not covered or obscured by any member including the first contact tab and the add member when the connector is viewed from the connection direction far side. Thus the height of the contact point of the second contact tab can be inspected by inspecting the connector from the connection direction far side.

A connector according to a first aspect-mode-eight is any one of the first aspect-mode-one to the first aspect-mode-seven, wherein a contact metal layer is formed at the one-side contact portion.

In the present aspect-mode, the contact metal layer is formed at the one-side contact portion. Thus by forming an appropriate contact metal layer the connection reliability can be raised between the one-side contact portion and the connection target.

However, suppose the terminal and the add member were to be formed as a single body, then the add member would be in the way when forming the contact metal layer on the one-side contact portion, making it difficult to adhere the plating solution to appropriate positions.

However, in the present aspect-mode, the terminal and the add member are separate bodies, and so the add member is not in the way when forming the contact metal layer on the one-side contact portion, facilitating adhering the plating solution to appropriate positions. As a result thereof, a usage amount of metal (for example, gold, palladium, silver, tin) contained in the contact metal layer can be suppressed, enabling the connector to be manufactured cheaply.

A connector according to a first aspect-mode-nine is the first aspect-mode-eight, wherein the contact metal layer includes a precious metal.

In the present aspect-mode, the contact metal layer includes a precious metal, and so there is a large effect in reducing cost by suppressing the usage amount of metal contained in the contact metal layer.

A connector according to a first aspect-mode-ten is the first aspect-mode-eight wherein the contact metal layer includes tin or a tin alloy, and tin or a tin alloy is not adhered to the add member at a portion retained in the movable housing.

In the present aspect-mode, the contact metal layer contains tin or a tin alloy. The tin or the tin alloy is not adhered to the add member at the portion retained in the movable housing. This prevents whisker generation.

Suppose that the terminal and the add member were to be formed as a single body, then there would be a possibility that plating solution adheres to the add member when forming the contact metal layer on the one-side contact portion. However, due to the terminal and the add member being separate bodies, the plating solution is prevented from inadvertently adhering to the add member.

A connector according to a first aspect-mode-eleven is any one of the first aspect-mode-one to the first aspect-mode-seven, wherein a base metal of the add member is a stainless steel, the add member does not include a plating layer, and the add member is not electrically connected to the mounting target.

In the present aspect-mode, the base metal of the add member is a stainless steel and the add member does not include a plating layer. Stainless steel is not liable to corrode even without the trouble and cost incurred with plating, and is also moreover comparatively cheap.

Moreover, the add member is not electrically connected to the mounting target, and so such a structure can be omitted, enabling the connector to be made more compact.

Second Aspect

A connector according to a second aspect-mode-one is a connector including: a terminal including a terminal-side contact portion for contacting a connection target; an add member including an add-side contact portion for contacting the connection target; and a housing for retaining the terminal and the add member, wherein the add member is formed as a separate body from the terminal.

In the present aspect-mode, the connector includes the terminal including the terminal-side contact portion for contacting the connection target, the add member including the add-side contact portion for contacting the connection target, and the housing for retaining the terminal and the add member.

The add member is also formed as a separate body from the terminal. This is accordingly applicable to manufacturing connectors in plural variations.

Namely, the connector according to the present aspect-mode employs the terminal and the housing as common components across the connector variations, whereas in regard to the add member, an add member can be employed that has been designed for each of the connector variations. This accordingly enables the properties of the connector to be changed merely by changing the add member alone, from out of the terminal, the add member, and the housing configuring the connector. For example, the properties of the connector can be changed by changing the shape and friction coefficient of the add-side contact portion of the add member.

Thus the present aspect-mode described above enables variation evolution for connectors to be facilitated.

Note that although in the exemplary embodiments described later an example is described in which the terminal-side contact portion contacts the connection target from a one-side, and the add-side contact portion contacts the connection target from an other-side, the present aspect-mode is not limited thereto. For example, the terminal-side contact portion may contact the connection target from a first direction, and the add member may contact the connection target from a direction perpendicular to the first direction.

Moreover, although in the exemplary embodiments described later an example is described in which the above “housing” is a movable housing, the present aspect-mode is not limited thereto. For example, the connector may lack a movable housing, and the above “housing” may be a fixed housing.

A connector manufacturing method according to a second aspect-mode-two, is a method for manufacturing the connector according to the first aspect, wherein the add member is selected from out of plural types of pre-designed add member, and is retained in the housing.

In the present aspect-mode, the add member is selected from out of the plural types of pre-designed add member, and is retained in the housing.

Selecting an appropriate add member accordingly enables manufacture at low cost of a connector satisfying demanded requirements.

Note that the above “retained” includes both being retained by press-fitting and being retained by insert molding.

A connector manufacturing method according to a second aspect-mode-three is the second aspect-mode-two wherein: in the connector the terminal-side contact portion contacts the connection target from a one-side, the add-side contact portion contacts the connection target from an other-side, and the plural types of add member include two or more types of add member configured so as to have different opposing distances between the terminal-side contact portion and the add-side contact portion.

In the present aspect-mode, the terminal-side contact portion contacts the connection target from the one-side. Moreover, the add-side contact portion contacts the connection target from the other-side. The plural types of add member also include two or more types of add member configured so as to have different opposing distances between the terminal-side contact portion and the add-side contact portion.

Thus the opposing distance between the terminal-side contact portion and the add-side contact portion can be changed to an appropriate distance merely by selecting the add member.

A connector manufacturing method according to a second aspect-mode-four is the second aspect-mode-two or the second aspect-mode-three wherein the plural types of add member include two or more types of add member configured with different friction coefficients of the add-side contact portion.

In the present aspect-mode, the plural types of add member include the two or more types of add member configured with different friction coefficients of the add-side contact portion.

Thus the force required for connection of the connection target can be set to an appropriate force merely by selecting the add member.

A connector manufacturing method according to a second aspect-mode-five is any one of the second aspect-mode-two to the second aspect-mode-four wherein the plural types of add member include two or more types of add member that are configured so as to have the same opposing distance between the terminal-side contact portion and the add-side contact portion but to have different friction coefficients of the add-side contact portion.

In the present aspect-mode, the plural types of add member include two or more types of add member that are configured so as to that have the same opposing distance between the terminal-side contact portion and the add-side contact portion but to have different friction coefficients of the add-side contact portion.

This accordingly enables the number of variations of connectors to be increased without a greater number of variations in the shape of the add member.

Third Aspect

A connector according to a third aspect-mode-one is a connector mountable to an installation face of a mounting target and able to connect to a connection target with a direction along the installation face as a connection direction, wherein: the connector includes a fixed housing for fixing to the mounting target; a movable housing that is able to fit together with the connection target and is capable of displacing with respect to the mounting target; and a terminal including a connection portion for connection to the mounting target and a displacing portion that is retained in the movable housing and displaces together with the movable housing, wherein the fixed housing includes a displacement restricting portion provided at a position to abut with the connection target when the connection target has been displaced in a direction toward the installation face while in a state fitted together with the movable housing, or in a state partway through fitting together therewith.

In the present aspect-mode, the connector includes the fixed housing, the movable housing, and the terminal. The fixed housing is a housing fixed to the mounting target. The movable housing is a housing capable of displacing with respect to the mounting target and able to fit together with the connection target. The terminal includes the connection portion and the displacing portion. The connection portion is a portion for connecting to the mounting target. The displacing portion is a portion retained by the movable housing and displacing together with the movable housing.

The fixed housing includes the displacement restricting portion. The displacement restricting portion is provided at the position abutting the connection target when the connection target has been displaced in the direction toward the installation face while in a state fitted together with the movable housing, or in a state partway through fitting together therewith.

Excessive displacement of the movable housing can accordingly be suppressed as a result of displacement of the connection target being limited while in a fitted together state or in a state partway through fitting together.

Namely, excessive displacement is limited by providing the downward projecting leg portions to the movable housing in the technology of Patent Documents 2, 3, however in the present aspect-mode excessive displacement is limited by providing the fixed housing with the portion (displacement restricting portion) that abuts the connection target while in a fitted together state or in a state partway through fitting together.

Thus the present aspect-mode limits excessive displacement of the movable housing using the displacement restricting portion, so as to make the leg portions unnecessary or enable simplification of the leg portions, and to enable the movable portions of the connector to be made lighter in weight as a result. This accordingly enables, in a right angle floating connector, the resonance frequency to be raised while limiting excessive downward displacement of a movable housing.

A connector according to a third aspect-mode-two is the third aspect-mode-one wherein the fixed housing includes a through-pass space that is a space on the installation face side with respect to the space where the movable housing is disposed, and is a space through which the movable housing is able to pass.

In the present aspect-mode, the fixed housing includes the through-pass space that is a space on the installation face side (lower side) with respect to the space where the movable housing is disposed, and is a space through which the movable housing is able to pass.

This accordingly enables the movable housing to be assembled to the fixed housing from the lower side when manufacturing the connector.

A connector according to a third aspect-mode-three is the third aspect-mode-one or the third aspect-mode-two wherein the fixed housing includes an upward limiting portion for limiting a movement range of the movable housing in a direction away from the installation face.

In the present aspect-mode, the fixed housing includes the upward limiting portion. The upward limiting portion limits the movement range of the movable housing in the direction away from the installation face (i.e. the upward direction). There is accordingly no need to separately install the fixed housing with a member to function as the upward limiting portion.

The connector according to a third aspect-mode-four is any one of the third aspect-mode-one to the third aspect-mode-three wherein the terminal includes a fixed-side retained portion retained in the fixed housing, and the displacement restricting portion retains the fixed-side retained portion.

In the present aspect-mode, the terminal includes the fixed-side retained portion retained in the fixed housing, and the displacement restricting portion retains the fixed-side retained portion of the terminal.

The connector can accordingly be made more compact than an embodiment in which the displacement restricting portion is formed separately to a portion that retains the fixed-side retained portion of the terminal.

A connector according to a third aspect-mode-five is any one of the third aspect-mode-one to the third aspect-mode-four wherein the terminal includes an intermediate deforming portion disposed between the connection portion and the displacing portion and capable of deforming, and at least part of the intermediate deforming portion is positioned between the movable housing and the installation face in a direction perpendicular to the installation face.

In the present aspect-mode, the terminal includes the intermediate deforming portion disposed between the connection portion and the displacing portion and capable of deforming. At least part of the intermediate deforming portion is positioned between the movable housing and the installation face in a direction perpendicular to the installation face (height direction).

This accordingly enables a length to be secured for the intermediate deforming portion.

A counterpart connector according to a third aspect-mode-six is a counterpart connector serving as the connection target connectable to the connector according to any one of the third aspect-mode-one to the third aspect-mode-five, and includes: a counterpart housing and a counterpart terminal retained in the counterpart housing, wherein the counterpart housing includes an opposing lower face that opposes the displacement restricting portion in a direction perpendicular to the installation face while in a state fitted together with the movable housing or in a state partway through fitting together therewith, and includes a downward projecting portion projecting from the opposing lower face toward the installation face side, wherein the downward projecting portion is provided at a position to abut the displacement restricting portion when the counterpart connector has been displaced in a direction toward the installation face while in a state fitted together with the movable housing or in a state partway through fitting together therewith.

The counterpart connector according to the present aspect-mode includes the counterpart housing and the counterpart terminal that is retained in the counterpart housing.

The counterpart housing includes the opposing lower face that opposes the displacement restricting portion in a direction perpendicular to the installation face (in the up-down direction) while in a state fitted together with the movable housing or in a state partway through fitting together therewith.

Furthermore, the counterpart housing includes the downward projecting portion projecting from the opposing lower face toward the installation face side. The downward projecting portion is provided at a position to abut the displacement restricting portion when the counterpart connector has been displaced in a direction to approach the installation face while in a state fitted together with the movable housing or a state partway through fitting together therewith.

A maximum downward displacement amount of the counterpart connector is accordingly smaller by an amount by which the downward projecting portion projects. This thereby enables excessive downward displacement of the counterpart connector to be suppressed which also limiting an increase in mass of the counterpart housing of the counterpart connector.

A counterpart connector according to a third aspect-mode-seven is the third aspect-mode-six wherein the counterpart terminal includes a counterpart contact portion that projects from the counterpart housing and that contacts a contact portion formed to the displacing portion, and the opposing lower face is a lower face facing toward the installation face side of an adjacent support portion for supporting a portion adjacent to the counterpart contact portion.

In the present aspect-mode, the counterpart terminal includes the counterpart contact portion that projects from the counterpart housing and that contacts the contact portion formed to the displacing portion. The portion of the counterpart terminal adjacent to the counterpart contact portion is supported by the adjacent support portion of the counterpart housing. The downward projecting portion projects from the lower face of the adjacent support portion.

This means that excessive displacement of the movable housing can be better suppressed while making the counterpart connector lighter in weight than in an embodiment in which the up-down dimension of the adjacent support portion is simply enlarged and the lower face caused to abut the displacement restricting portion of the inner connector.

Fourth Aspect

A connector according to a fourth aspect-mode-one is a connector including a housing and a terminal retained in the housing, wherein: the terminal includes a first retained portion formed to a first extending portion extending along a first direction; a displacing portion capable of displacing with respect to the first retained portion; an intermediate portion that is disposed between the first retained portion and the displacing portion and that includes one or more bent portions bend in a plate thickness direction; and the intermediate portion includes a second extending portion that connects to the first extending portion via a first bent portion nearest to the first retained portion from out of the one or more bent portions and that extends along a direction perpendicular to the first direction, with a second retained portion formed to the second extending portion.

In the present aspect-mode, the connector includes the housing and the terminal retained in the housing. The terminal includes the first retained portion formed to the first extending portion extending along the first direction, the displacing portion capable of displacing with respect to the first retained portion, and the intermediate portion disposed between the first extending portion and the displacing portion. The intermediate portion includes the plural bent portions that are bent in the plate thickness direction.

The intermediate portion also includes the second extending portion that connects to the first extending portion via the first bent portion and that extends along the direction perpendicular to the first direction. The second retained portion is formed to the second extending portion.

Deformation of the first bent portion is accordingly suppressed by the second retained portion formed to the second extending portion being retained in the housing, thereby suppressing stress from concentrating at the first bent portion.

The present aspect-mode described above is thereby able to suppressing stress from concentrating at the bent portion in a connector with a terminal intermediate portion including one or more bent portions.

Note that although in exemplary embodiments described later the first retained portion and the first bent portion are in close proximity to each other, the present aspect-mode is not limited thereby.

Although in exemplary embodiments described later the first bent portion and the second retained portion are in close proximity to each other, the present aspect-mode is not limited thereby.

Although in exemplary embodiments described later the housing is a fixed housing, the housing of the present aspect-mode is not limited thereto.

A connector according to a fourth aspect-mode-two is the fourth aspect-mode-one wherein a portion of the second extending portion further toward the displacing portion side than the second retained portion includes a gradually reducing extending portion formed so as to have a plate width that gradually reduces on progression away from the second retained portion.

In the present aspect-mode, the portion of the second extending portion further toward the displacing portion side than the second retained portion includes the gradually reducing extending portion formed so as to have a plate width that gradually reduces on progression away from the second retained portion.

This thereby enables stress to be suppressed from concentrating at a particular portion of the second extending portion.

The connector according to a fourth aspect-mode-three is the fourth aspect-mode-one or the fourth aspect-mode-two wherein the second retained portion is formed with a plate width greater than that of a portion adjacent to the second retained portion, and, with respect to a position of maximum plate width on the second retained portion, a rate of change in plate width on a side of the first retained portion is greater than a rate of change in plate width on a side of the displacing portion.

In the present aspect-mode, the second retained portion is formed with a plate width greater than that of the portion adjacent to the second retained portion. Moreover, with respect to the position of maximum plate width on the second retained portion, the rate of change in plate width on the first retained portion side is greater than the rate of change in plate width on the displacing portion side. Note that the rate of change in plate width means the quantity of change in plate width with respect to distance toward the first retained portion side or toward the displacing portion side.

Thus the position of the second retained portion can be set near to the first bent portion, and also stress can be suppressed from concentrating at a portion of the intermediate portion that is in close proximity to and on the displacing portion side of the second retained portion. Setting the position of the second retained portion near to the first bent portion enables a length to be secured for a region that is actually capable of deforming on the intermediate portion.

A connector according to a fourth aspect-mode-four is any one of the fourth aspect-mode-one to the fourth aspect-mode-three wherein the terminal is press-fitted into the housing in a specific press-fit direction and retained by the housing, the first direction is the press-fit direction, the first retained portion is a first press-fit portion, and the second retained portion is a second press-fit portion.

In the present aspect-mode, the terminal is press-fitted into the housing in the specific press-fit direction (first direction) and retained by the housing.

Fifth Aspect

A connector set according to a fifth aspect-mode-one is a connector set including a right angle type inner connector for mounting to a substrate disposed inside a case, and a relay connector for installing at an opening of the case to relay between the inner connector and an external connection target that is external to the case, wherein: the inner connector includes a first inner terminal and a second inner terminal; the relay connector includes a first relay terminal for connecting to the first inner terminal, and a second relay terminal for connecting to the second inner terminal; the first inner terminal includes a first contact portion for contacting the first relay terminal, and a first connection portion for connecting to the substrate; the second inner terminal includes a second contact portion for contacting the second relay terminal, and a second connection portion for connecting to the substrate; the first relay terminal includes a first inner-side contact portion for contacting the first inner terminal, and a first external-side contact portion for contacting the external connection target; the second relay terminal includes a second inner-side contact portion for contacting the second inner terminal, and a second external-side contact portion for contacting the external connection target; the first external-side contact portion and the second external-side contact portion are disposed at different positions from each other in a substrate perpendicular direction that is a direction perpendicular to the substrate; and the first inner-side contact portion and the second inner-side contact portion are disposed at a same position in the substrate perpendicular direction.

The connector set according to the present aspect-mode includes the right angle type inner connector for mounting to the substrate disposed inside the case, and the relay connector for installing at the opening of the case to relay between the inner connector and the external connection target that is external to the case.

The inner connector includes the first inner terminal and the second inner terminal. The relay connector includes the first relay terminal for connecting to the first inner terminal, and the second relay terminal for connecting to the second inner terminal.

The first inner terminal includes the first contact portion for contacting the first relay terminal, and the first connection portion for connecting to the substrate.

The second inner terminal includes the second contact portion for contacting the second relay terminal, and the second connection portion for connecting to the substrate.

The first relay terminal includes the first inner-side contact portion for contacting the first inner terminal, and the first external-side contact portion for contacting the external connection target.

The second relay terminal includes the second inner-side contact portion for contacting the second inner terminal, and the second external-side contact portion for contacting the external connection target.

In the present aspect-mode, the first external-side contact portion and the second external-side contact portion are disposed at different positions from each other in the substrate perpendicular direction, but the first inner-side contact portion and the second inner-side contact portion are disposed at a same position in the substrate perpendicular direction.

This means that the distance of the first contact portion from the substrate is the same as the distance of the second contact portion from the substrate, enabling the shape of the first inner terminal and the shape of the second inner terminal to be the same shape, or similar shapes if not the same shape.

Thus the present aspect-mode enables the design cost of the inner connector to be reduced in a connector set including an inner connector and a relay connector.

Note that although in exemplary embodiments described later an example is described in which an "inner connector" is a floating connector, the "inner connector" of the present aspect-mode is not limited to such an embodiment.

Moreover, although in exemplary embodiments described later the inner connector includes the third inner terminal and the fourth inner terminal in addition to the first inner terminal and the second inner terminal, and the relay connector includes the third relay terminal and the fourth relay terminal in addition to the first relay terminal and the second relay terminal, the "connector set" of the present aspect-mode is not limited to such an embodiment.

A connector set according to a fifth aspect-mode-two is the fifth aspect-mode-one, wherein: the first inner terminal includes a first intermediate deforming portion that is positioned between the first contact portion and the first connection portion, and that by deforming permits displacement of the first contact portion with respect to the first connection portion; and the second inner terminal includes a second intermediate deforming portion that is positioned between the second contact portion and the second connection portion, and that by deforming permits displacement of the second contact portion with respect to the second connection portion.

In the present aspect-mode, the first inner terminal includes the first intermediate deforming portion that is positioned between the first contact portion and the first connection portion, and that by deforming permits displacement of the first contact portion with respect to the first connection portion. The second inner terminal includes the second intermediate deforming portion that is positioned between the second contact portion and the second connection portion, and that by deforming permits displacement of the second contact portion with respect to the second connection portion.

Thus the first contact portion and the second contact portion are able to displace with respect to the substrate, and are able to accommodate positional misalignment between the substrate and the relay connector.

Note that in the present aspect-mode, the inner terminal includes the intermediate deforming portion (the first intermediate deforming portion or the second intermediate deforming portion), and so design of the inner terminal is particularly complicated. This means that the design cost would increase greatly supposing there were to be an increase in the number of shape types for the inner terminal. In particular, consider a case in which the inner connector is employed in an environment in which a strong vibration is imparted thereto over a prolonged period of time such as in onboard equipment, this issue would be significant in such a case due to demands for the intermediate deforming portion to be given a high ability to maintain performance in such an environment.

A connector set according to a fifth aspect-mode-three is the fifth aspect-mode-one or the fifth aspect-mode-two wherein: the inner connector includes a third inner terminal and a fourth inner terminal; the relay connector includes a third relay terminal for connecting to the third inner terminal, and a fourth relay terminal for connecting to the fourth inner terminal; the third inner terminal includes a third contact portion for contacting the third relay terminal, and a third connection portion for connecting to the substrate; the fourth inner terminal includes a fourth contact portion for contacting the fourth relay terminal, and a fourth connection portion for connecting to the substrate; the third relay terminal includes a third inner-side contact portion for contacting the third inner terminal, and a third external-side contact portion for contacting the external connection target; the fourth relay terminal includes a fourth inner-side contact portion for contacting the fourth inner terminal and a fourth external-side contact portion for contacting the external connection target; the first external-side contact portion, the second external-side contact portion, the third external-side contact portion, and the fourth external-side contact portion are arranged at different positions from each other in the substrate perpendicular direction; the first inner-side contact portion and the second inner-side contact portion are arranged at a same position in the substrate perpendicular direction; and the third inner-side contact portion and the fourth inner-side contact portion are arranged at a same position in the substrate perpendicular direction.

In the present aspect-mode, the first external-side contact portion, the second external-side contact portion, the third external-side contact portion, and the fourth external-side contact portion are arranged at different positions in the substrate perpendicular direction. The first inner-side contact portion and the second inner-side contact portion are arranged at the same position in the substrate perpendicular direction, and the third inner-side contact portion and the fourth inner-side contact portion are arranged at the same position in the substrate perpendicular direction.

This means that the distance of the first contact portion from the substrate and the distance of the second contact portion from the substrate are the same, enabling the shape of the first inner terminal and the second inner terminal to be the same shapes as each other, or similar shapes if not the same shape. As a result thereof the design cost of the inner connector can be reduced.

Moreover, the distance of the third contact portion from the substrate and the distance of the fourth contact portion from the substrate are the same, enabling the shape of the third inner terminal and the fourth inner terminal to be the same shapes as each other, or similar shapes if not the same shape. As a result thereof the design cost of the inner connector can be reduced.

A connector set according to a fifth aspect-mode-four is the fifth aspect-mode-three, wherein the first external-side contact portion and the fourth external-side contact portion are arranged at a same position in an array direction that is a direction perpendicular to the substrate perpendicular direction; the second external-side contact portion and the third external-side contact portion are arranged at a same position in the array direction; and the first inner-side contact portion, the second inner-side contact portion, the third inner-side contact portion, and the fourth inner-side contact portion are arranged at different positions from each other in the array direction.

In the present aspect-mode, the second external-side contact portion and the fourth external-side contact portion are arranged at the same position in the array direction, and the first external-side contact portion and the third external-side contact portion are arranged at the same position in the array direction. The first inner-side contact portion, the second inner-side contact portion, the third inner-side contact portion, and the fourth inner-side contact portion are arranged at different positions in the array direction.

This means that the first contact portion, the second contact portion, the third contact portion, and the fourth contact portion of the inner connector can be disposed at respectively different positions in the array direction.

DESCRIPTION OF EMBODIMENTS

In the following description ±X directions indicate front-rear directions in each of the drawings, ±Y directions indicate width directions therein, and ±Z directions indicate up-down directions therein.

Connector Set

Figure 1:
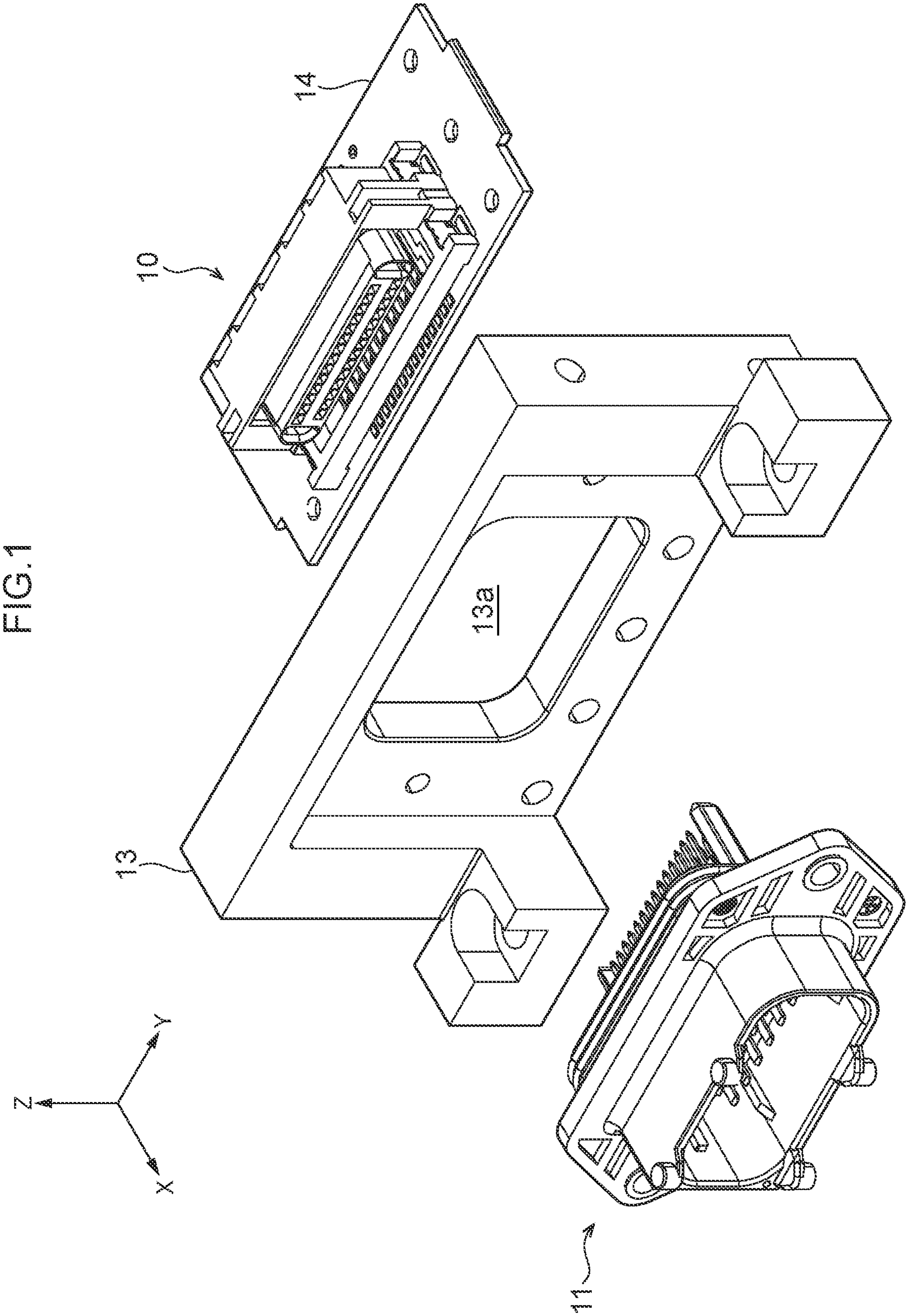
FIG. 1 is a perspective view illustrating an inner connector and a relay connector prior to connection.
Figure 2:
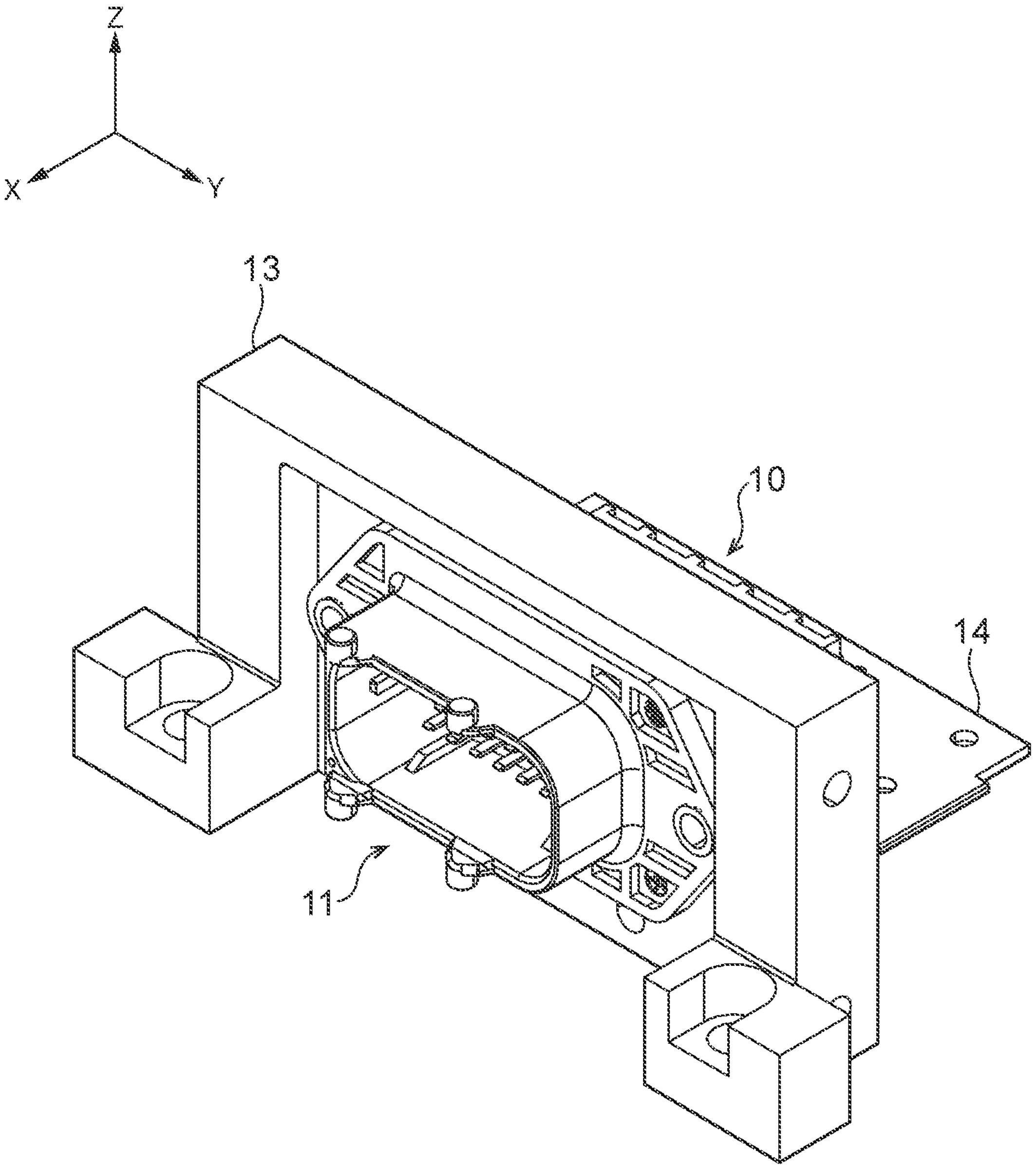
FIG. 2 is a perspective view illustrating an inner connector and a relay connector in a connected state.

As illustrated in FIG. 1, a connector set 10, 11 includes an inner connector 10 and a relay connector 11.

The inner connector 10 is mounted to a substrate 14 (mounting target) disposed inside a case 13. The inner connector 10 is a right angle type floating connector.

The relay connector 11 acts as a relay between the inner connector 10 disposed inside the case 13, and a connection target (omitted from illustration and hereafter also referred to as an "external connection target", such as, for example, a connector provided to an end portion of a wire harness) external to the case 13. The relay connector 11 is installed at an opening 13*a* of the case 13.

The connection between the inner connector 10 and the relay connector 11 is, for example, performed in the following sequence.

First the substrate 14 mounted with the inner connector 10 is disposed and fixed at the inside of the case 13.

Then the relay connector 11 is fitted into the opening 13*a* of the case 13 and the relay connector 11 is also connected to the inner connector 10.

Finally the relay connector 11 is fixed to the case 13 by non-illustrated bolts or the like.

Inner Connector 10

Description now follows regarding the inner connector 10.

Figure 3:
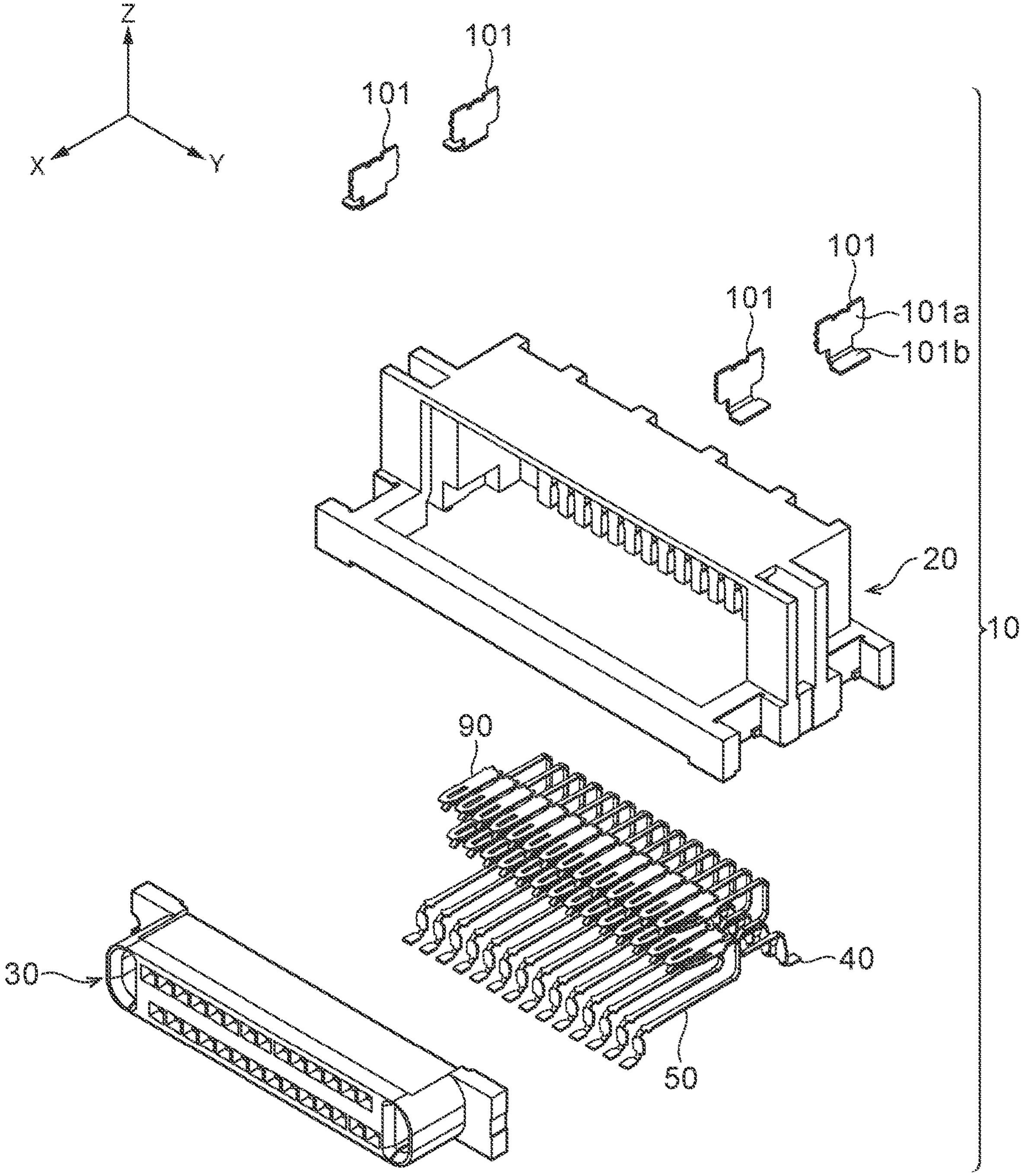
FIG. 3 is an exploded perspective view of an inner connector.

FIG. 3 is an exploded perspective view of the inner connector 10.

The inner connector 10 includes plural terminals 40, 50, a fixed housing 20, a movable housing 30, plural (four) fixings 101, and plural (28) add members 90.

Terminals 40, 50

The plural terminals 40, 50 include plural (14) upper terminals 40 and plural (14, the same number as the upper terminals 40) lower terminals 50.

The plural upper terminals 40 each have the same structure as each other, and the plural lower terminals 50 also each have the same structure as each other. The upper terminals 40 have a different structure to the lower terminals 50.

In the following, when describing items that are common to both the upper terminals 40 and the lower terminals 50, the upper terminals 40 and the lower terminals 50 will not be particularly discriminated between and will be called terminals 40, 50.

Figure 9:
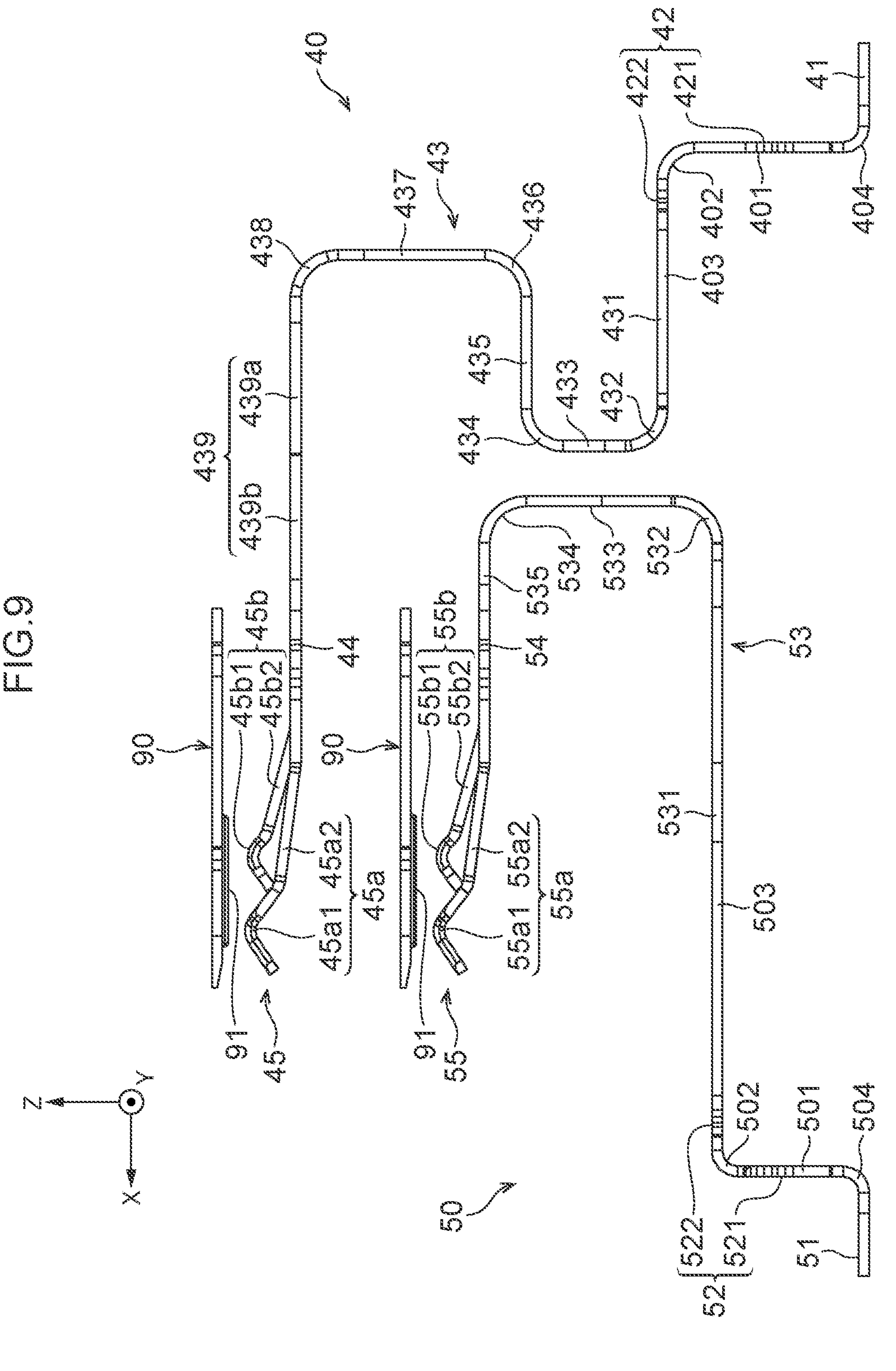
FIG. 9 is a side view illustrating terminals and add members provided to an inner connector.
Figure 10:
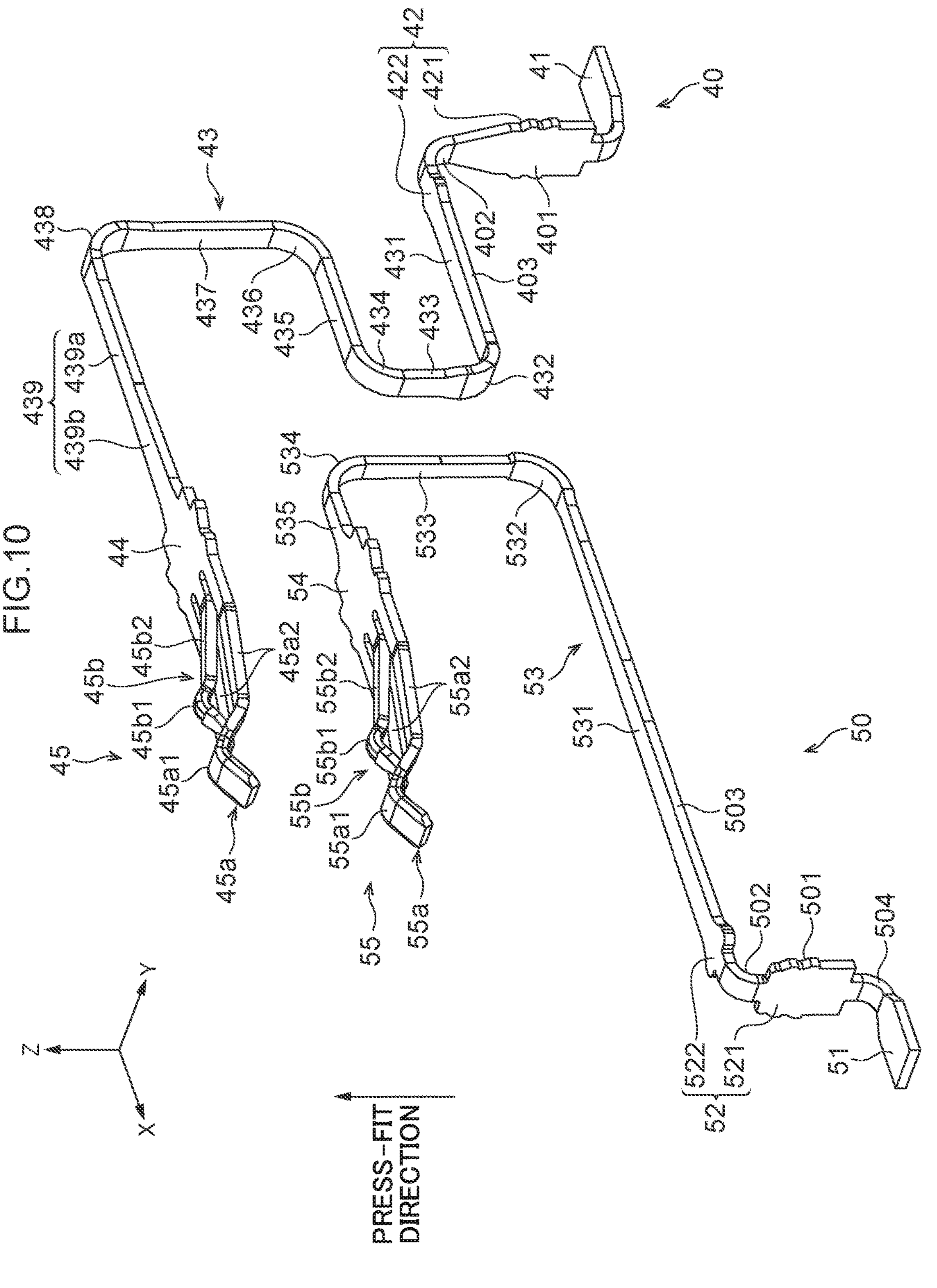
FIG. 10 is a perspective view of terminals.

As illustrated in FIG. 9 and FIG. 10, the terminals 40, 50 include connection portions 41, 51 for connecting to the substrate 14, fixed-side retained portions 42, 52 retained in the fixed housing 20, intermediate deforming portions 43, 53 formed so as to be deformable, moving-side retained portions 44, 54 retained in the movable housing 30, and contact portions 45, 55 for contacting relay terminals 60, 70 of the relay connector 11.

The connection portions 41, 51 are solder mounted to a surface (installation face) of the substrate 14 serving as a connection target. The fixed-side retained portions 42, 52 are press-fitted into the fixed housing 20. The moving-side retained portions 44, 54 are press-fitted into the movable housing 30. The moving-side retained portions 44, 54 and the contact portions 45, 55 function as displacing portions 44, 45, 54, 55 capable of displacing with respect to the substrate 14.

Upper Terminals 40

The connection portions 41 of the upper terminals 40 each extend rearward from a bent portion 404 formed at a lower side of a first extending portion 401 extending in the up-down direction.

The fixed-side retained portions 42 of the upper terminals 40 each include a first press-fit portion 421 and a second press-fit portion 422.

The first press-fit portion 421 is formed to the first extending portion 401 extending in the up-down direction. The first press-fit portion 421 has a plate thickness direction facing in the front-rear direction. Press-fit projections are formed on both plate width direction sides of the first press-fit portion 421.

The second press-fit portion 422 is formed to a second extending portion 403 extending forward from a bent portion 402 (first bent portion) formed at an upper side of the first extending portion 401. The second press-fit portion 422 is positioned in the vicinity of the bent portion 402 of the second extending portion 403. The second press-fit portion 422 has a plate thickness direction facing in the up-down direction. The second press-fit portion 422 has a plate width formed greater than adjacent portions. A specific structure of the second press-fit portion 422 will be described later.

The fixed-side retained portions 42 are press-fitted into the fixed housing 20 with upward as the press-fit direction. Thus each of the first press-fit portions 421 is press-fitted in a direction perpendicular to its plate thickness direction, and each of the second press-fit portions 422 is press-fitted in a direction parallel to its plate thickness direction.

The intermediate deforming portion 43 of each of the upper terminals 40 includes a forward extending portion 431 that is a portion of the second extending portion 403 more toward the displacing portion 44, 45 side than the second press-fit portion 422, a bent portion 432, an upward extending portion 433, a bent portion 434, a rearward extending portion 435, a bent portion 436, an upward extending portion 437, a bent portion 438, and a forward extending portion 439.

The bent portion 432, the upward extending portion 433, and the bent portion 434 configure a fold-back portion 432, 433, 434 where an extension direction is transformed from being the forward direction to being the rearward direction.

The bent portion 436, the upward extending portion 437, and the bent portion 438 configure a fold-back portion 436, 437, 438 where an extension direction is transformed from being the rearward direction to being the forward direction.

Thus the intermediate deforming portion 43 of each of the upper terminals 40 includes two fold-back portions where the extension direction is transformed between the forward and rearward directions.

The top-bottom dimension of the lower fold-back portion 432, 433, 434 is smaller than the top-bottom dimension of the upper fold-back portion 436, 437, 438.

Most of the forward extending portion 431 is configured by a portion (a gradually reducing extending portion) having a plate width dimension that gets smaller on progression toward the displacing portion 44, 45 side. The bent portion 432 is formed with a larger plate width than adjacent portions such that stress is not concentrated thereat. The forward extending portion 439 includes a base-end-side portion 439*a* having a plate width that does not change, and a leading-end-side portion 439*b* having a plate width that gradually widens on approaching the displacing portion 44, 45.

Lower Terminals 50

A connection portion 51 of each of the lower terminals 50 extends forward from a bent portion 504 formed at a lower side of a first extending portion 501 that extends in the up-down direction.

The fixed-side retained portion 52 of each of the lower terminals 50 includes a first press-fit portion 521 and a second press-fit portion 522.

The first press-fit portion 521 is formed to the first extending portion 501 that extends in the up-down direction. The first press-fit portion 521 has a plate thickness direction oriented in the front-rear direction. There are press-fit projections formed at both plate width direction sides of the first press-fit portion 521.

The second press-fit portion 522 is formed to a second extending portion 503 extending rearward from a bent portion 502 (a first bent portion) formed at an upper side of the first extending portion 501. The second press-fit portion 522 is positioned in the vicinity of the bent portion 502 of the second extending portion 503. The second press-fit portion 522 has a plate thickness direction oriented in the up-down direction. The second press-fit portion 522 is formed with a plate width greater than adjacent portions. A specific structure of the second press-fit portion 522 will be described later.

The fixed-side retained portion 52 is press-fitted into the fixed housing 20 with upward as the press-fit direction. The first press-fit portion 521 is thereby press-fitted in a direction perpendicular to its plate thickness direction, and the second press-fit portion 522 is press-fitted in a direction parallel to its plate thickness direction.

The intermediate deforming portion 53 of each of the lower terminals 50 includes a rearward extending portion 531 that is a portion of the second extending portion 503 further to the displacing portion 54, 55 side than the second press-fit portion 522, a bent portion 532, an upward extending portion 533, a bent portion 534, and a forward extending portion 535.

The bent portion 532, the upward extending portion 533, and the bent portion 534 configure a fold-back portion 532, 533, 534 where the extension direction is transformed from being the rearward direction to being the forward direction. The intermediate deforming portion 53 of each of the lower terminals 50 includes a single fold-back portion where the extension direction is transformed between forward and rearward directions.

Most of the rearward extending portion 531 is configured by a portion (gradually reducing extending portion) having a plate width that gets smaller on progression toward the displacing portion 54, 55 side. The bent portion 532 is formed with a larger plate width than adjacent portions such that stress is not concentrated thereat.

The displacing portions 44, 45 of the upper terminals 40 and the displacing portions 54, 55 of the lower terminals 50 have the same structure and so will be described together.

The displacing portions 44, 45, 54, 55 include the moving-side retained portions 44, 54 and the contact portions 45, 55.

The moving-side retained portions 44, 54 have a plate thickness direction oriented in the up-down direction. Press-fit projections are formed at both plate width direction (width direction) sides of the moving-side retained portions 44, 54. The moving-side retained portions 44, 54 are press-fitted into the movable housing 30 with forward as the press-fit direction. The moving-side retained portions 44, 54 are thereby each press-fitted in a direction perpendicular to its plate thickness direction.

The moving-side retained portions 44, 54 are directly connected to the forward extending portions 439, 535 and not through a bent portion.

The contact portions 45, 55 include first contact tabs 45*a*, 55*a* for resiliently contacting the connection target (the relay terminals 60, 70), and second contact tabs 45*b*, 55*b* for resiliently contacting the connection target further toward a far side (rearward) in the connection direction than the first contact tabs 45*a*, 55*a*.

The first contact tabs 45*a*, 55*a* include first contact points 45*a*1, 55*a*1, and respective pairs of first support portions 45*a*2, 55*a*2.

The first contact points 45*a*1, 55*a*1 are bend-folded in a mountain shape so as to be convex upward.

The pairs of first support portions 45*a*2, 55*a*2 resiliently support the first contact points 45*a*1, 55*a*1.

The second contact tabs 45*b*, 55*b* include second contact points 45*b*1, 55*b*1 and second support portions 45*b*2, 55*b*2.

The second contact points 45*b*1, 55*b*1 are bend-folded in a mountain shape so as to be convex upward. The second contact points 45*b*1, 55*b*1 are positioned further rearward than the first contact points 45*a*1, 55*a*1. The second contact points 45*b*1, 55*b*1 are accordingly positioned further toward the far side (rearward) in the connection direction than the first contact points 45*a*1, 55*a*1. When connecting the relay connector 11 to the inner connector 10, the relay terminals 60, 70 of the relay connector 11 first slide against and are wiped by the first contact points 45*a*1, 55*a*1, and then contact the second contact points 45*b*1, 55*b*1.

The second support portions 45*b*2, 55*b*2 are formed between the respective pairs of first support portions 45*a*2, 55*a*2.

The peak positions (contact points) of the second contact points 45*b*1, 55*b*1 are positioned below the peak positions (contact points) of the first contact points 45*a*1, 55*a*1 when the inner connector 10 is in a state not connected to the relay connector 11.

Next, description follows regarding the positional relationships and the like between the upper terminals 40 and the lower terminals 50.

The displacing portions 54, 55 of the lower terminals 50 are positioned further to a lower side than the displacing portions 44, 45 of the upper terminals 40.

The start end of the intermediate deforming portion 53 of the lower terminals 50 (i.e. a boundary between the rearward extending portion 531 and the fixed-side retained portion 52) is positioned further to a lower side than the start end of the intermediate deforming portion 43 of the upper terminal 40.

The up-down dimension of the intermediate deforming portion 53 of the lower terminal 50 is smaller than the up-down dimension of the intermediate deforming portion 43 of the upper terminal 40.

The front-rear extending portion (the forward extending portion 431) at the start end side of the intermediate deforming portion 43 of the upper terminal 40 is shorter than the front-rear extending portion (the rearward extending portion 531) at the start end side of the intermediate deforming portion 53 of the lower terminal 50.

The front-rear extending portion (the forward extending portion 439) at the final end side of the intermediate deforming portion 43 of the upper terminal 40 is longer than the front-rear extending portion (the forward extending portion 535) at the final end side of the intermediate deforming portion 53 of the lower terminal 50.

The position of the plural upper terminals 40 in the width direction is different from the position of the plural lower terminals 50 therein. The upper terminals 40 and the lower terminals 50 are arrayed alternately along the width direction (a terminal array direction).

Add Member 90

The add members 90 are members formed as different bodies to the terminals 40, 50, and are retained in the movable housing 30.

Figure 11A:
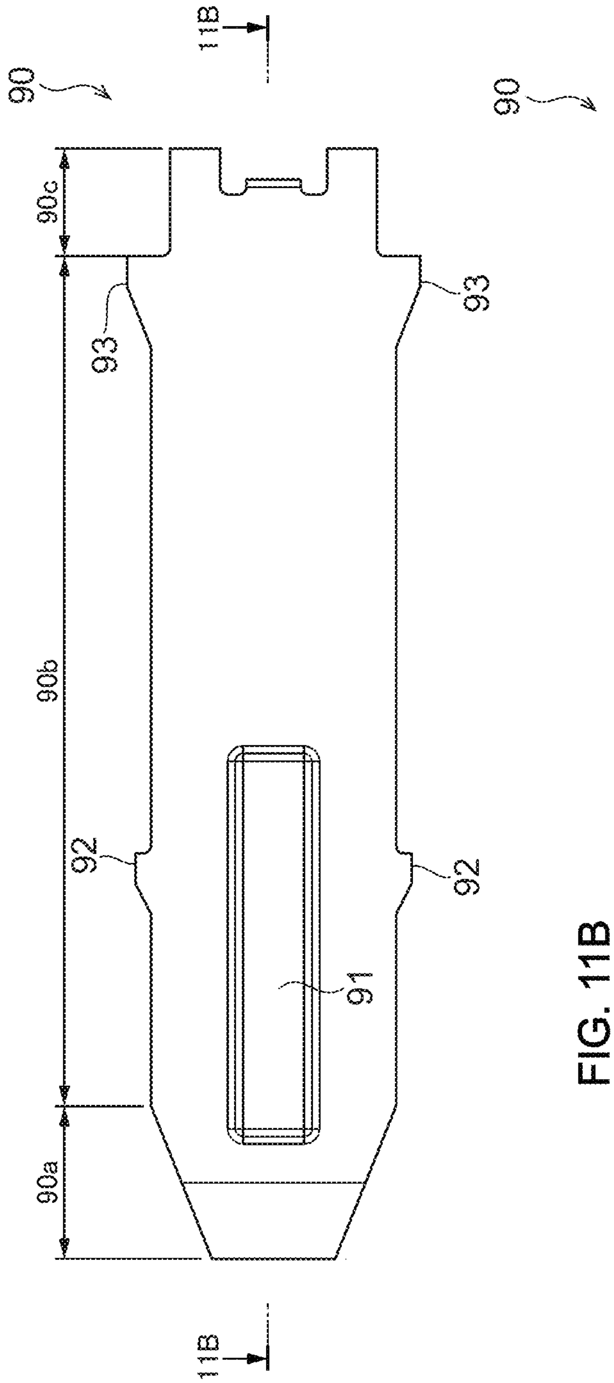
FIG. 11A is a bottom face view of an add member.
Figure 11B:
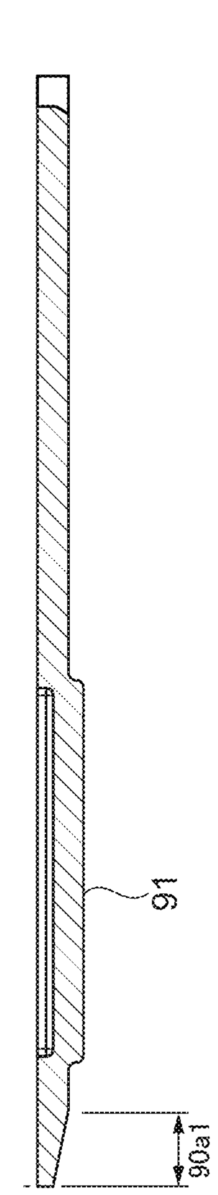
FIG. 11B is a cross-portion taken along line 11B-11B.

As illustrated in FIG. 11, each of the add members 90 includes a front end portion 90*a* configured in the vicinity of a front end of the add member 90, a general portion 90*b*, and a rear end portion 90*c* configured in the vicinity of a rear end of the add member 90.

The front end portion 90*a* is formed such that the width dimension gets smaller on progression forward.

The general portion 90*b* has a constant width dimension irrespective of position in the front-rear direction, except for at portions where press-fit projections 92, 93, described later, are formed.

The rear end portion 90*c* has a constant width dimension irrespective of position in the front-rear direction, with a smaller plate width than the general portion 90*b*.

The add members 90 are formed by punch processing or the like so as to be punched out from sheet material, and have not been subjected to bend processing. The add members 90 are, for example, configured from a stainless steel, and plating processing has not been performed thereon.

A bulge portion 91 bulging downward is formed on the add member 90 by bead processing. The bulge portion 91 is formed at a position opposing the respective contact portion 45, 55 of the terminals 40, 50 in the up-down direction. The bulge portion 91 contacts the relay terminals 60, 70 of the relay connector 11. The bulge portion 91 is formed so as to extend along the front-rear direction, and opposes both the first contact points 45*a*1, 55*a*1 and the second contact points 45*b*1, 55*b*1 in the up-down direction. The front end of the bulge portion 91 is positioned at the front end portion 90*a* of the add member 90. The rear end of the bulge portion 91 is positioned at the general portion 90*b* of the add member 90, and specifically is positioned further forward than a front-rear direction center position of the general portion 90*b*.

The bulge portion 91 corresponds to an "add-side contact portion" and an "other-side contact portion" of the present disclosure.

The add members 90 each include plural press-fit projections 92, 93.

The plural press-fit projections 92, 93 are configured from a pair of front press-fit projections 92 and a pair of rear press-fit projections 93. The position in the front-rear direction where the pair of front press-fit projections 92 is formed is a position overlapping with a range where the bulge portion 91 is formed. The position in the front-rear direction where the pair of rear press-fit projections 93 is formed is a position not overlapping with the range where the bulge portion 91 is formed, and is a position corresponding to a rear end of the general portion 90*b* of the add member 90.

The add members 90 are each press-fitted into an add member press-fit groove 312*b* (see FIG. 19) formed at an upper portion of a placement space 312 of the movable housing 30.

A part at a leading end side of the front end portion 90*a* configures a leading-end-side inclined portion 90*a*1.

The plate thickness at the leading-end-side inclined portion 90*a*1 gets smaller on progression forward. Thus a lower face of the leading-end-side inclined portion 90*a*1 is inclined upward on progression forward.

Figure 12:
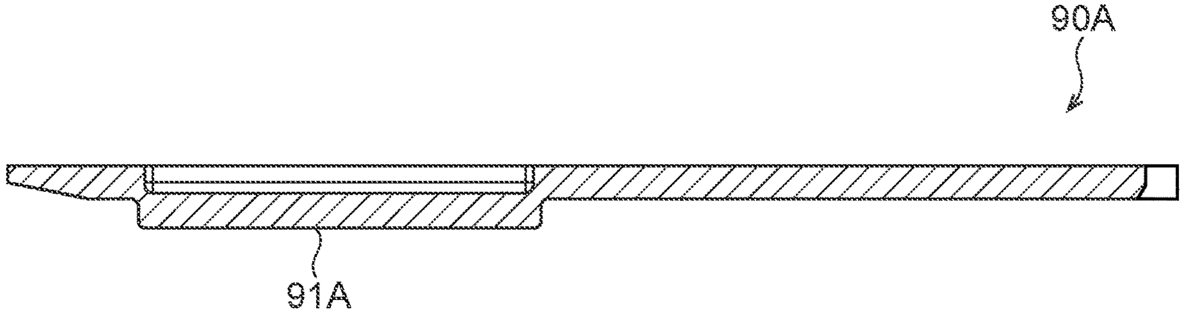
FIG. 12 is a cross-portion corresponding to FIG. 11B and illustrating a different type of add member.

FIG. 12 is a cross-portion illustrating an add member 90A of a different type to the add member 90 illustrated in FIG. 11. The add member 90A is configured substantially the same as the add member 90, however it differs therefrom in that a bulge amount of a bulge portion 91A is larger than that of the bulge portion 91 of the add member 90. The add member 90A can be press-fitted into the add member press-fit groove 312*b* of the movable housing 30 (see FIG. 19) instead of the add member 90.

In the present exemplary embodiment the bulge portion 91 is formed by bead processing (namely, by processing to form an indentation in the plate thickness direction). This accordingly enables the bulge amount (projection amount/indentation amount) of the bulge portion 91 to be changed easily, facilitating variation evolution.

Fixed Housing 20

Figure 13:
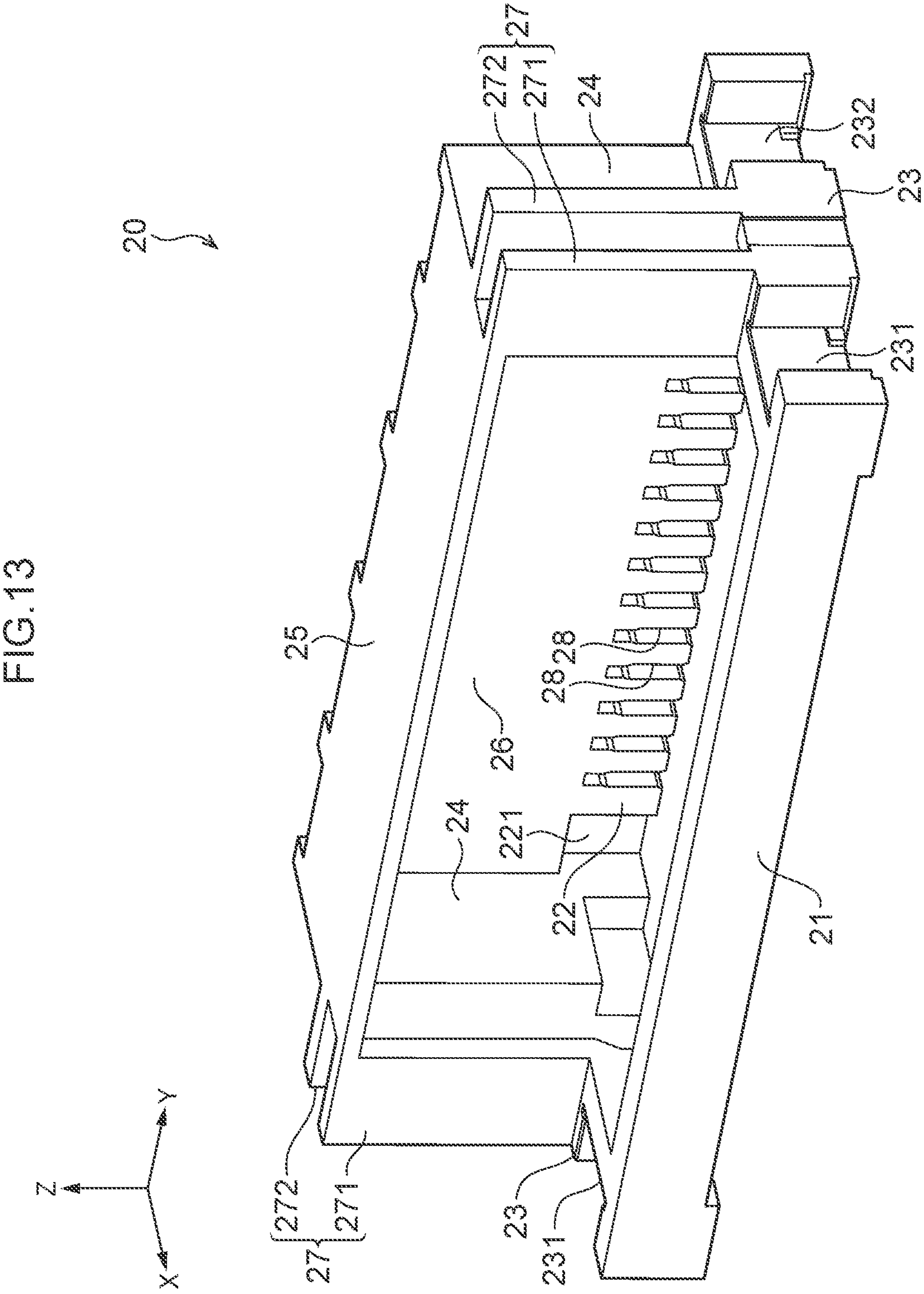
FIG. 13 is a perspective view of a fixed housing.
Figure 14:
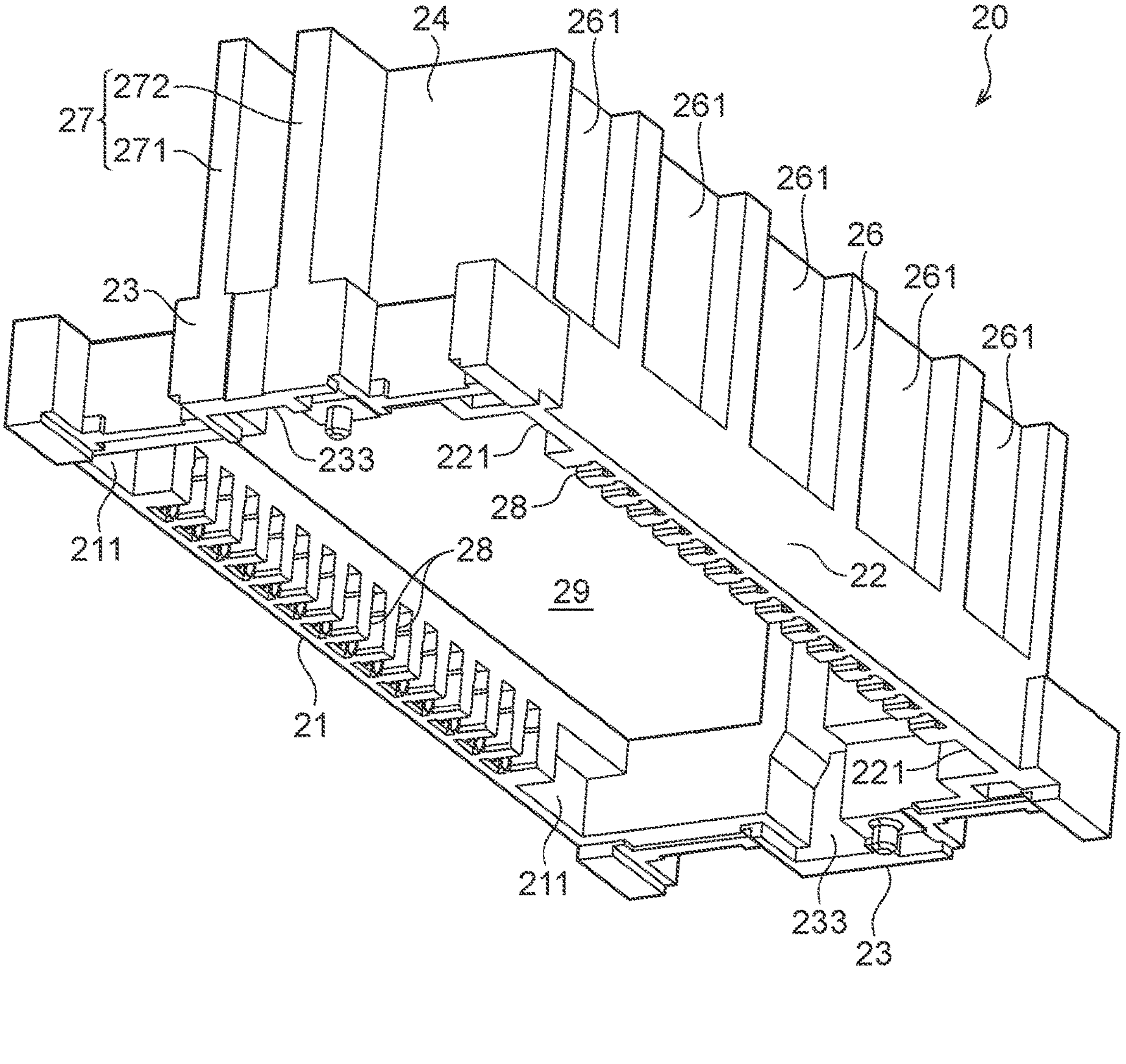
FIG. 14 is a perspective view of a fixed housing as viewed from a different direction.

FIG. 13 and FIG. 14 illustrate a fixed housing.

The fixed housing 20 is a housing fixed to the substrate 14 serving as the "mounting target". The fixed housing 20 is fixed to the substrate 14 through the plural terminals 40, 50 and the plural fixings 101.

The fixed housing 20 is formed from an electrical insulator such as a synthetic resin or the like.

The fixed housing 20 includes a lower frame 21, 22, 23.

The lower frame 21, 22, 23 includes a front frame portion 21, a rear frame portion 22, and a pair of side frame portions 23. The front frame portion 21 and the rear frame portion 22 extend in the width direction, and the pair of side frame portions 23 extend in the front-rear direction. The lower frame 21, 22, 23 accordingly has a rectangular frame shape in plan view.

Figure 7:
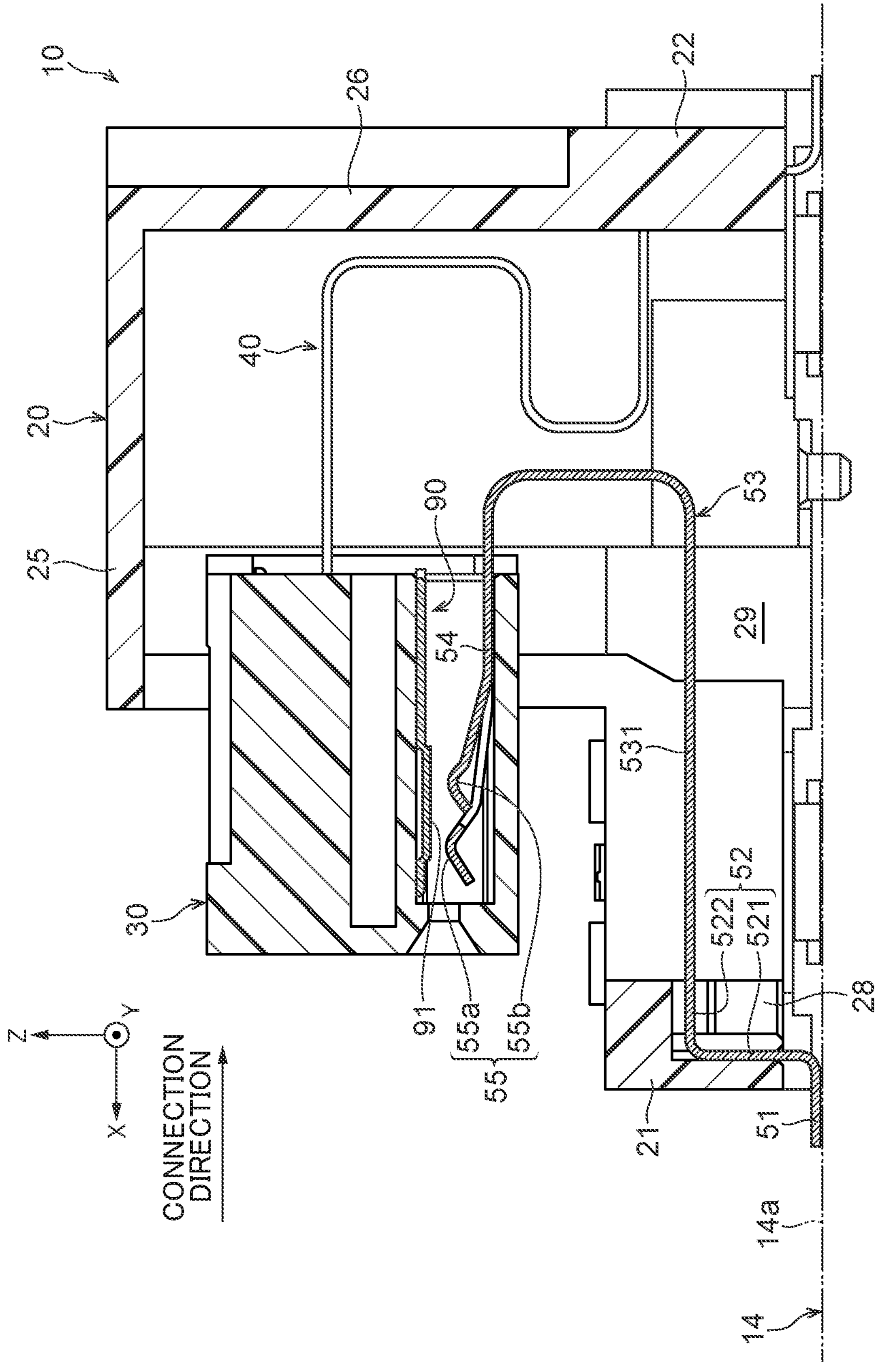
FIG. 7 is a cross-portion taken along line 7-7 of FIG. 6.

The front frame portion 21 functions as a lower terminal retaining portion 21 that retains part of each of the lower terminals 50 (the fixed-side retained portion 52 thereof) (see FIG. 7). The front frame portion 21 is formed with press-fit grooves 28 for press-fitting the fixed-side retained portions 52 of the lower terminals 50 therein. The front frame portion 21 is accordingly fixed to the substrate 14 through the lower terminals 50.

The cross-portional profile of the front frame portion 21 is a rectangular shape in a cross-portion orthogonal to the width direction. The upper face of the front frame portion 21 is a flat face having an upward facing normal direction. The press-fit grooves 28 are grooves open only at the lower face side and the rear face side of the front frame portion 21.

The rear frame portion 22 functions as an upper terminal retaining portion 22 (see FIG. 8) for retaining part of each of the upper terminals 40 (the fixed-side retained portion 42 thereof). The press-fit grooves 28 are also formed in the rear frame portion 22, and the fixed-side retained portions 42 of the upper terminals 40 are press-fitted therein. The rear frame portion 22 is thereby fixed to the substrate 14 through the upper terminals 40. The structure of the press-fit grooves 28 of the rear frame portion 22 is substantially the same as that of the press-fit grooves 28 of the front frame portion 21, and is specifically as described later.

The pair of side frame portions 23 has a left-right symmetrical structure. Fixing press-fit grooves 231, 232 are formed in the side frame portions 23 for the fixings 101 to be press-fitted therein. The fixings 101 are press-fitted into the fixing press-fit grooves 231, 232 from the upper side. The side frame portions 23 are thereby fixed to the substrate 14 by the fixings 101.

The fixing press-fit grooves 231, 232 include front fixing press-fit grooves 231 and rear fixing press-fit grooves 232. When the side frame portions 23 are each divided into a front portion, a rear portion, and an intermediate portion therebetween, the front fixing press-fit grooves 231 are formed to the front portions of the side frame portions 23 and the rear fixing press-fit grooves 232 are formed to the rear portions of the side frame portions 23.

As described above, the lower frame 21, 22, 23 is fixed to the substrate 14 by every one of the front frame portion 21, the rear frame portion 22, and the pair of side frame portions 23 that configure frame portions in four directions.

A pair of outer indentations 211 are formed to the front frame portion 21 at the width direction outside of the portion where the plural press-fit grooves 28 are formed (see FIG. 14). The outer indentations 211 are indentations that are open downward and rearward.

A pair of outer indentations 221 are formed to the rear frame portion 22 at the width direction outside of the portion where the plural press-fit grooves 28 are formed. The outer indentations 221 are indentations that are open downward and forward.

The space surrounded by the lower frame 21, 22, 23 configures a space (through-pass space 29) through which the movable housing 30 is able to pass in the up-down direction.

As illustrated in FIG. 14, an escape indentation 233 indented toward the width direction outside is formed in each of the side frame portions 23 so as to enable jutting out portions 32 of the movable housing 30 to pass through in the up-down direction. The front-rear dimension of the escape indentation 233 is larger than a spacing between a front restricting wall 271 and a rear restricting wall 272. More specifically, a rear end of the escape indentation 233 and a front face of the rear restricting wall 272 are aligned in front-rear direction position, but a front end of the escape indentation 233 is positioned further forward than a rear face of the front restricting wall 271.

The fixed housing 20 includes a pair of rear side-walls 24. The pair of rear side-walls 24 has a left-right symmetrical structure. The rear side-walls 24 extend upward from rear ends of the side frame portions 23. The rear side-walls 24 are not formed at positions corresponding to front portions of the side frame portions 23. The rear side-walls 24 configure width direction outside walls of a space where the movable housing 30 is disposed.

The fixed housing 20 includes a pair of restricting portions 27.

The pair of restricting portions 27 has a left-right symmetrical structure. The restricting portions 27 are formed at an upper side of intermediate portions of the side frame portions 23. The restricting portions 27 each include the front restricting wall 271 and the rear restricting wall 272. The front restricting wall 271 and the rear restricting wall 272 oppose each other in the front-rear direction. The front-rear direction movement range of the movable housing 30 is restricted by the jutting out portions 32 of the movable housing 30 (see FIG. 17) being disposed between the front restricting walls 271 and the rear restricting walls 272. Namely, the front restricting walls 271 limit a forward movement range of the movable housing 30 and the rear restricting walls 272 limit a rearward movement range of the movable housing 30.

Specifically, the front restricting walls 271 each have a cuboidal shape, and more specifically the shape of a cuboid in which the front-rear dimension is smaller than both the up-down dimension and the width dimension.

The width direction outside faces of the front restricting walls 271 are flush with the width direction outside faces of the side frame portions 23. The width direction outside faces of the front restricting walls 271 are positioned further to the width direction outside than width direction outside faces of the rear side-wall 24. The upper faces of the front restricting walls 271 are flush with an upper face of a ceiling plate 25. The front faces of the front restricting walls 271 are flush with a front face of the ceiling plate 25.

Specifically, the rear restricting walls 272 each have a cuboidal shape, and more specifically the shape of a cuboid in which the front-rear dimension is smaller than both the up-down dimension and the width dimension.

The width direction outside faces of the rear restricting walls 272 are flush with the width direction outside faces of the side frame portions 23. The width direction outside faces of the rear restricting walls 272 are positioned further to the width direction outside than the width direction outside faces of the rear side-walls 24. The upper faces of the rear restricting wall 272 are flush with the upper face of the ceiling plate 25.

The width direction inside ends of the rear restricting walls 272 are connected to the front ends of the rear side-walls 24.

The fixed housing 20 includes the ceiling plate 25.

The ceiling plate 25 configures a wall at an upper side of the space where the movable housing 30 is disposed.

The ceiling plate 25 couples upper ends of the pair of restricting portions 27 and the pair of rear side-walls 24 together in the width direction. The ceiling plate 25 abuts the movable housing 30 when the movable housing 30 has been displaced upward. Namely, the ceiling plate 25 functions as a portion (upward limiting portion) to limit an upward movement range of the movable housing 30.

Taking the fixed housing 20 to be configured by three portions, i.e. a front portion, a rear portion, and an intermediate portion therebetween, although the ceiling plate 25 is formed at the intermediate portion and the rear portion of the fixed housing 20, the ceiling plate 25 is not formed at the front portion of the fixed housing 20.

The fixed housing 20 includes a rear wall 26.

The rear wall 26 extends from the rear frame portion 22 toward the upper side and couples rear ends of the rear side-walls 24 together in the width direction. An upper end of the rear wall 26 is connected to a rear end of the ceiling plate 25.

A front face of the rear wall 26 is flush with a front face of the rear frame portion 22, and a rear face of the rear wall 26 is flush with a rear face of the rear frame portion 22.

There are plural (5) rear wall indentations 261 formed in the rear wall 26 so as to be recessed forward with respect to the rear face of the rear wall 26. The rear wall indentations 261 are indentations opening rearward and upward. The plural rear wall indentations 261 are formed in a row along the width direction. Lower ends of the rear wall indentations 261 are positioned at an upper side of an upper end of the lower frame 21, 22, 23 (more specifically at an upper side of an upper face of the side frame portions 23).

Specific Shapes of the Second Press-Fit Portions 422 and the Press-Fit Grooves 28 of the Fixed Housing 20

Next detailed description follows regarding the structure of the fixed-side retained portions 42, 52 of the terminals 40, 50 and of the press-fit grooves 28 of the fixed housing 20.

Figure 15:
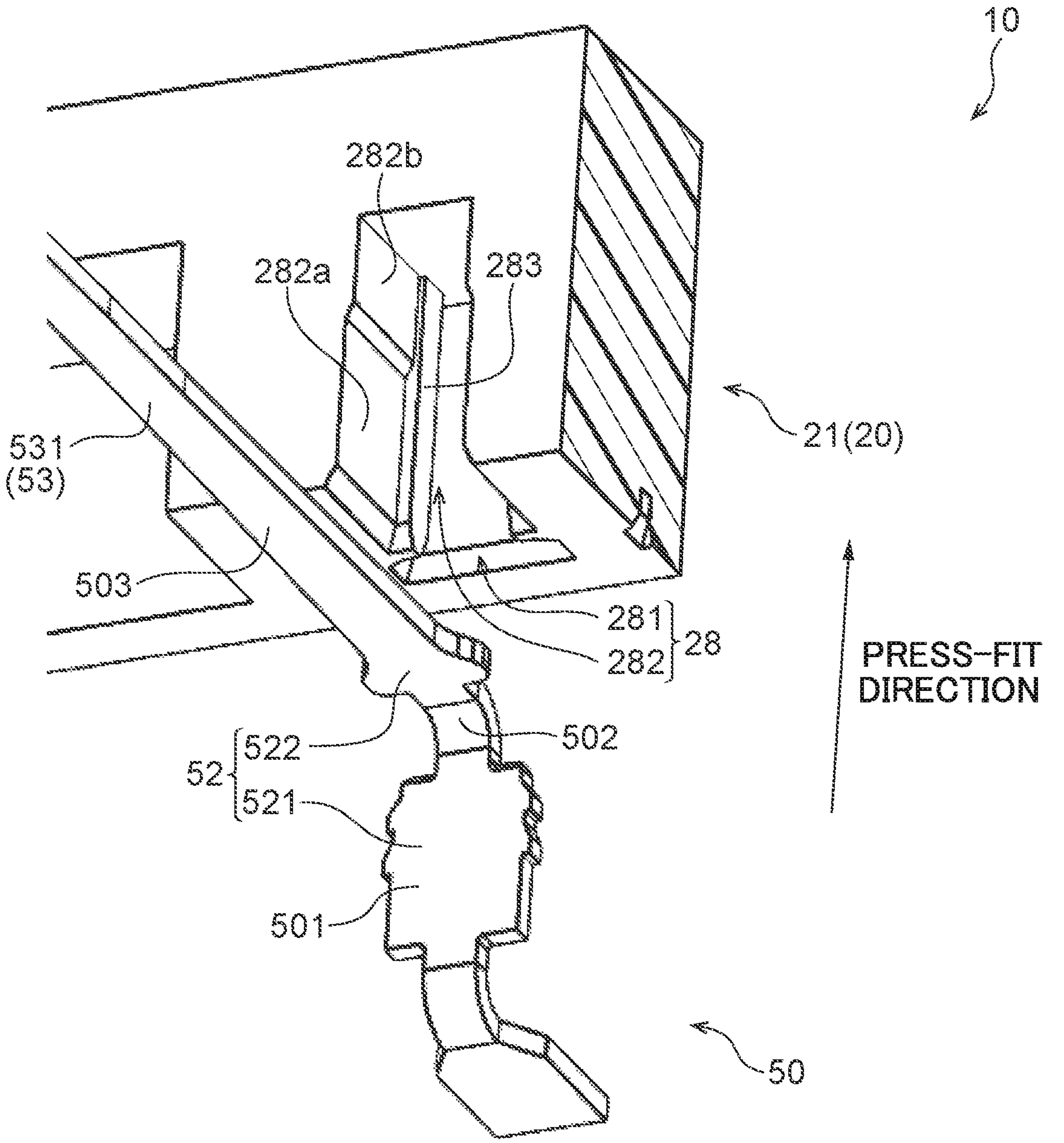
FIG. 15 is a diagram illustrating an enlargement of a press-fit groove formed in a front frame portion of a fixed housing and of a fixed-side retained portion of a lower terminal.

FIG. 15 is an enlarged perspective view illustrating one of the press-fit grooves 28 formed to the front frame portion 21 of the fixed housing 20 and one of the fixed-side retained portions 52 of one of the lower terminals 50.

The press-fit grooves 28 of the front frame portion 21 and the press-fit grooves 28 of the rear frame portion 22 have substantially the same structure as each other. These will be simply referred to below as the press-fit groove 28 when not be particularly discriminated between in the description.

The press-fit grooves 28 are grooves opening downward and toward the front-rear direction inside, and are configured so as to enable the fixed-side retained portions 42, 52 to be press-fitted therein from below.

The press-fit grooves 28 each include a first groove 281 for press-fitting the first press-fit portion 421, 521 into, and a second groove 282 for press-fitting the second press-fit portion 422, 522 into.

The second groove 282 includes a wide-width portion **282*a* configuring a lower portion thereof, and a narrow-width portion 282*b* configuring an upper portion thereof. The width dimension of the wide-width portion 282*a* is larger than the maximum plate width of the second press-fit portions 422, 522, and the width dimension of the narrow-width portion 282*b* is smaller than the maximum plate width of the second press-fit portions 422, 522. Thus the second press-fit portions 422, 522 do not dig into the fixed housing 20 at the wide-width portion 282*a*, but do dig into the fixed housing 20 at the narrow-width portion 282*b*. The second press-fit portions 422, 522 are thereby retained in the narrow-width portion 282*b* of the second groove 282**.

The lower portion of the second groove 282 is configured by the wide-width portion **282*a* so as to achieve a configuration in which a timing at which the first press-fit portions 421, 521 are press-fitted into the first grooves 281 is as near as possible the same as a timing at which the second press-fit portions 422, 522 are press-fitted into the second grooves 282**.

A boundary portion 283 is formed between the first groove 281 and the second groove 282.

A groove width at the boundary portion 283 is smaller than a groove width of other portions of the press-fit groove 28. The groove width of the boundary portion 283 is constant across the entire up-down direction thereof.

Figure 16:
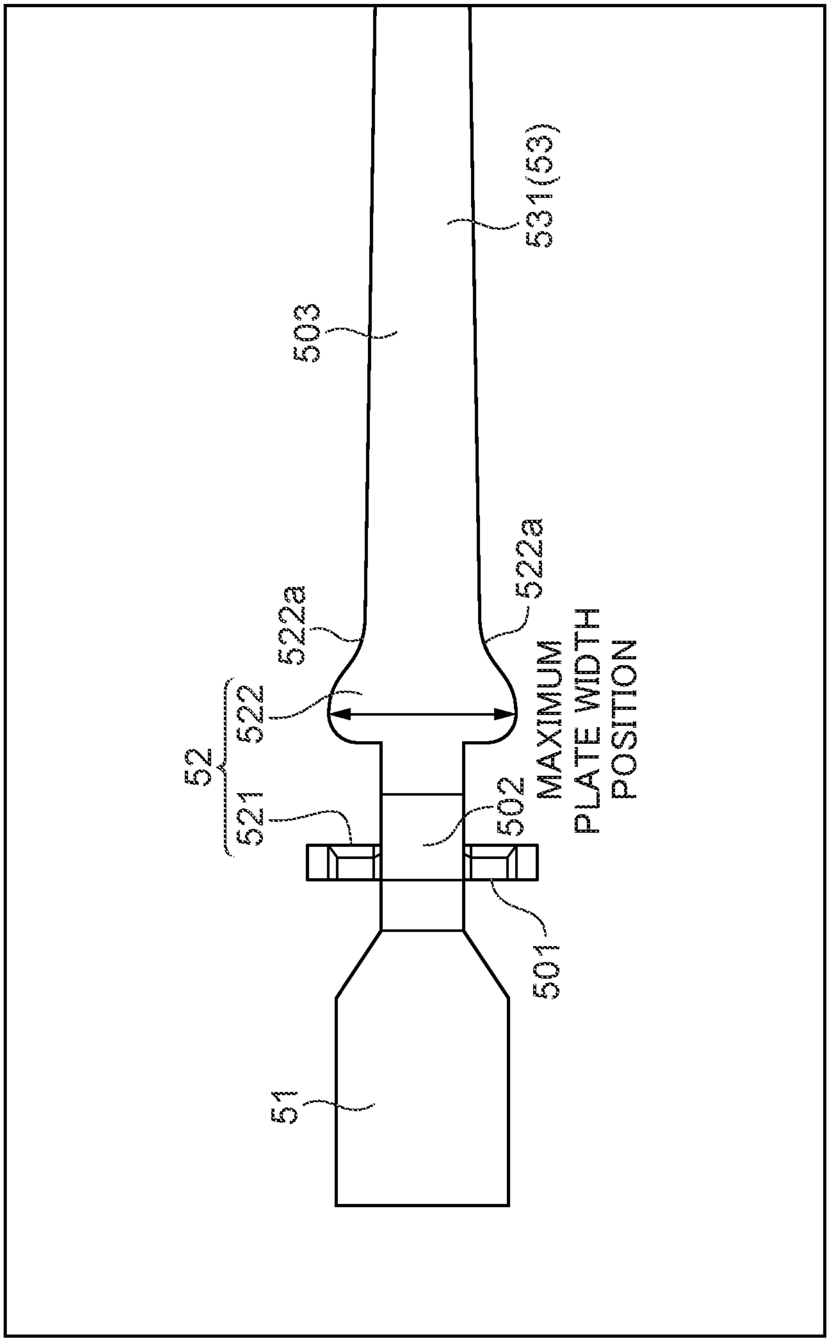
FIG. 16 is a diagram illustrating an enlargement of a vicinity of a second press-fit portion of a lower terminal.

FIG. 16 is a diagram illustrating an enlargement of one of the second press-fit portions 522 of one of the lower terminals 50.

The second press-fit portion 522 of the lower terminal 50 is formed with a plate width larger than adjacent portions.

The portions indicated by arrows in FIG. 16 indicate positions where the plate width is a maximum (maximum plate width positions) on the second press-fit portion 522.

A rate of change in plate width on the first press-fit portion 521 side of the maximum plate width position of the second press-fit portion 522 is larger than a rate of change in plate width on the displacing portion 54, 55 side thereof. Note that the rate of change in plate width means the quantity of change in plate width with respect to distance toward the first press-fit portion 521 side or toward the displacing portion 54, 55 side. Indentation shaped edges 522*a* that are convex on the width direction inside are formed at a boundary between the second press-fit portion 522 and the intermediate deforming portion 53. The indentation shaped edge 522*a* is formed with a smooth curved shape.

The configuration of the second press-fit portions 522 of the lower terminals 50 as described above also applies to the second press-fit portions 422 of the upper terminals 40. Description of the configuration of the second press-fit portion 422 will accordingly be omitted.

Fixings 101

The fixings 101 are components for fixing the fixed housing 20 to the substrate 14.

The fixings 101 are, for example, made from metal. As illustrated in FIG. 3, the four fixings 101 are manufactured with the same structure as each other. Each of the fixings 101 includes a retained portion 101*a* for retaining in the fixed housing 20, and a connection portion 101*b* for fixing to the substrate 14. The retained portion 101*a* is press-fitted into the fixed housing 20 with downward as the press-fit direction. The plate thickness direction of the retained portion 101*a* is the width direction. The plate thickness direction of the connection portion 101*b* is the up-down direction. A bent portion is formed between the retained portion 101*a* and the connection portion 101*b*.

Movable Housing 30

The movable housing 30 is formed from an electrical insulator such as, for example, a synthetic resin.

Figure 17:
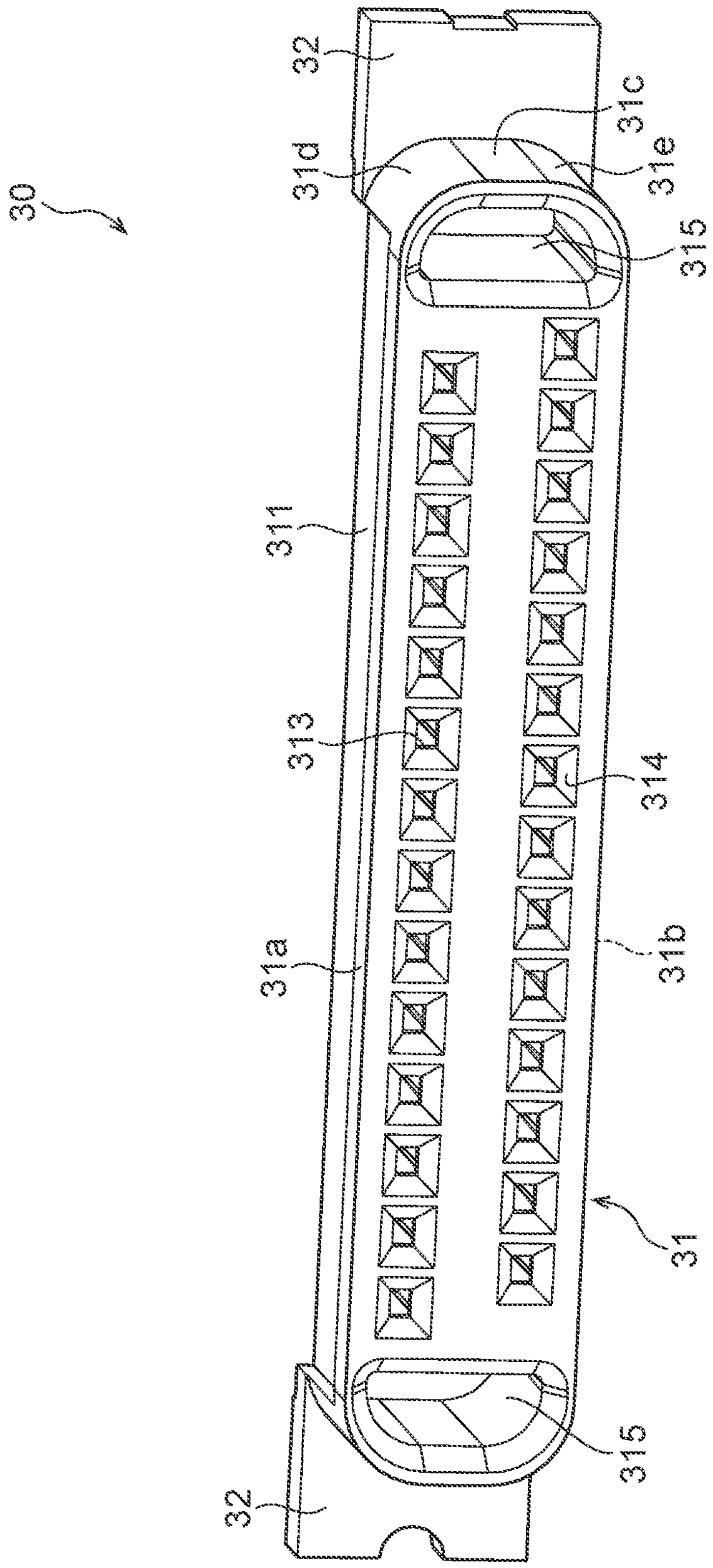
FIG. 17 is a perspective view of a movable housing.
Figure 18:
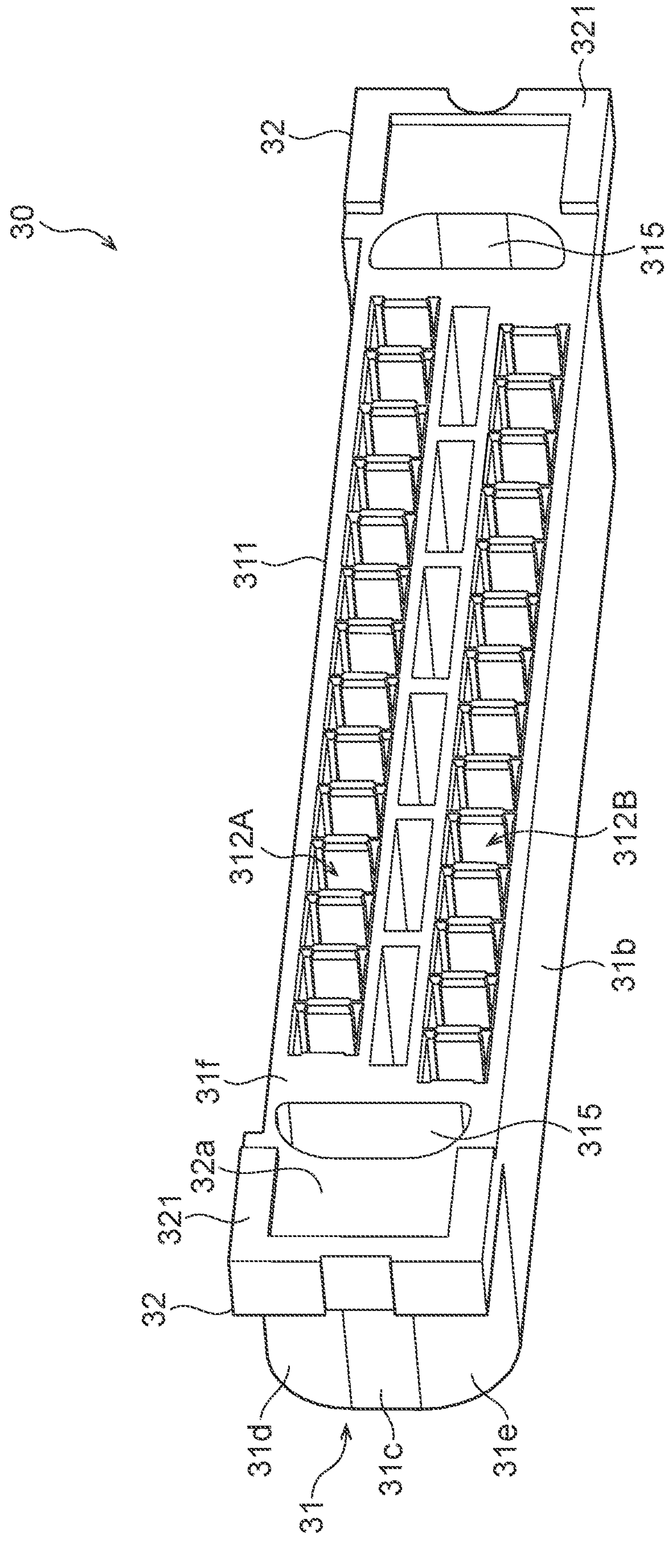
FIG. 18 is a perspective view of a movable housing as viewed from a different direction.

As illustrated in FIG. 17 and FIG. 18, the movable housing 30 includes a main body 31.

An upper face 31*a* of the main body 31 is a flat face with upward as the normal direction thereto.

A lower face 31*b* of the main body 31 is a flat face with downward as the normal direction thereto.

A pair of side faces 31*c* of the main body 31 are flat faces with the width direction outside as normal directions thereto. The pair of side faces 31*c* abut parts of the fixed housing 20 (specifically the front restricting walls 271) when the movable housing 30 moves in the width direction. The width direction movement range of the movable housing 30 is accordingly limited thereby.

Moreover, the main body 31 includes upper side curved faces 31*d* to connect the upper face 31*a* and the side faces 31*c* together, and lower side curved faces 31*e* to connect the lower face 31*b* and the side faces 31*c* together.

An upper face indentation 311 is formed to the main body 31. The upper face indentation 311 is indented so as to be recessed downward with respect to the upper face 31*a* of the main body 31. An indentation corresponding to the upper face indentation 311 is not formed on the lower face 31*b* side of the main body 31.

The main body 31 retains the plural terminals 40, 50 and add members 90.

More specifically, the main body 31 includes plural rearward-opening placement spaces 312A, 312B. Respective parts of the terminals 40, 50 and add members 90 are press-fitted into the placement spaces 312A, 312B from the rear side.

The plural placement spaces 312A, 312B include plural upper placement spaces 312A arranged in a row along the width direction, and plural lower placement spaces 312B also arranged in a row along the width direction. The displacing portions 44, 45 of the upper terminals 40 are arranged in the upper placement spaces 312A and the displacing portions 54, 55 of the lower terminal 50 are arranged in the lower placement spaces 312B. The plural placement spaces 312A, 312B have the same structure as each other, and so are simply called placement spaces 312 when not particular discriminating therebetween.

Figure 19:
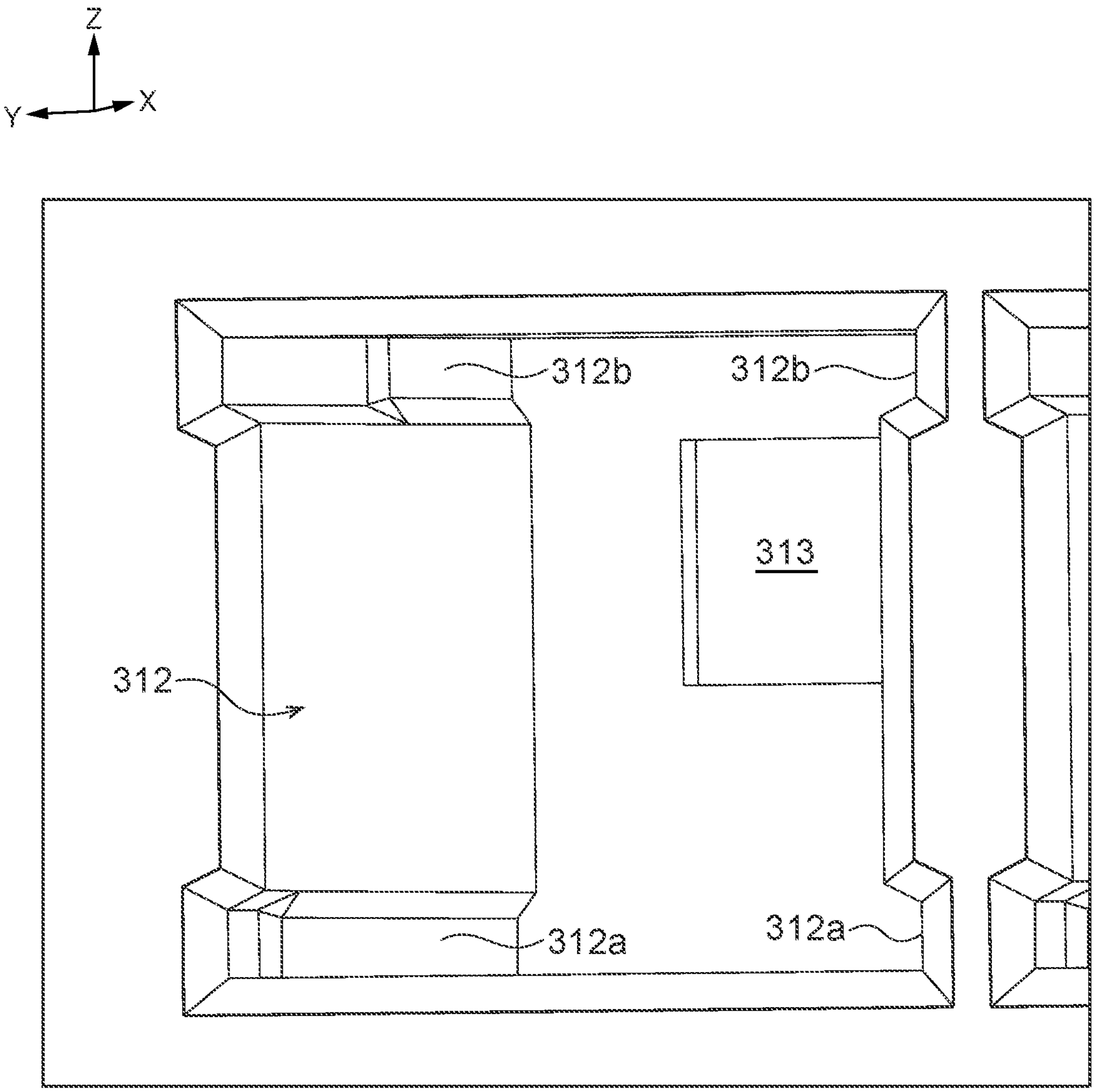
FIG. 19 is a diagram illustrating an enlargement of a placement space formed in a movable housing.

As illustrated in FIG. 19, the placement spaces 312 are each open to the front side through an insertion opening 313. The relay terminals 60, 70 of the relay connector 11 are pushed into the insertion openings 313 so as to contact the terminals 40, 50 at the inside of the placement spaces 312.

As illustrated in FIG. 17, guide surfaces 314 are formed at the front side of each of the insertion openings 313 to guide the relay terminals 60, 70 of the relay connector 11 toward the insertion openings 313.

As illustrated in FIG. 19, the placement spaces 312 are substantially cuboidal shaped spaces.

Terminal press-fit grooves 312*a* for press-fitting the moving-side retained portions 44, 54 of the terminals 40, 50 into are formed in the vicinity of a lower end of the placement spaces 312.

Add member press-fit grooves 312*b* for press-fitting the press-fit projections 92, 93 of the add members 90 into are formed in the vicinity of an upper end of the placement spaces 312.

A pair of positioning holes 315 are formed in the main body 31.

The pair of positioning holes 315 are holes for inserting a pair of positioning projections 86 (see FIG. 20) of the relay connector 11 into, and have a positioning function when connecting the inner connector 10 and the relay connector 11 together.

The pair of positioning holes 315 has a left-right symmetrical structure. The positioning holes 315 are positioned at the width direction outside with respect to the positions where the plural placement spaces 312A are formed. The positioning holes 315 penetrate through the main body 31 in the front-rear direction.

The movable housing 30 includes the pair of jutting out portions 32.

The pair of jutting out portions 32 are positioned at the width direction outside of the main body 31. The jutting out portions 32 are respectively arranged between the front restricting wall 271 and the rear restricting wall 272 of the restricting portion 27 of the fixed housing 20. The front-rear direction movement range of the movable housing 30 is limited thereby.

The jutting out portions 32 each have a plate shape with a plate thickness direction in the front-rear direction. A lower end of the jutting out portions 32 is positionally aligned in the up-down direction with the lower face 31*b* of the main body 31 and an upper end of the jutting out portions 32 is positionally aligned with the upper face 31*a* of the main body 31.

As illustrated in FIG. 18, a rear face 32*a* of the jutting out portions 32 is flush with a rear face 31*f* of the main body 31.

A rearward bulge portion 321 is formed to each of the jutting out portions 32 so as to bulge toward the rear side with respect to the rear face 32*a* of the jutting out portions 32. The rear ends of the jutting out portions 32 are accordingly positioned further rearward than the rear face 31*f* of the main body 31. The rearward bulge portions 321 are each formed at positions corresponding to an upper end portion, a lower end portion, and a width direction outside end portion of the respective jutting out portion 32.

Assembly Process

Figure 4:
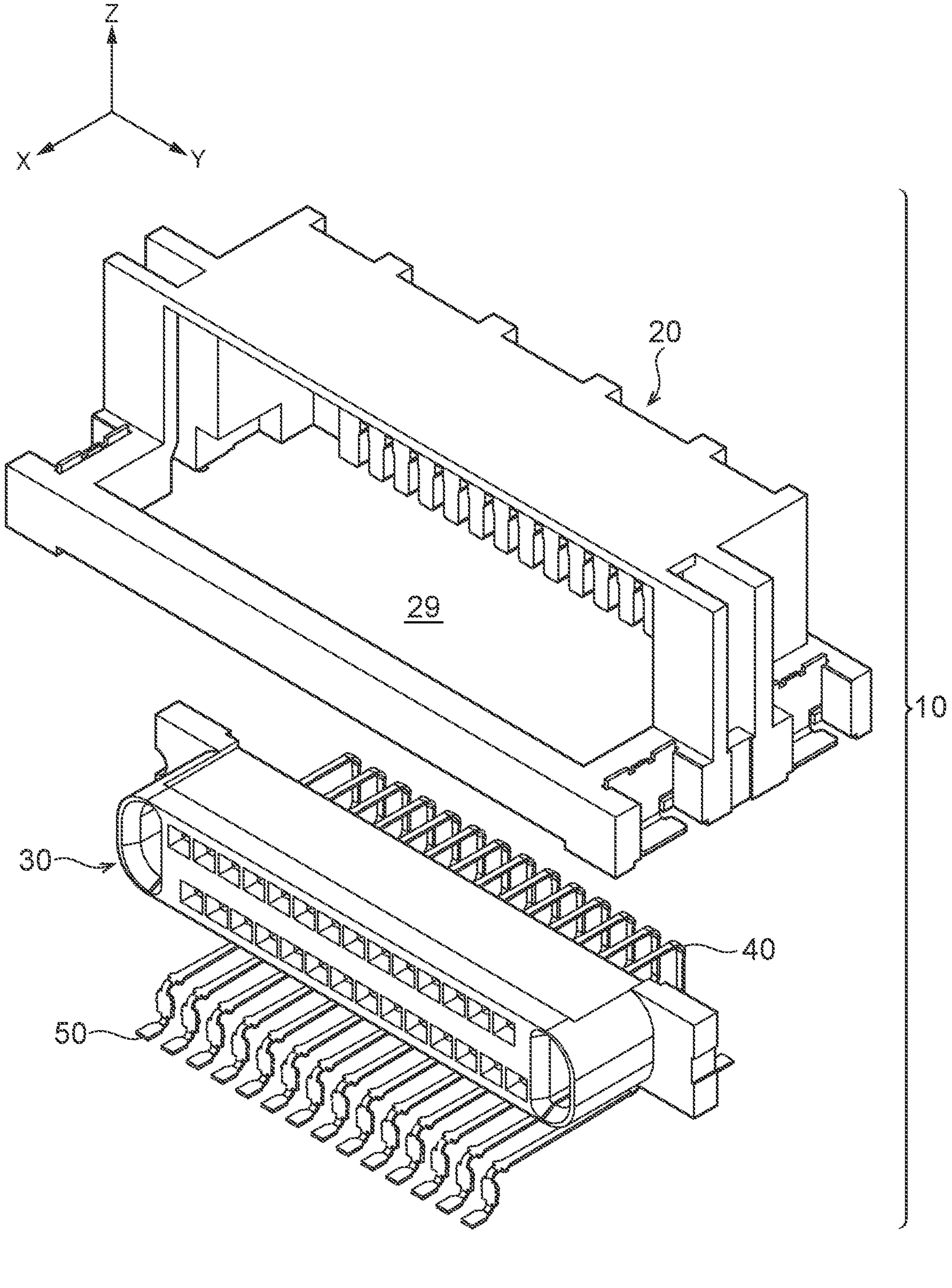
FIG. 4 is a perspective view illustrating a state partway through assembly of an inner connector.

In an assembly process of the inner connector 10, prior to the plural terminals 40, 50 being press-fitted into the fixed housing 20, the plural terminals 40, 50 and the plural add members 90 are press-fitted into the movable housing 30 (see FIG. 4). The movable housing 30, with the plural terminals 40, 50 and the plural add members 90 press-fitted therein, is then assembled to the fixed housing 20 from below, and the plural terminals 40, 50 are press-fitted into the fixed housing 20. When doing so the movable housing 30 passes through the through-pass space 29 of the fixed housing 20 in the up-down direction (see FIG. 5).

Relay Connector 11

Description now follows regarding the relay connector 11.

The relay connector 11 includes plural relay terminals 60A, 60B, 70A, 70B (see FIG. 22) and a relay housing 80.

Plural Relay Terminals 60A, 60B, 70A, 70B

The plural relay terminals 60A, 60B, 70A, 70B are for electrically connecting the terminals 40, 50 of the inner connector 10 (hereafter referred to as inner terminals 40, 50) to an external connection target (not illustrated in the drawings) external to the case 13.

In the following description the front side that is the direction toward the external connection target in the front-rear direction is called the "external side", and the rear side that is the direction toward the inner connector 10 in the front-rear direction is called the "inner side".

Figure 22:
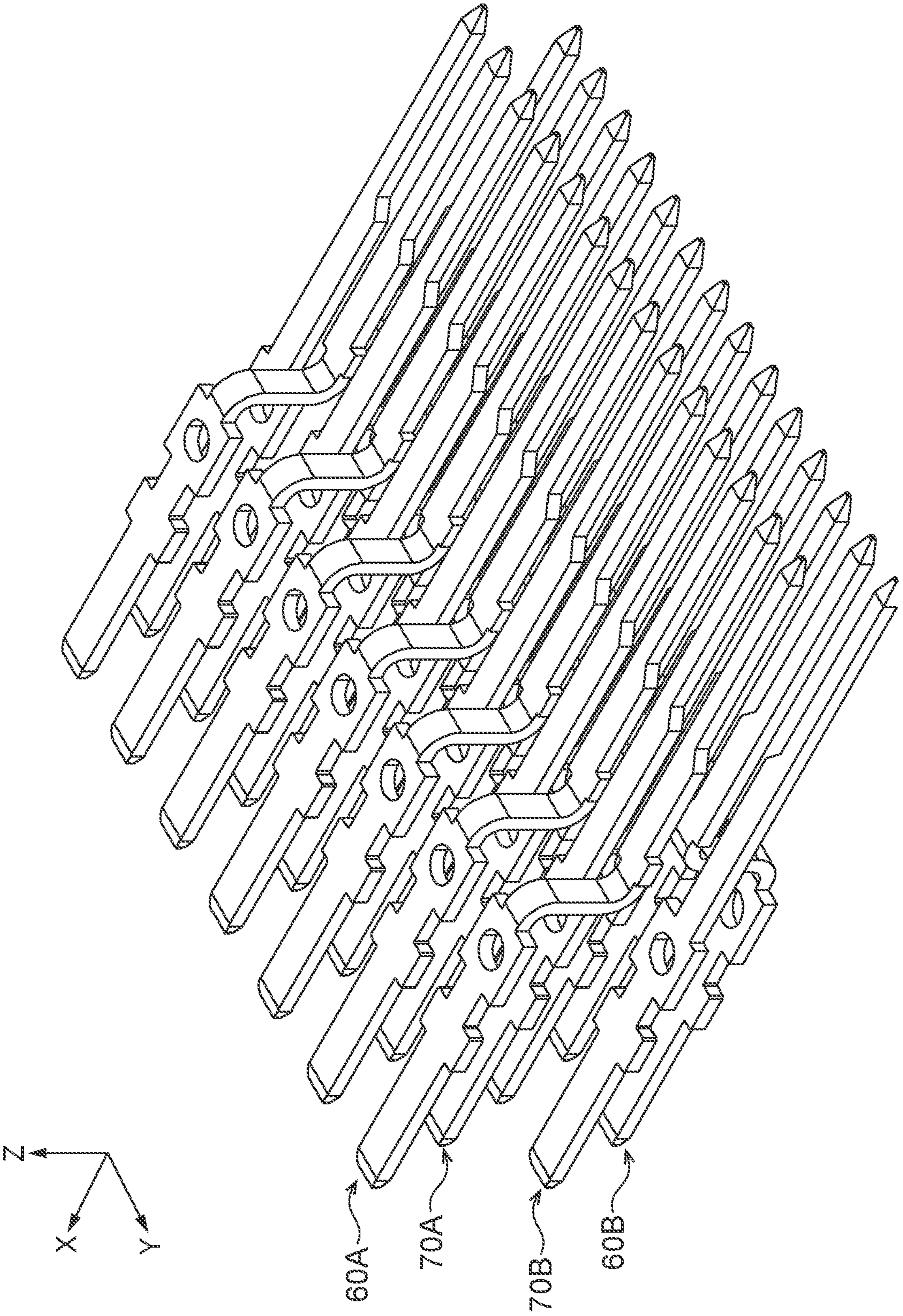
FIG. 22 is a perspective view of plural relay terminals.

As illustrated in FIG. 22, the plural relay terminals 60A, 60B, 70A, 70B include plural first relay terminals 60A, plural second relay terminals 70A, plural third relay terminals 60B, and plural fourth relay terminals 70B.

The plural first relay terminals 60A are of the same structure as each other, the plural second relay terminals 70A are of the same structure as each other, the plural third relay terminals 60B are of the same structure as each other, and the plural fourth relay terminals 70B are of the same structure as each other.

The first relay terminals 60A and the third relay terminals 60B are of the same structure as each other. However, the third relay terminals 60B differ from the first relay terminals 60A in placement orientation, with the third relay terminals 60B being arranged at an orientation rotated by 180° with respect to the orientation of the first relay terminals 60A about an axis running along the front-rear direction.

The second relay terminals 70A and the fourth relay terminals 70B are of the same structure as each other. However, the fourth relay terminals 70B differ from the second relay terminals 70A in placement orientation, with the fourth relay terminals 70B being arranged at an orientation rotated by 180° with respect to the orientation of the second relay terminals 70A about an axis running along the front-rear direction.

The first relay terminals 60A and the third relay terminals 60B have different structures to the second relay terminals 70A and the fourth relay terminals 70B.

Thus there are two types of terminal having different structures to each other employed for the plural relay terminals 60A, 60B, 70A, 70B.

Relay Terminal 60, 70 Structure

The relay terminals with the structure of the first relay terminals 60A and the third relay terminals 60B are called first structure relay terminals 60, and the relay terminals with the structure of the second relay terminals 70A and the fourth relay terminals 70B are called second structure relay terminals 70.

Figure 27:
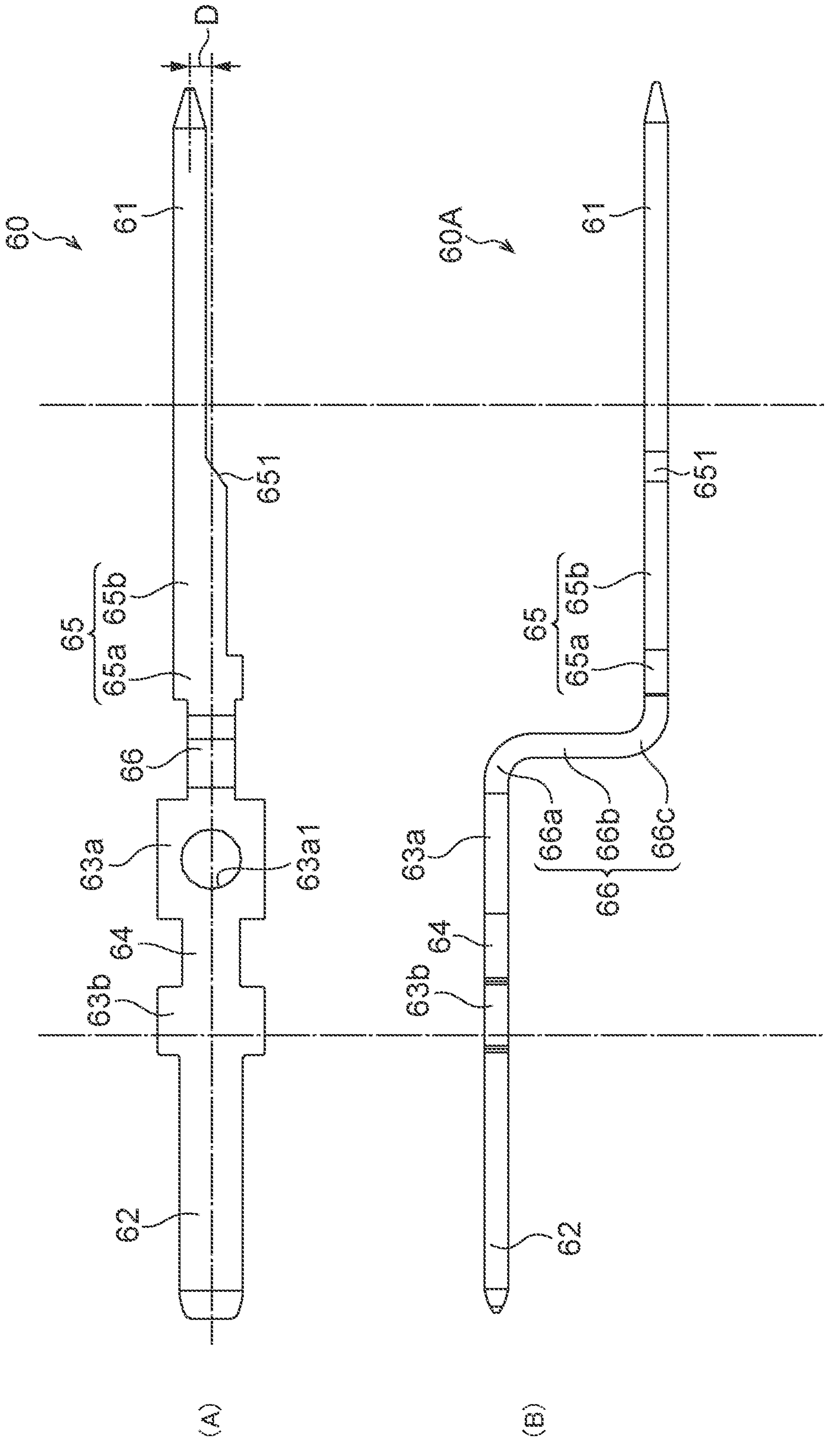
FIG. 27 is a plan view and a side view of a first structure relay terminal.
Figure 28:
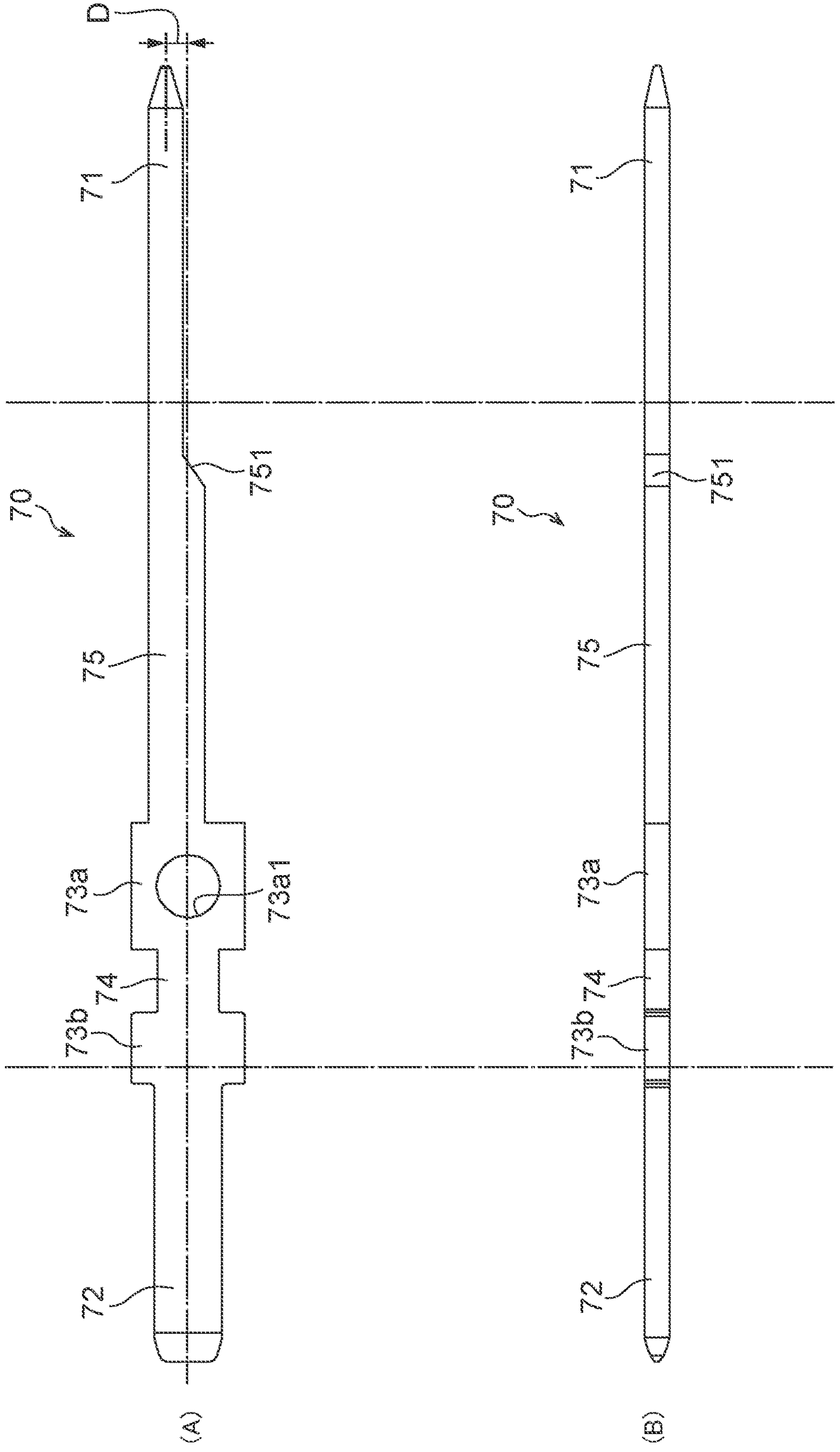
FIG. 28 is a plan view and a side view of a second structure relay terminal.

As illustrated in FIG. 27 and FIG. 28, the first structure relay terminals 60 and the second structure relay terminals 70 both include inner-side contact portions 61, 71 for contacting the inner terminals 40, 50, and external-side contact portions 62, 72 for contacting the external connection target.

The inner-side contact portions 61 and the external-side contact portions 62 of the first structure relay terminals 60 are formed at different positions from each other in the up-down direction. The first structure relay terminals 60 each include a crank portion 66 formed between the inner-side contact portions 61 and the external-side contact portions 62. The crank portion 66 includes an external-side bent portion 66*a*, an up-down extending portion 66*b*, and an inner-side bent portion 66*c*. The crank portion 66 has a plate width smaller than adjacent portions. This accordingly facilitates forming the crank portion 66 including the bent portions (the external-side bent portion 66*a* and the inner-side bent portion 66*c*).

The inner-side contact portions 71 and the external-side contact portions 72 of the second structure relay terminals 70 are formed at the same position as each other in the up-down direction. The second structure relay terminals 70 do not include a crank portion. The second structure relay terminals 70 are easy to manufacture due to not including any bent portions.

The inner-side contact portions 61, 71 and the external-side contact portions 62, 72 in the first structure relay terminals 60 and the second structure relay terminals 70 are formed at different positions from each other in the width direction. More specifically, the inner-side contact portions 61, 71 and the external-side contact portions 62, 72 have positions displaced from each other by a distance D in the width direction.

Note that when referring to positions in the width direction of the inner-side contact portions 61, 71 and the external-side contact portions 62, 72 etc., the positions are with reference to a center axis of the inner-side contact portions 61, 71 etc.

The first structure relay terminals 60 and the second structure relay terminals 70 include first wide-width portions 63*a*, 73*a* and second wide-width portions 63*b*, 73*b*.

The first wide-width portions 63*a*, 73*a* have a plate width greater than adjacent portions and have a rectangular shape. Through holes 63*a*1, 73*a*1 are formed so as to penetrate through the first wide-width portions 63*a*, 73*a* in the up-down direction, which is the plate thickness direction. The through holes 63*a*1, 73*a*1 are circular shaped. A resin configuring the relay housing 80 is filled inside the through holes 63*a*1.

The second wide-width portions 63*b*, 73*b* have a plate width dimension greater than adjacent portions and have a rectangular shape.

The second wide-width portions 63*b*, 73*b* are positioned further to the external side than the first wide-width portions 63*a*, 73*a*.

In the first structure relay terminals 60, the first wide-width portions 63*a* and the second wide-width portions 63*b* are positioned further to the external side than the crank portion 66.

A part of the first structure relay terminals 60 further to the inner side than the first wide-width portions 63*a* is called an inner-side portion 66, 65, 61, and a part thereof further to the external side than the first wide-width portions 63*a* is called an external-side portion 64, 63, 62.

A part of the second structure relay terminals 70 further to the inner-side than the first wide-width portions 73*a* is called an inner-side portion 75, 71, and a part thereof further to the external side than the first wide-width portions 73*a* is called an external-side portion 74, 73*b*, 72.

The inner-side portions 66, 65, 61 of the first structure relay terminals 60 each include the crank portion 66, a base-end-side wide-width portion 65, and a leading-end-side narrow-width portion 61. The leading-end-side narrow-width portions 61 are the inner-side contact portions 61. The base-end-side wide-width portions 65 each include a first base-end-side wide-width portion 65*a* and a second base-end-side wide-width portion 65*b*.

The crank portions 66 are each aligned in width direction position with the first wide-width portion 63*a* and the external-side portion 64, 63*b*, 62.

The first base-end-side wide-width portion 65*a* has a greater width dimension than the second base-end-side wide-width portion 65*b* and the leading-end-side narrow-width portion 61, with the second base-end-side wide-width portion 65*b* having a greater width dimension than the leading-end-side narrow-width portion 61.

The base-end-side wide-width portions 65 and the leading-end-side narrow-width portions 61 have ends at a width direction one-side (the upper side in FIG. 27) that are positionally aligned in the width direction, and ends at a width direction other-side that are disposed at different width direction positions.

Thus the first base-end-side wide-width portion 65*a*, the second base-end-side wide-width portion 65*b*, and the leading-end-side narrow-width portions 61 are disposed at different width direction positions. The leading-end-side narrow-width portion 61 is positioned further to the width direction one-side than the first base-end-side wide-width portion 65*a* and the second base-end-side wide-width portion 65*b*, with the second base-end-side wide-width portion 65*b* positioned further to the width direction one-side than the first base-end-side wide-width portion 65*a*.

An inclined plate edge 651 inclined toward the width direction inside on progression toward the inner side (rearward direction side) is formed at the width direction other-side end of the base-end-side wide-width portion 65 in the vicinity of the inner-side end thereof.

In the inner-side portion 66, 65, 61, only part of the leading-end-side narrow-width portion 61 is exposed from the relay housing 80.

Note that the two single-dot broken lines extending up/down in FIG. 27 and FIG. 28 indicate boundaries between a part embedded within the relay housing 80 and parts exposed therefrom. The part between the two single-dot broken lines is the part embedded in the relay housing 80, and the other parts are parts exposed therefrom The inner-side portions 75, 71 of the second structure relay terminals 70 each include a base-end-side wide-width portion 75 and a leading-end-side narrow-width portion 71. Note that the leading-end-side narrow-width portions 71 are the inner-side contact portions 71.

The base-end-side wide-width portions 75 have a greater width dimension than the leading-end-side narrow-width portions 71.

The base-end-side wide-width portions 75 and the leading-end-side narrow-width portions 71 have ends on the width direction one-side (the upper side in FIG. 28) that are positionally aligned with each other in the width direction, and ends on the width direction other-side that are disposed at different positions in the width direction.

The base-end-side wide-width portion 75 is positioned further to the width direction one-side than the first wide-width portions 73*a* and the external-side portion 74, 73*b*, 72.

An inclined plate edge 751 inclined toward the width direction inside on progression toward the inner side is formed to the width direction other-side end of the base-end-side wide-width portion 75 in the vicinity of the inner-side end thereof.

In the inner-side portion 75, 71 of the second structure relay terminal 70, only part of the leading-end-side narrow-width portion 71 is exposed from the relay housing 80.

The external-side portion 64, 63*b*, 62 of each of the first structure relay terminals 60 includes a base-end-side portion 64, a second wide-width portion 63*b*, and a leading-end-side portion 62. Note that the leading-end-side portions 62 are the external-side contact portions 62.

The base-end-side portions 64, the second wide-width portions 63*b*, and the leading-end-side portions 62 are positionally aligned with each other in the width direction. Moreover, the external-side portion 64, 63*b*, 62 is positionally aligned with the first wide-width portion 63*a* in the width direction.

The second wide-width portion 63*b* has a greater width dimension than the base-end-side portion 64 and the leading-end-side portion 62, with the leading-end-side portion 62 having a slightly greater width dimension than the base-end-side portion 64.

Each of the external-side portions 74, 73*b*, 72 of the second structure relay terminals 70 includes a base-end-side portion 74, a second wide-width portions 73*b*, and a leading-end-side portions 72. Note that the leading-end-side portions 72 are the external-side contact portions 72.

The base-end-side portion 74, the second wide-width portion 73*b*, and the leading-end-side portion 72 are positionally aligned with each other in the width direction. Moreover, the external-side portion 74, 73*b*, 72 is positionally aligned with the first wide-width portion 73*a* in the width direction.

The second wide-width portion 73*b* has a greater width dimension than the base-end-side portion 74 and the leading-end-side portion 72, with the leading-end-side portion 72 having a slightly greater width dimension than the base-end-side portion 74.

The base-end-side portion 64 of the first structure relay terminal 60 is slightly longer than the base-end-side portion 74 of the second structure relay terminal 70. The first wide-width portion 63*a* of the first structure relay terminal 60 is accordingly positioned slightly further toward the inner side (rear side) than the first wide-width portion 73*a* of the second structure relay terminal 70.

Relay Terminal 60, 70 Arrangement

Figure 24:
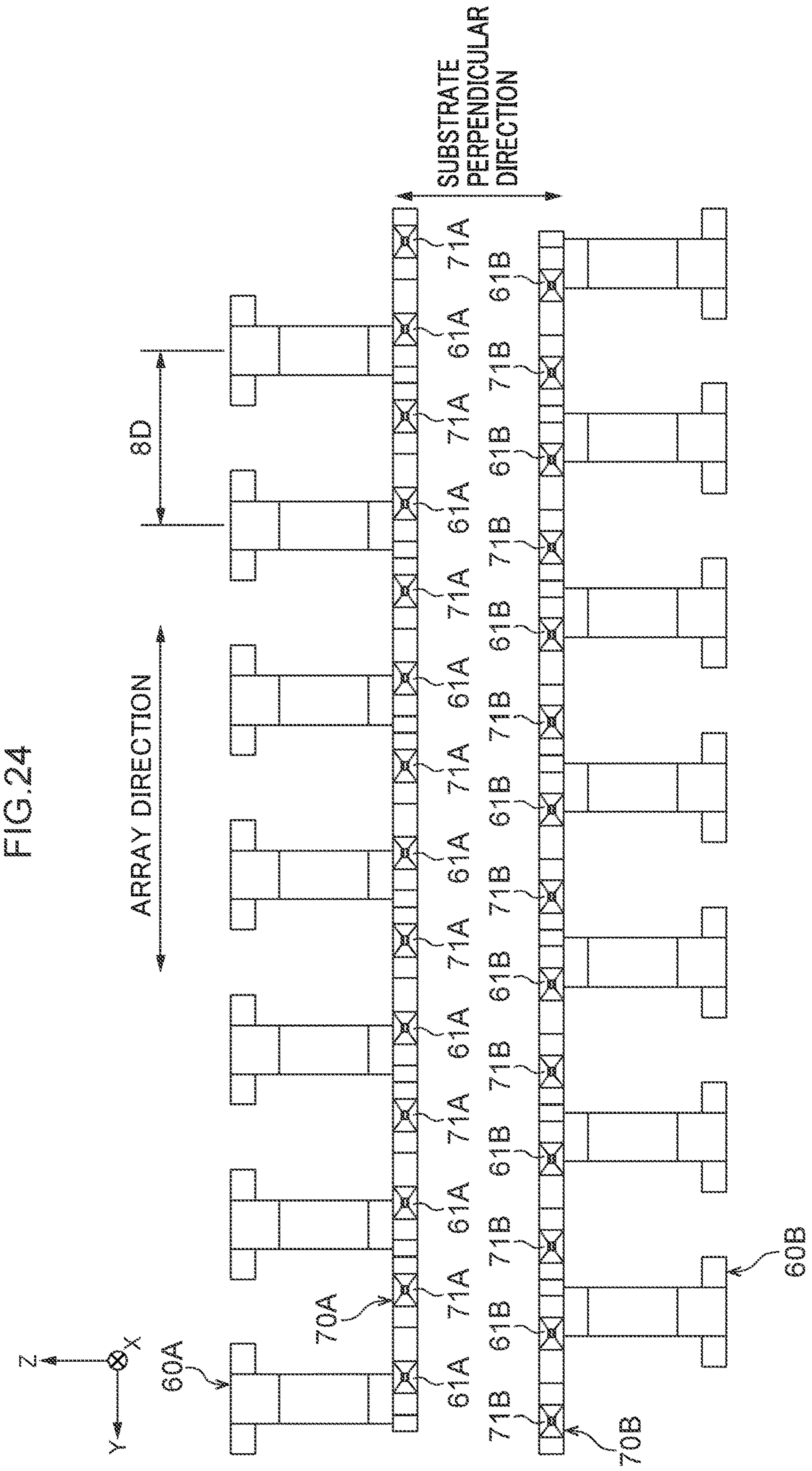
FIG. 24 is a rear-face view of plural relay terminals.

As illustrated in FIG. 24, first inner-side contact portions 61A and second inner-side contact portions 71A are arranged at the same position in the up-down direction. Third inner-side contact portions 61B and fourth inner-side contact portions 71B are arranged at the same position in the up-down direction.

Figure 23:
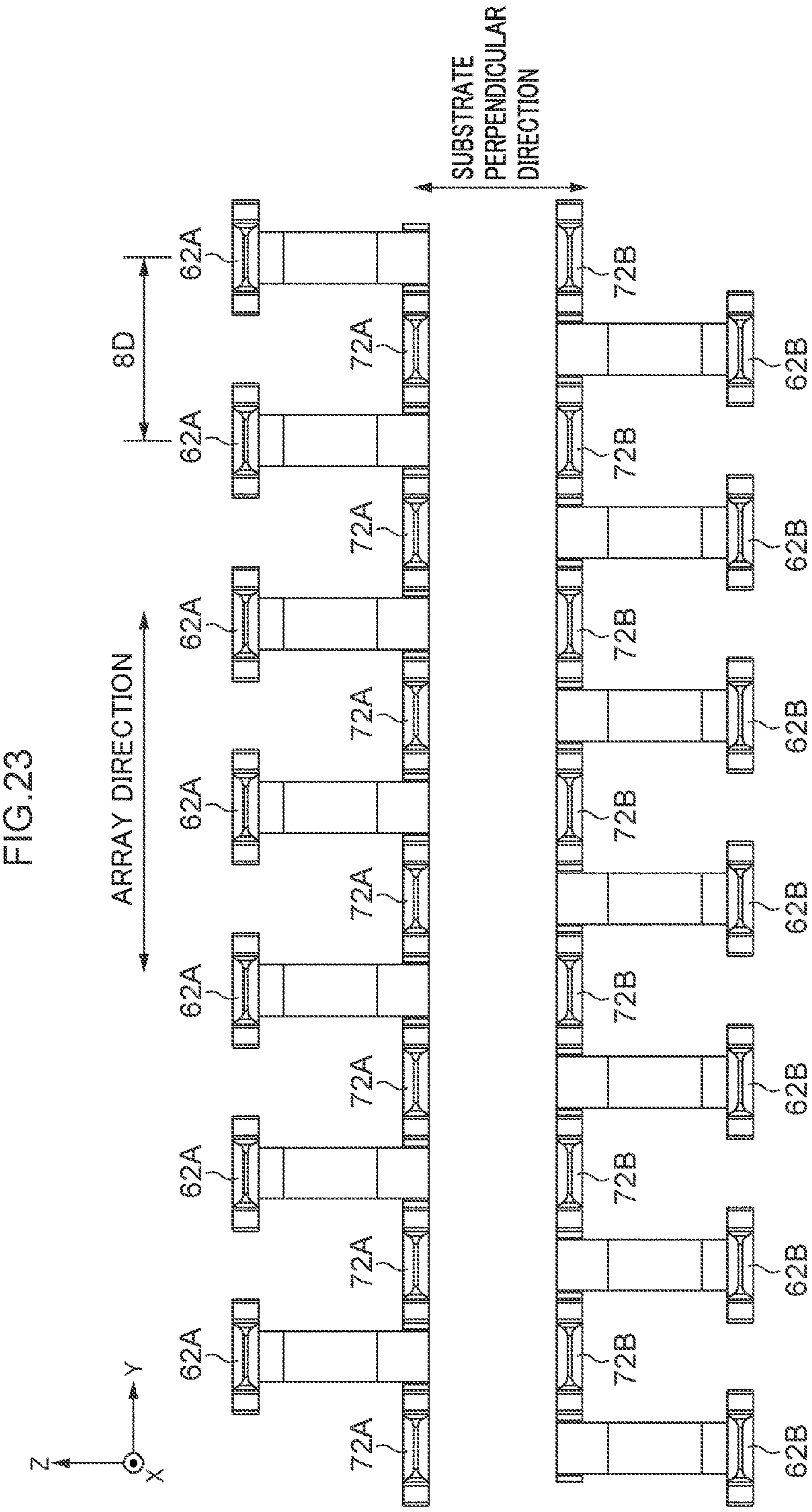
FIG. 23 is a front-face view of plural relay terminals.

As illustrated in FIG. 23, first external-side contact portions 62A, second external-side contact portions 72A, third external-side contact portions 62B, and fourth external-side contact portions 72B are arranged at different positions in the up-down direction.

The plural first external-side contact portions 62A are arrayed at a specific interval 8D along the width direction.

The plural second external-side contact portions 72A are also arrayed at the specific interval 8D along the width direction.

The plural third external-side contact portions 62B are also arrayed at the specific interval 8D along the width direction.

The plural fourth external-side contact portions 72B are also arrayed at the specific interval 8D along the width direction.

The plural first external-side contact portions 62A and the plural fourth external-side contact portions 72B are positioned aligned with each other in the width direction.

The plural second external-side contact portions 72A and the plural third external-side contact portions 62B are positioned aligned with each other in the width direction.

As illustrated in FIG. 27 and FIG. 28, in both the first structure relay terminals 60 and the second structure relay terminals 70, the external-side contact portions 62, 72 are formed with width direction positions misaligned by distance D from the inner-side contact portions 61, 71. The first relay terminals 60A and the fourth relay terminals 70B are arranged such that their misalignment directions are oriented in opposite directions to each other (up-down inverted orientations). Thus, the width direction positions of the first external-side contact portions 62A and the fourth external-side contact portions 72B are aligned with the first relay terminals 60A and the fourth relay terminals 70B, and the first inner-side contact portions 61A and the fourth inner-side contact portions 71B have width direction positions misaligned from each other by distance 2D. Similar relationships also apply to the second relay terminals 70A and the third relay terminals 60B.

Figure 25:
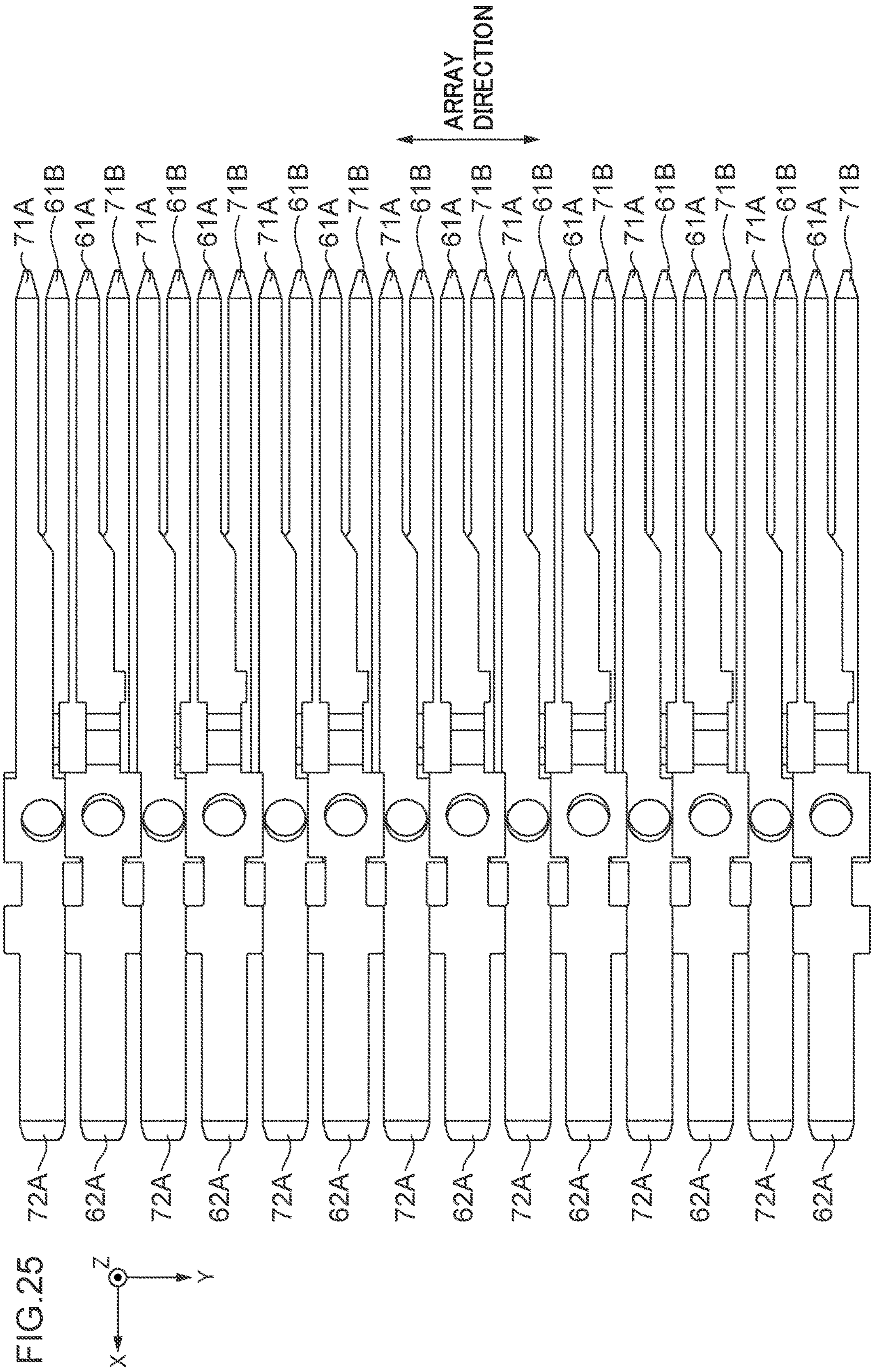
FIG. 25 is a plan view of plural relay terminals.
Figure 26:
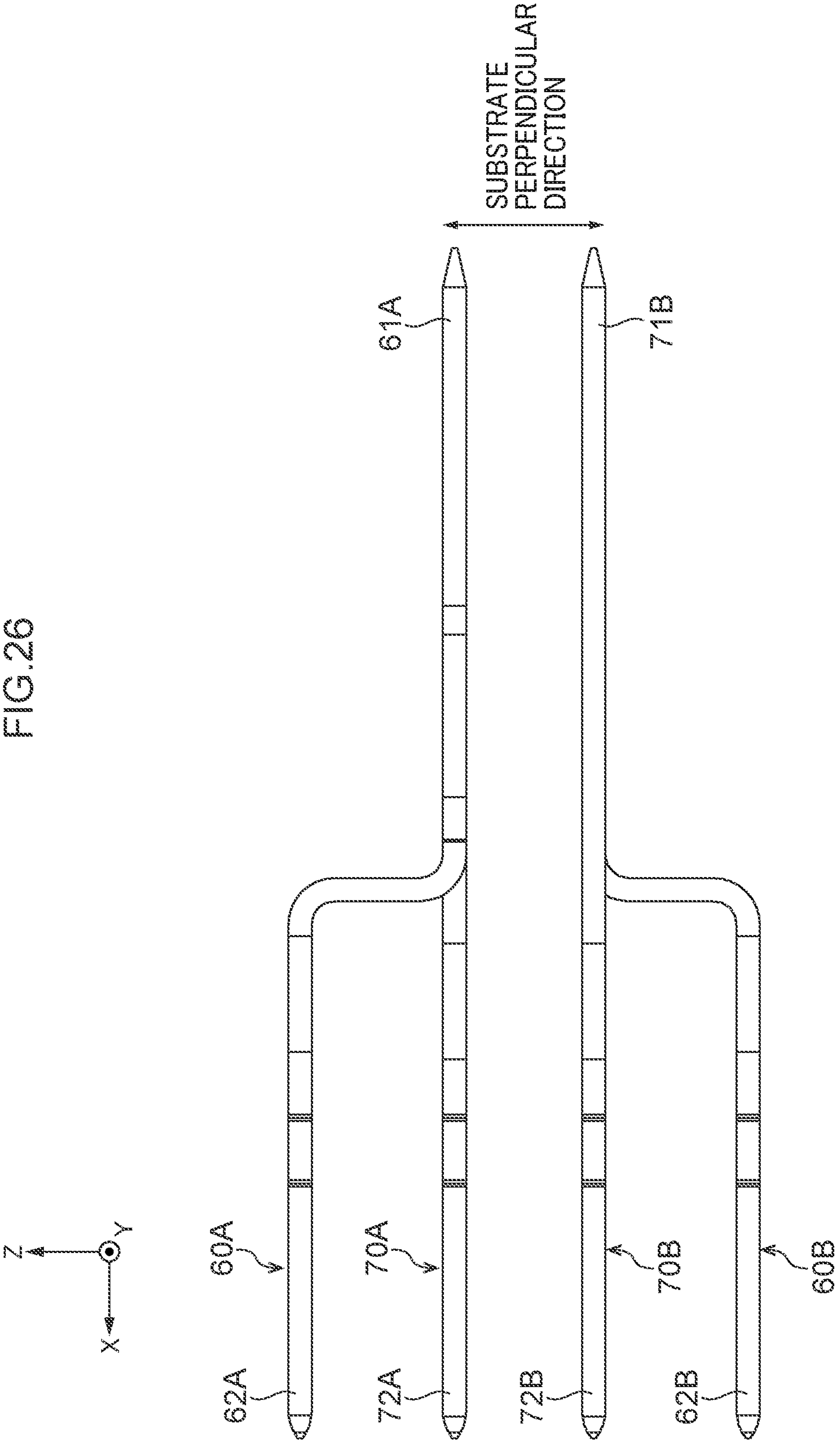
FIG. 26 is a side view of plural relay terminals.

Thus, as illustrated in FIG. 24 and FIG. 25, the plural first inner-side contact portions 61A, the plural fourth inner-side contact portions 71B, the plural second inner-side contact portions 71A and the plural third inner-side contact portions 61B do not coincide with each other with respect to the positions thereof in the width direction.

Relay Housing 80

The relay housing 80 is formed from an electrical insulator such as a synthetic resin. More specifically, the relay housing 80 is produced by insert molding, using the plural relay terminals 60A, 60B, 70A, 70B as insert components.

Figure 20:
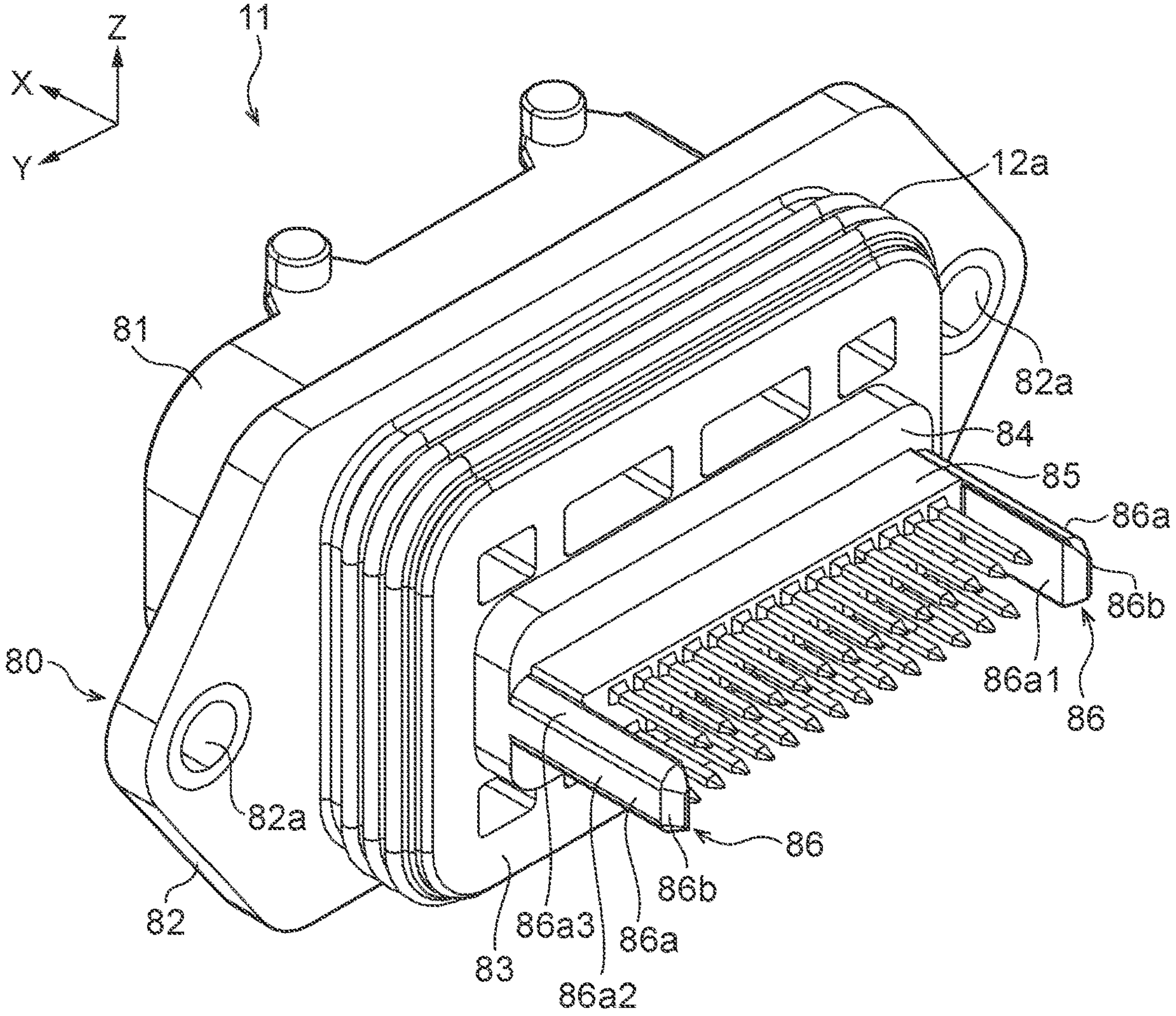
FIG. 20 is a perspective view of a relay connector.
Figure 21:
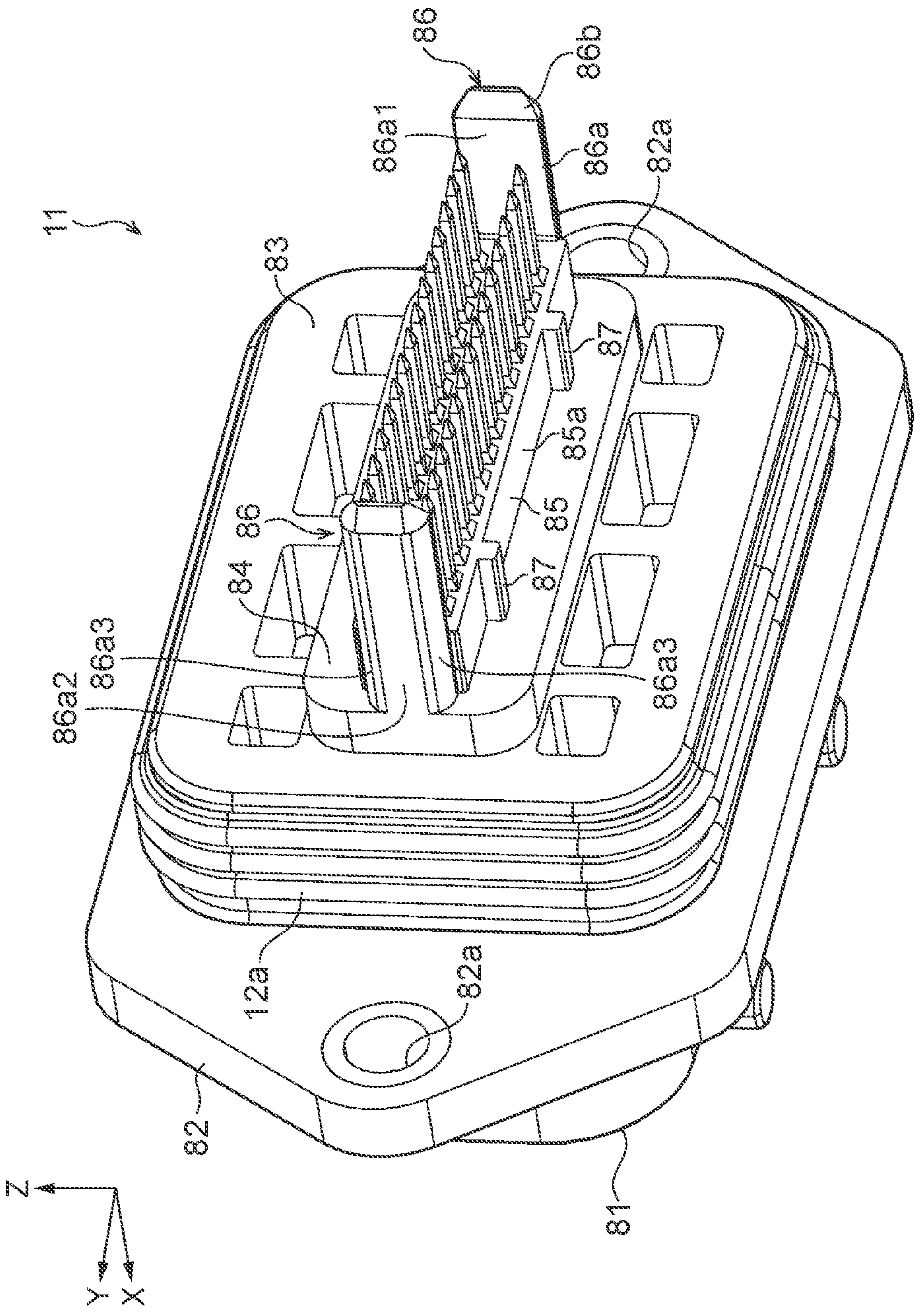
FIG. 21 is a perspective view of a relay connector as viewed from a different direction.

The relay housing 80 includes a fitting portion 81 for fitting together with the external connection target (see FIG. 20 and FIG. 21).

The fitting portion 81 is formed in a tube shape. The tube shaped fitting portion 81 has a substantially rectangular shape when viewed from the front side. The external-side contact portions 62, 72 respectively included in the plural relay terminals 60, 70 are arranged at the inside of the tube shaped fitting portion 81.

The relay housing 80 includes a flange 82.

The flange 82 is disposed at the outside of the case 13 and at a periphery of the opening 13*a* of the case 13. Bolt-insertion through holes 82*a* are formed in the flange 82. There are two of the bolt-insertion through holes 82*a* formed. The two bolt-insertion through holes 82*a* are positioned at the width direction one-side and the width direction other-side of the fitting portion 81. The up-down direction position of the two bolt-insertion through holes 82*a* is aligned with an up-down direction center position of the fitting portion 81.

The relay housing 80 includes an opening placement portion 83 arranged inside the opening 13*a* of the case 13.

The opening placement portion 83 has a shape substantially similar to that of the opening 13*a*. A seal member 12*a* is mounted to a peripheral face of the opening placement portion 83.

The relay housing 80 also includes a base portion 84.

The base portion 84 is a portion that juts out from the opening placement portion 83 toward the inner side. The base portion 84 has a substantially rectangular shape when viewed along the front-rear direction. The width dimension and the up-down dimension of the base portion 84 are smaller than the width dimension and the up-down dimension of the opening placement portion 83.

The relay housing 80 also includes a terminal projection portion 85.

The terminal projection portion 85 is a portion that projects out from the base portion 84 toward the inner side. The terminal projection portion 85 has a substantially rectangular shape when viewed along the front-rear direction. The width dimension and up-down dimension of the terminal projection portion 85 are smaller than the width dimension and up-down dimension of the base portion 84. The plural relay terminals 60A, 60B, 70A, 70B project out from a rear face of the terminal projection portion 85 toward the inner side.

The relay housing 80 includes two positioning projections 86.

The two positioning projections 86 each project out from the base portion 84 toward the inner side. When connecting connectors together, leading ends of the two positioning projections 86 reach the positioning holes 315 of the movable housing 30 before the relay terminals 60, 70 reach the insertion openings 313 of the inner connector 10.

The two positioning projections 86 are positioned at the width direction outside of the terminal projection portion 85. A vicinity of the root of each of the two positioning projections 86 is integrated together with the terminal projection portion 85.

Width direction outside faces 86*a*2 of the positioning projections 86 are flush with respective width direction outside faces of the base portion 84.

The up-down dimension of each of the positioning projections 86 is a size enabling the inner-side contact portions 61, 71 of the plural relay terminals 60, 70 to be obscured when viewed from the side. The up-down dimension of the positioning projections 86 is smaller than the up-down dimension of the terminal projection portion 85.

The positioning projections 86 each include a general portion 86*a* and a leading end portion 86*b*. The general portion 86*a* has a constant cross-portion profile irrespective of position on the extension direction of the positioning projection 86 (i.e. the front-rear direction). The leading end portion 86*b* does not have a constant cross-portion profile along the positioning projection 86 extension direction (front-rear direction), and instead has a cross-portion that gets smaller on progression toward the leading end side (i.e. the inner-side). This facilitates insertion of the positioning projections 86 into the positioning holes 315. During insertion, the positioning projections 86 abut the inside of the positioning holes 315 of the movable housing 30 even in cases in which there is some YZ direction positional misalignment between the relay connector 11 and the inner connector 10, enabling the movable housing 30 to be displaced thereby.

The general portion 86*a* of each of the positioning projections 86 includes a width direction inside face 86*a*1, a width direction outside face 86*a*2, and up-down pairs of curved faces 86*a*3. The width direction inside face 86*a*1 has an up-down dimension larger than the width direction outside face 86*a*2.

A leading end of each of the positioning projections 86 is positioned further toward the inner side (rear side) than the leading end of the relay terminals 60, 70 (the leading end of the inner-side contact portions 61, 71). The inner-side contact portions 61, 71 of the relay terminals 60, 70 are thereby obscured and appropriately protected by the positioning projections 86 when viewed from the side, and in an embodiment in which the positioning holes 315 and the insertion openings 313 are formed at the same position in the front-rear direction, a leading end of the relay terminals 60, 70 can be appropriately prevented from colliding with the movable housing 30.

Note that even in cases in which the positioning projections 86 have been omitted, the leading ends of the relay terminals 60, 70 can be made to abut the guide surfaces 314 of the movable housing 30, enabling the movable housing 30 to be displaced.

The relay housing 80 also includes downward abutting protrusions 87. The downward abutting protrusions 87 are portions that abut the front frame portion 21 (a displacement restricting portion 21) of the inner connector 10 when the relay connector 11 is displaced downward in a fitted together state or in a state partway through fitting together. There are plural (two) of the downward abutting protrusions 87 provided. The plural downward abutting protrusion 87 are provided so as to be disposed symmetrically with respect to a width direction center of the relay connector 11.

The downward abutting protrusions 87 project downward from a lower face (opposing lower face) of the terminal projection portion 85. The downward abutting protrusions 87 each have a shape elongated along the front-rear direction. A front end of each of the downward abutting protrusions 87 is connected to the base portion 84. A rear end of the downward abutting protrusion 87 is positionally aligned in the front-rear direction with a rear face of the terminal projection portion 85.

Operation and Advantageous Effects

First Perspective

Next, description follows regarding the operation and advantageous effects of the present exemplary embodiment, from a first perspective.

Figure 8:
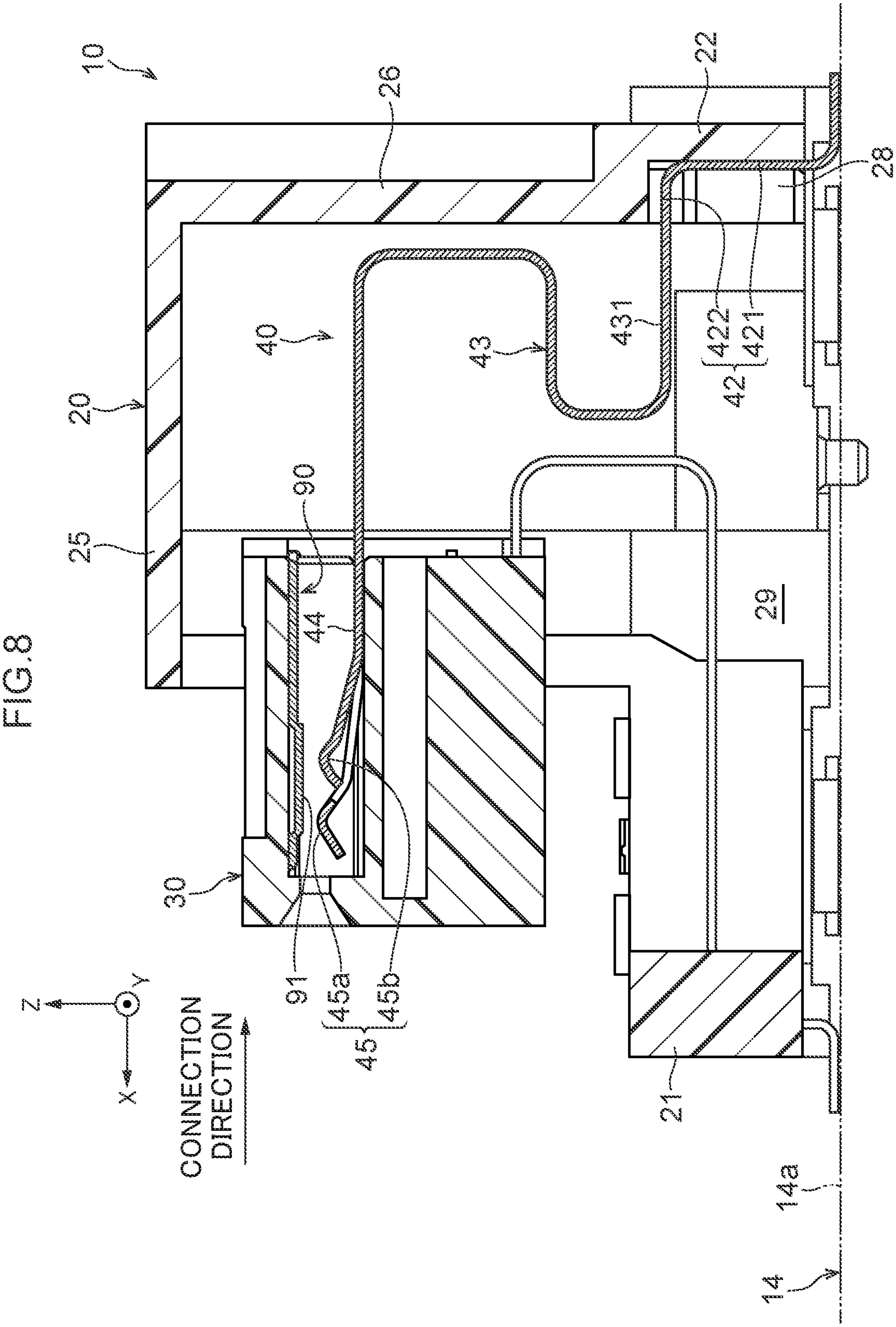
FIG. 8 is a cross-portion taken along line 8-8 of FIG. 6.

As illustrated in FIG. 7 and FIG. 8, the inner connector 10 of the present exemplary embodiment includes the terminals 40, 50, and the movable housing 30 capable of displacing with respect to the mounting target 14. The terminals 40, 50 include the displacing portions 44, 45, 54, 55 that displace together with the movable housing 30. The displacing portions 44, 45, 54, 55 include the one-side contact portions 45, 55 that make contact with the connection target 11 (specifically with the relay terminals 60, 70, see FIG. 30 to FIG. 33) from the one-side (the lower side in the present exemplary embodiment).

The inner connector 10 also includes the add members 90 formed as separate bodies to the terminals 40, 50 and retained in the movable housing 30. The add members 90 include the other-side contact portions 91 that contact the connection target 11 from the other-side (the upper side in the present exemplary embodiment). A creep phenomenon is accordingly suppressed from occurring in the movable housing 30 due to the movable housing 30 being configured so as not to be directly pressed by the connection target 11.

Moreover, the add members 90 are formed as separate bodies to the terminals 40, 50 and so there is no need for a coupling portion to couple the one-side contact portions 45, 55 and the other-side contact portions 91 together as a single body, thereby enabling the movable portions of the inner connector 10 (i.e. the movable housing 30 and the displacing portions 44, 45, 54, 55, etc.) to be made lighter in weight by a corresponding amount.

The present exemplary embodiment is accordingly able, in a floating connector, to raise the resonance frequency of the connector while also suppressing a creep phenomenon from occurring in the movable housing 30.

The add members 90 in the present exemplary embodiment do not include a portion to connect to the mounting target 14, nor a portion between such a portion and the other-side contact portions 91. There is accordingly no need to provide the add members 90 with such a portion nor with a portion between such a portion and the other-side contact portions 91, enabling the inner connector 10 to be made more compact than embodiments in which the add members 90 include such portions.

Moreover, the add members 90 in the present exemplary embodiment do not have a structure for electrically connecting to the terminals 40, 50, enabling the inner connector 10 to be made more compact or lighter in weight than a connector having such a structure.

Moreover, the add members 90 in the present exemplary embodiment are preferably configured from a material having a lighter specific weight than the terminals 40, 50. In such cases the movable portions of the inner connector 10 can be made lighter in weight.

The add members 90 in the present exemplary embodiment are preferably configured from a stainless steel, an aluminum alloy, a titanium alloy, or a nickel alloy. In such cases the surfaces of the add members 90 can be protected by a passive film and do not readily corrode even without performing significant plating processing or even without performing any plating processing on the add members 90. This accordingly enables the inner connector 10 to be manufactured cheaply.

A case might be considered in which the movable housing 30 is configured by two or more members formed as separate bodies to each other, a member to retain the add members 90 and a separate member to retain the displacing portions 44, 45, 54, 55 of the terminals 40, 50. However, in such a configuration the structure becomes more complicated for the movable housing 30.

In the present exemplary embodiment, within the movable housing 30 the portion to retain the add members 90 and the portion to retain the displacing portions 44, 45, 54, 55 are molded as a single body, enabling the structure of the movable housing 30 to be simplified.

Moreover, in the present exemplary embodiment as illustrated in FIG. 9, the one-side contact portions 45, 55 include the first contact tabs 45*a*, 55*a* that contact the connection target 11, and the second contact tabs 45*b*, 55*b* that contact the connection target 11 further toward the connection direction far side than the first contact tabs 45*a*, 55*a*. The first contact tabs 45*a*, 55*a* accordingly perform removal of foreign matter adhered to the connection target 11, enabling the second contact tabs 45*b*, 55*b* to be brought into contact with portions of the connection target 11 from which foreign matter has been removed.

Furthermore, a displacement amount (displacement amount in a direction perpendicular to the connection direction) of the contact points (first contact points 45*a*1, 55*a*1) of the first contact tabs 45*a*, 55*a* when the connection target 11 has been connected is configured so as to be greater than the displacement amount at the contact points of the second contact tabs 45*b*, 55*b* (the second contact points 45*b*1, 55*b*1). The contact pressure of the first contact tabs 45*a*, 55*a* against the connection target 11 is accordingly higher, raising the ability to abrade and remove foreign matter (a so-called wiping ability).

However, adopting a configuration such as described above means that the contact points of the second contact tabs 45*b*, 55*b* are covered by the first contact tabs 45*a*, 55*a* when viewed from the connection direction near side (front side), resulting in an issue that the height of the contact points of the second contact tabs 45*b*, 55*b* becomes difficult to inspect.

To address this, in the present exemplary embodiment the height of the contact points of the second contact tabs 45*b*, 55*b* can be inspected when the terminal 40, 50 unit (or the terminals 40, 50 retained in the movable housing 30) is viewed from the connection direction far side (rear side).

Figure 34:
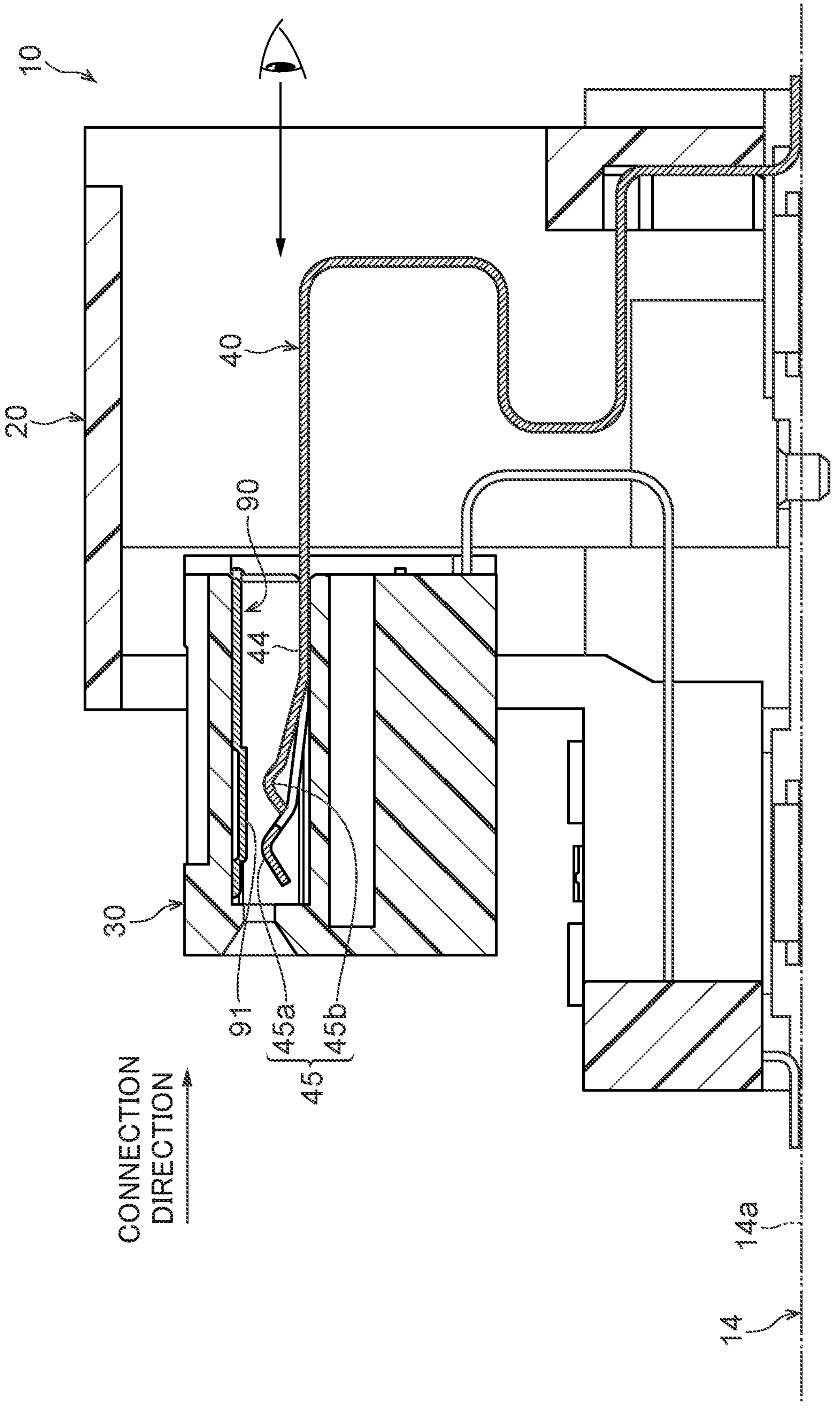
FIG. 34 is a cross-portion illustrating a modified example in which a rear wall of a fixed housing has been omitted.

Note that in a complete state of the inner connector 10 of the present exemplary embodiment, the rear wall 26 of the fixed housing 20 gets in the way when the inner connector 10 is viewed from the rear side, and such inspection is not able to be made (see FIG. 7 and FIG. 8). Part or all of the rear wall 26 of the fixed housing 20 may accordingly be omitted so as to enable such inspection to be performed in the complete state of the inner connector 10 (see FIG. 34).

Figure 35:
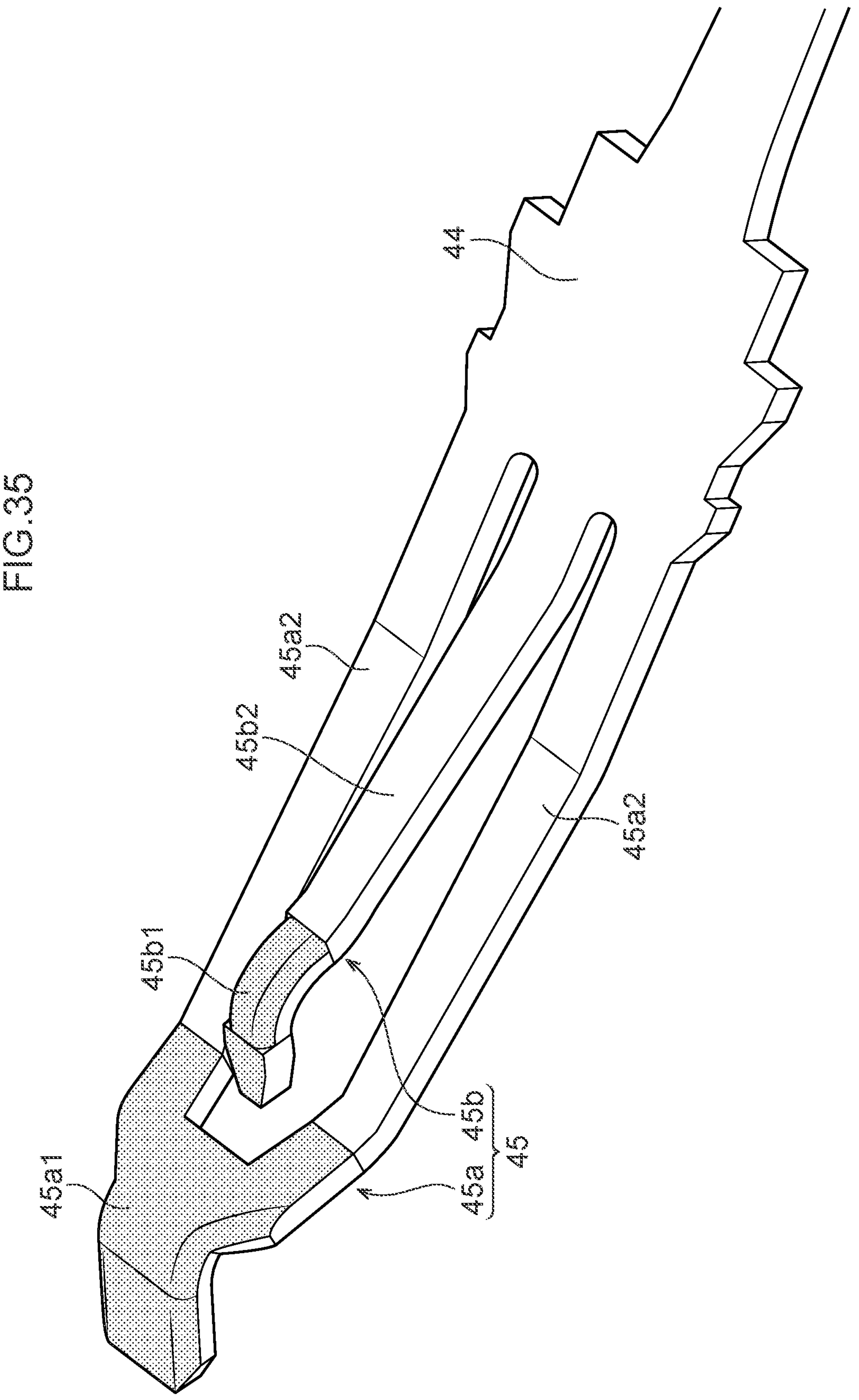
FIG. 35 is a diagram illustrating positions of plating processing on contact portions of a terminal of an inner connector.

Moreover, in the present exemplary embodiment a contact metal layer may be formed by plating on the one-side contact portions 45, 55. FIG. 35 is a diagram illustrating an example of positions where a contact metal layer is formed on the contact portion 45. Forming an appropriate contact metal layer enables the reliability of connection between the one-side contact portions 45, 55 and the connection target 11 to be raised. The contact metal layer is, as illustrated in FIG. 35, formed only at locations in the vicinity of where contact is made with the relay terminals 60, 70, and this is preferable from the perspective of saving plating solution.

However, suppose that the terminals 40, 50 and the add members 90 were formed as one body, then the add members 90 would be in the way when forming the contact metal layer on the one-side contact portions 45, 55, making it difficult to adhere the plating solution to appropriate positions.

However, the terminals 40, 50 and the add members 90 are separate bodies in the present exemplary embodiment, and so the add members 90 are not in the way when forming the contact metal layer on the one-side contact portions 45, 55, facilitating adhering plating solution to appropriate positions. As a result thereof, the amount of metal (for example, gold, palladium, silver, tin) employed in the contact metal layer can be suppressed, enabling the inner connector 10 to be manufacture cheaply.

Moreover, the contact metal layer may include tin or a tin alloy. In such cases too, the tin or tin alloy is preferably not adhered to the portions of the add members 90 retained by the movable housing 30 (the press-fit projections 92, 93). This prevents whisker generation.

Suppose the terminal 40, 50 and the add members 90 were formed as a single body, then there would be a possibility that the plating solution also adheres to the press-fit projections 92, 93 of the add members 90 when forming the contact metal layer on the one-side contact portions 45, 55. However, due to the terminal 40, 50 and the add members 90 being separate bodies, the plating solution is prevented from inadvertently adhering to the add members 90.

Moreover, in the present exemplary embodiment the base metal of the add members 90 is a stainless steel, and preferably the add members 90 do not include a plating layer. Stainless steel is resistant to corrosion even without the trouble and cost incurred with plating, and is also moreover comparatively cheap.

Moreover, due to the add members 90 not being electrically connected to the mounting target 14, such a structure therefor can be omitted, enabling the inner connector 10 to be made more compact.

Second Perspective

Next, description follows regarding the operation and advantageous effects of the present exemplary embodiment, from a second perspective.

In the present exemplary embodiment the inner connector 10 includes the terminals 40, 50 with terminal-side contact portions 45, 55 for contacting the connection target 11, the add members 90 with the add-side contact portions 91 for contacting the connection target 11, and the housing 30 for retaining the terminal 40, 50 and the add members 90.

The add members 90 and the terminal 40, 50 are formed as separate bodies. Thus the inner connector 10 is suited to being manufactured with plural variations.

Namely, in the inner connector 10 according to the present exemplary embodiment, the terminals 40, 50 and the housing 30 are common components across every variation of the inner connector 10, and the add members 90 can be add members 90 that are designed separately for each of the variations of the inner connector 10. Thus the properties of the inner connector 10 can be changed by merely changing the add members 90 alone from out of the terminals 40, 50, the add members 90, and the housing 30 configuring the inner connector 10. For example, the properties of the inner connector 10 can be changed by merely changing the shape, the friction coefficient, or the like of the add-side contact portions 91 of the add members 90.

In particular, in the present exemplary embodiment the terminals 40, 50 include intermediate deforming portions 43, 53 and so the mold for manufacturing the terminals 40, 50 is liable to become complicated. Preparing the same number of complicated molds as the number of variations of connectors is not economically viable. To address this issue, in the present exemplary embodiment the terminals 40, 50 including the intermediate deforming portions 43, 53 are employed as common components across all the variations, and plural add members 90 lacking the intermediate deforming portions are prepared. This accordingly enables variation evolution for the inner connector 10 to be performed easily.

Moreover, in the manufacturing method according to the present exemplary embodiment the add members 90 may be selected from out of plural types of pre-designed add member 90 and retained in the housing 30.

In such cases an inner connector 10 satisfying demanded requirements can be manufactured at low cost merely by selecting the appropriate add members 90.

Moreover, in the present exemplary embodiment the terminal-side contact portions 45, 55 contact the connection target 11 from the one-side and the add-side contact portions 91 contact the connection target 11 from the other-side. In the manufacturing method according to the present exemplary embodiment, two or more types of the add member 90, 90A configured so as to have different opposing distances between the terminal-side contact portions 45, 55 and the add-side contact portions 91, 91A may be included in the plural types of add member 90.

In such cases the opposing distance between the terminal-side contact portions 45, 55 and the add-side contact portions 91, 91A can be changed to an appropriate distance merely by selecting the add members 90.

Moreover, in the present exemplary embodiment two or more types of the add members 90 with different friction coefficients for the add-side contact portions 91 may be included in the plural types of the add member 90.

In such cases the force required for connection of the connection target 11 can be set to an appropriate force merely by selecting the add members 90. Note that the friction coefficient of the add-side contact portions 91 can be changed, for example, by a specification (plating material or the like) for performing plating processing on the add-side contact portions 91.

Moreover, although in the present exemplary embodiment the plural types of add member 90 are configured such that the opposing distance between the terminal-side contact portions 45, 55 and the add-side contact portions 91 are the same, two or more types of add member having different friction coefficients for the add-side contact portions 91 may be included.

Such an approach enables the number of variations of the inner connector 10 to be increased without a greater number of variations in the shape of the add members 90.

Third Perspective

Next, description follows regarding the operation and advantageous effects of the present exemplary embodiment, from a third perspective.

In the present exemplary embodiment, as illustrated in FIG. 7 and FIG. 8, the inner connector 10 includes the fixed housing 20 for fixing to the mounting target 14, the movable housing 30 that is capable of displacing with respect to the mounting target 14, and the terminals 40, 50. The movable housing 30 is able to fit together with the connection target 11. The terminals 40, 50 include the connection portions 41, 51 for connecting to the mounting target 14, and the displacing portions 44, 45, 54, 55 that are displaceable with respect to the mounting target 14. The displacing portions 44, 45, 54, 55 are retained in the movable housing 30.

Moreover, the fixed housing 20 includes the displacement restricting portion 21. The displacement restricting portion 21 is provided at a position that abuts the connection target 11 when the connection target 11 has been displaced in the direction toward an installation face 14*a* (i.e. downward) in a state fitted together with the movable housing 30 or in a state partway through fitting together (see FIG. 29).

Thus excessive displacement of the movable housing 30 is suppressed as a result of excessive displacement of the connection target 11 being limited in the fitted together state or the state partway through fitting together.

The present exemplary embodiment enables leg portions such as those of related art to either be simplified, or such leg portions become unnecessary, due to excessive displacement of the movable housing 30 being limited by the displacement restricting portion 21, as stated above. This enables the resonance frequency to be raised in a right angle floating connector while also limiting excessive downward displacement of the movable housing.

In particular, in the present exemplary embodiment the terminals 40, 50 include the intermediate deforming portions 43, 53, and so plastic deformation of the intermediate deforming portions 43, 53 can be suppressed by limiting excessive displacement of the movable housing.

Moreover, in the present exemplary embodiment the fixed housing 20 includes the through-pass space 29 that is a space on the installation face side (lower side) with respect to the space in which the movable housing 30 is disposed and is a space through which the movable housing 30 is able to pass.

Figure 5:
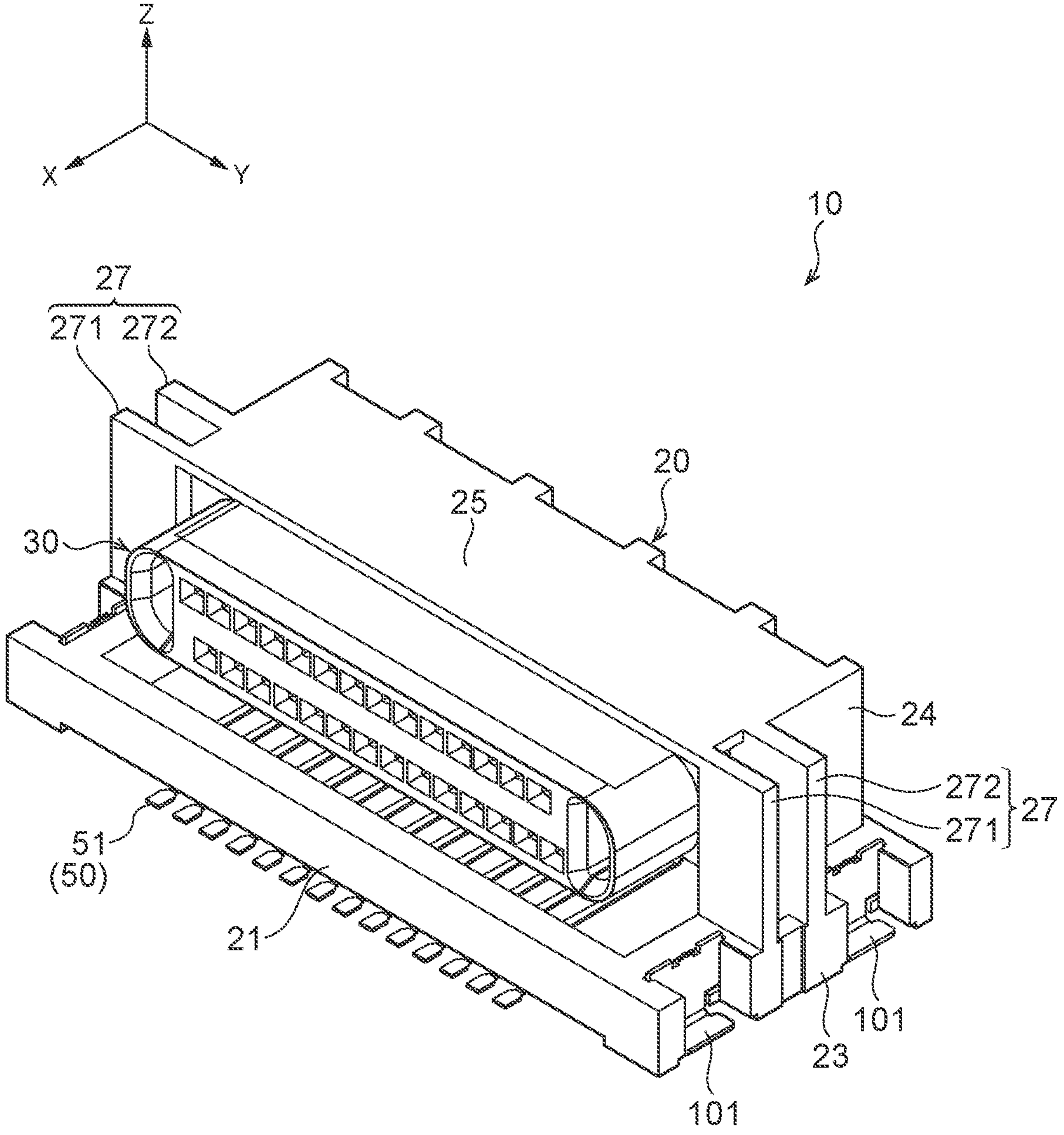
FIG. 5 is a perspective view of an inner connector.
Figure 6:
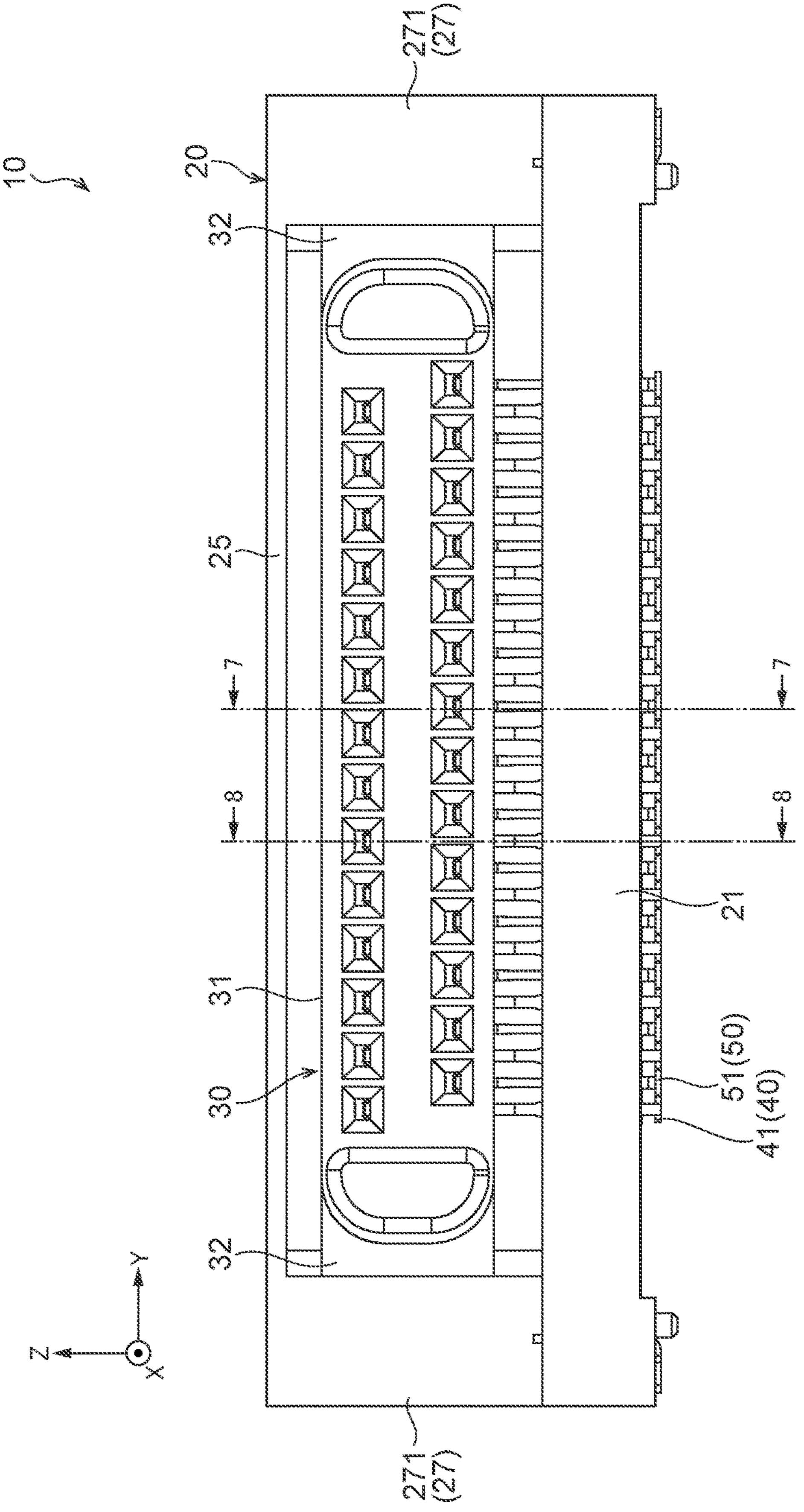
FIG. 6 is a front-face view of an inner connector.

Thus when manufacturing the inner connector 10, the movable housing 30 can be assembled to the fixed housing 20 from the lower side (see FIG. 4 and FIG. 5).

In the present exemplary embodiment, as illustrated in FIG. 7 and FIG. 8, the fixed housing 20 includes the upward limiting portion 25. The upward limiting portion 25 is a portion to limit the movement range of the movable housing 30 in the direction away from the installation face 14*a* (upward). There is accordingly no need to separately install the fixed housing 20 with a member to function as an upward limiting portion.

Moreover, in the present exemplary embodiment, as illustrated in FIG. 7, the lower terminals 50 include the fixed-side retained portions 52 retained in the fixed housing 20, with the displacement restricting portion 21 retaining the fixed-side retained portions 52 of the lower terminals 50.

The inner connector 10 can accordingly be made more compact compared to an embodiment in which the displacement restricting portion 21 is formed separately to the portion for retaining the fixed-side retained portions 52 of the lower terminals 50.

Moreover, in the present exemplary embodiment, as illustrated in FIG. 7 and FIG. 8, at least part of the intermediate deforming portions 43, 53 of the terminals 40, 50 (for example, the forward extending portion 431 and the rearward extending portion 531), is positioned in a direction perpendicular to the installation face 14*a* (the height direction) between the movable housing 30 and the installation face 14*a*.

A length is thereby able to be secured for the intermediate deforming portions 43, 53.

The relay connector 11 according to the present exemplary embodiment also includes the counterpart housing 80 and the counterpart terminals 60, 70 retained by the counterpart relay housing 80. The counterpart terminals 60, 70 include counterpart contact portions 61, 71 that project from the counterpart housing 80 and that are for contacting the contact portions 45, 55.

The counterpart housing 80 includes the adjacent support portion 85 (the terminal projection portion 85) that supports portions adjacent to counterpart contact portions 61, 71 of the terminals 40, 50. The adjacent support portion 85 includes a lower face 85*a* facing toward the installation face side.

Figure 29:
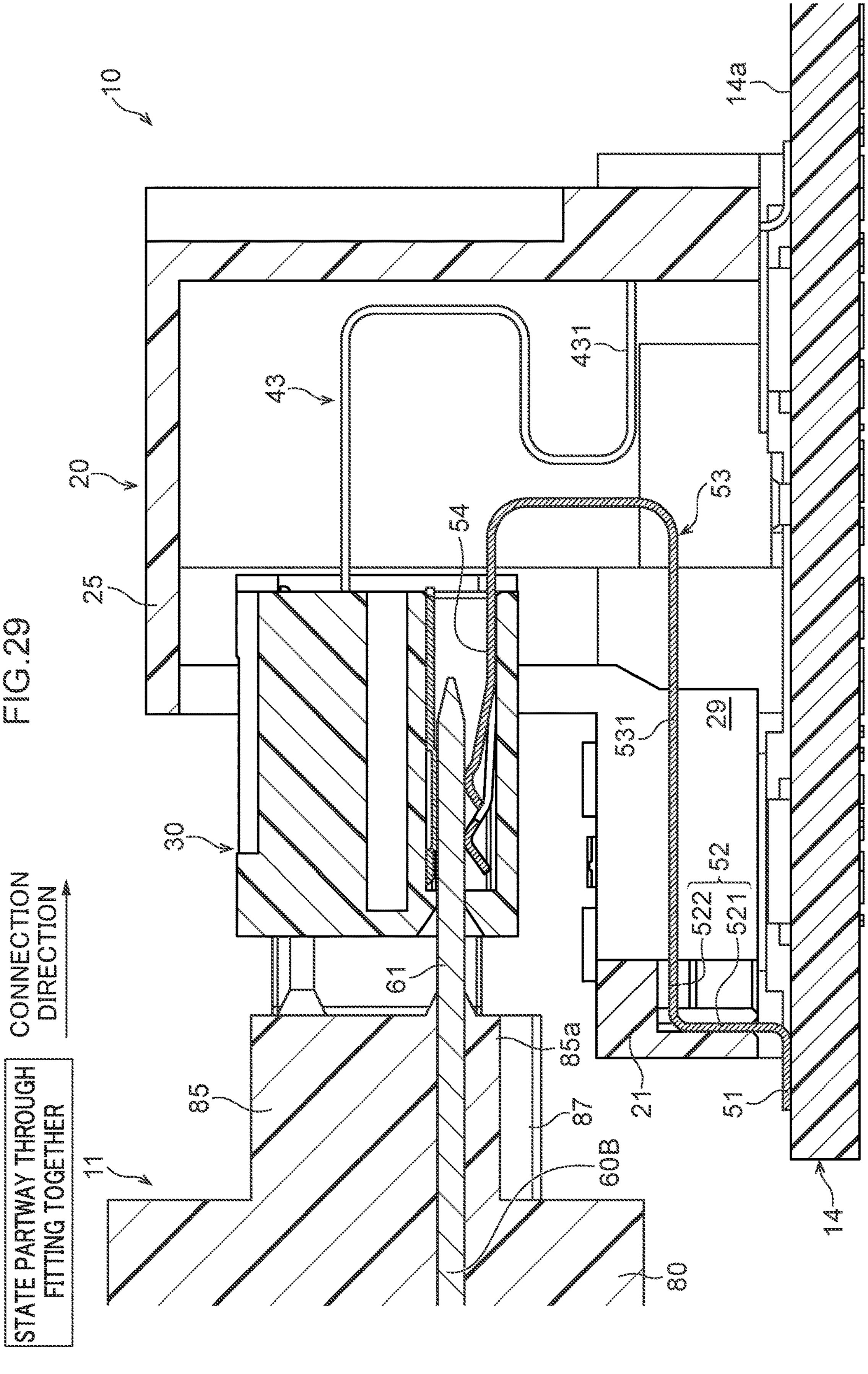
FIG. 29 is a cross-portion illustrating a state partway through fitting together.
Figure 30:
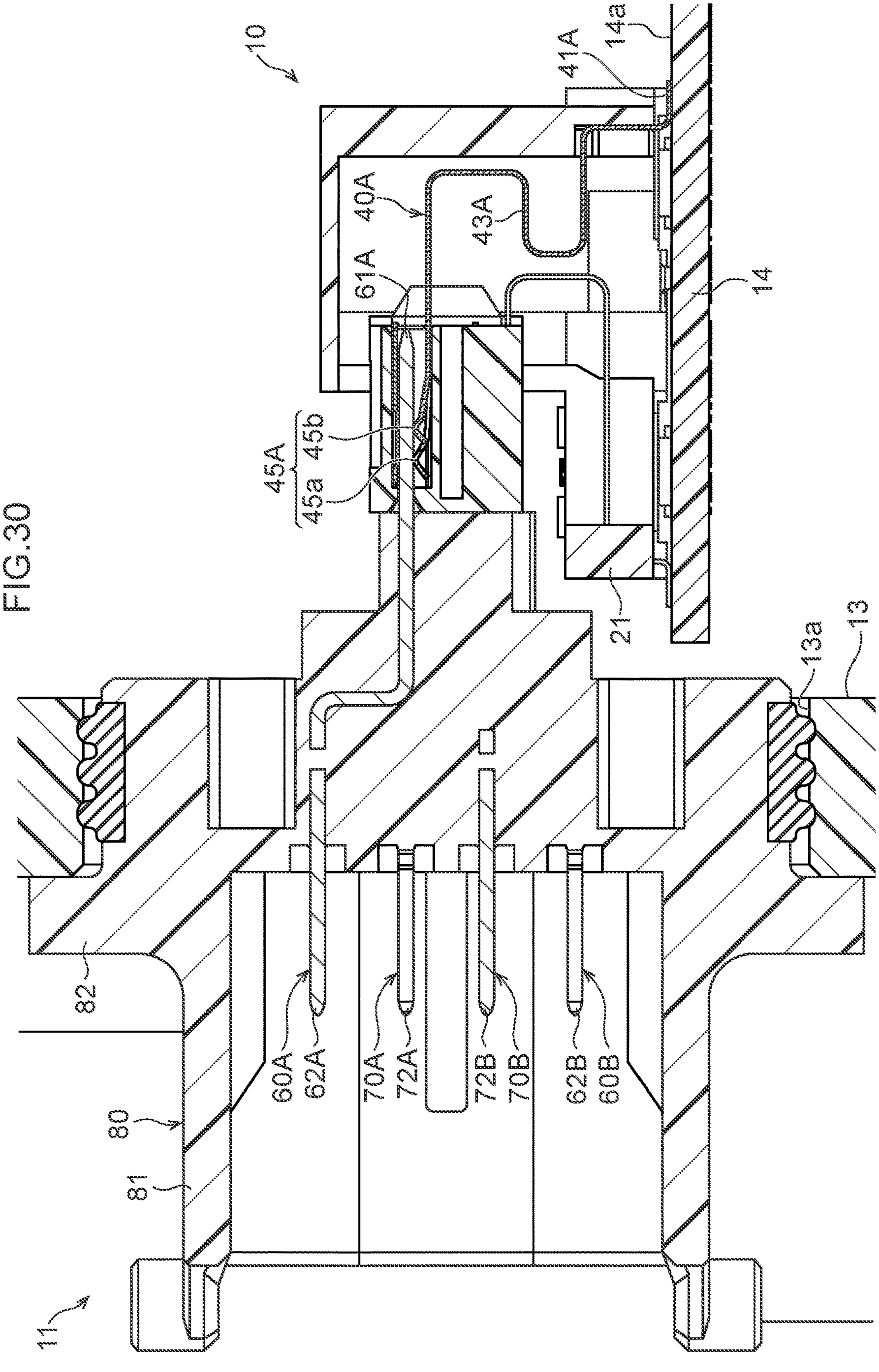
FIG. 30 is a cross-portion illustrating a fitted together state.
Figure 31:
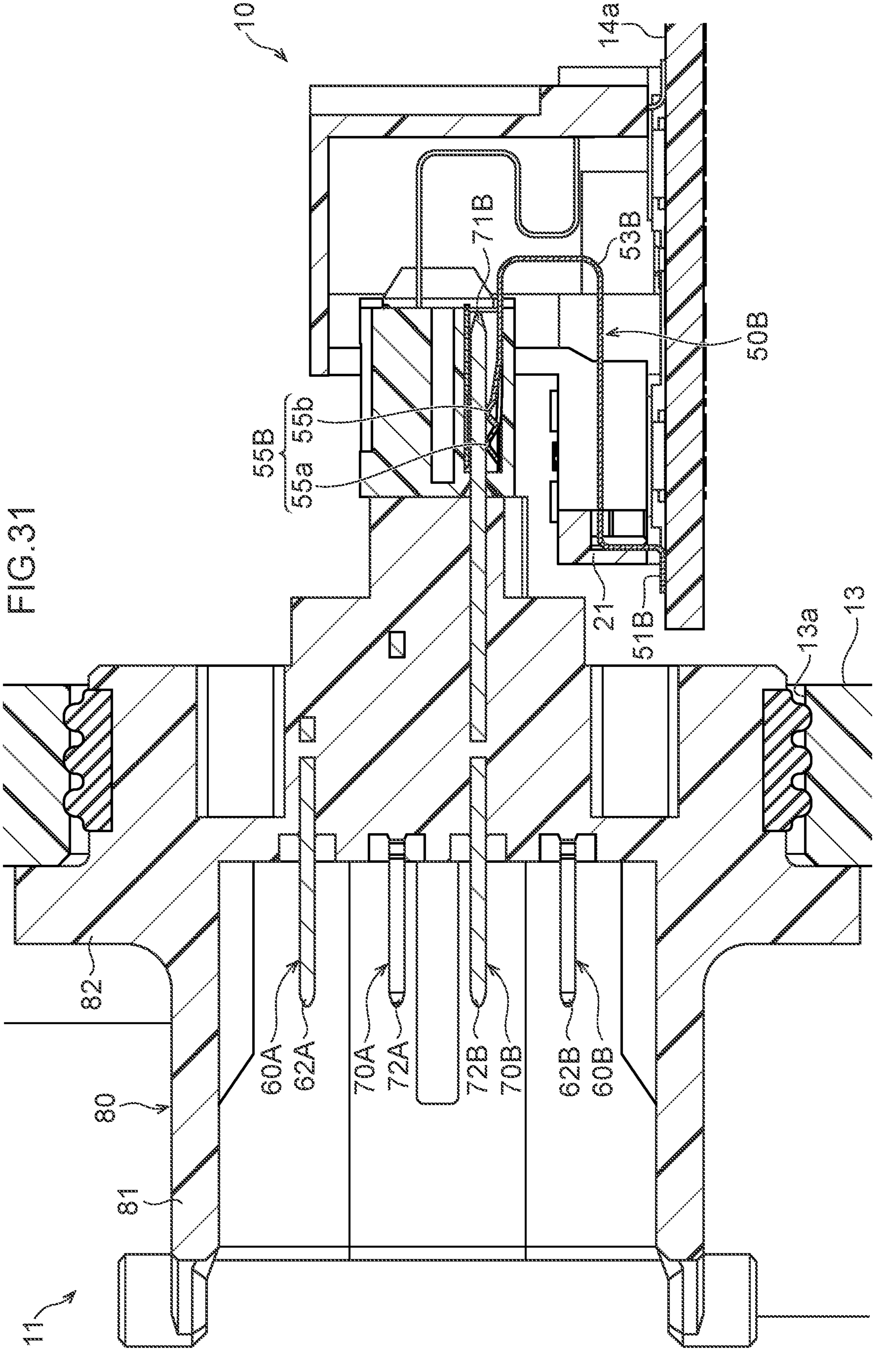
FIG. 31 is another cross-portion illustrating a fitted together state.
Figure 32:
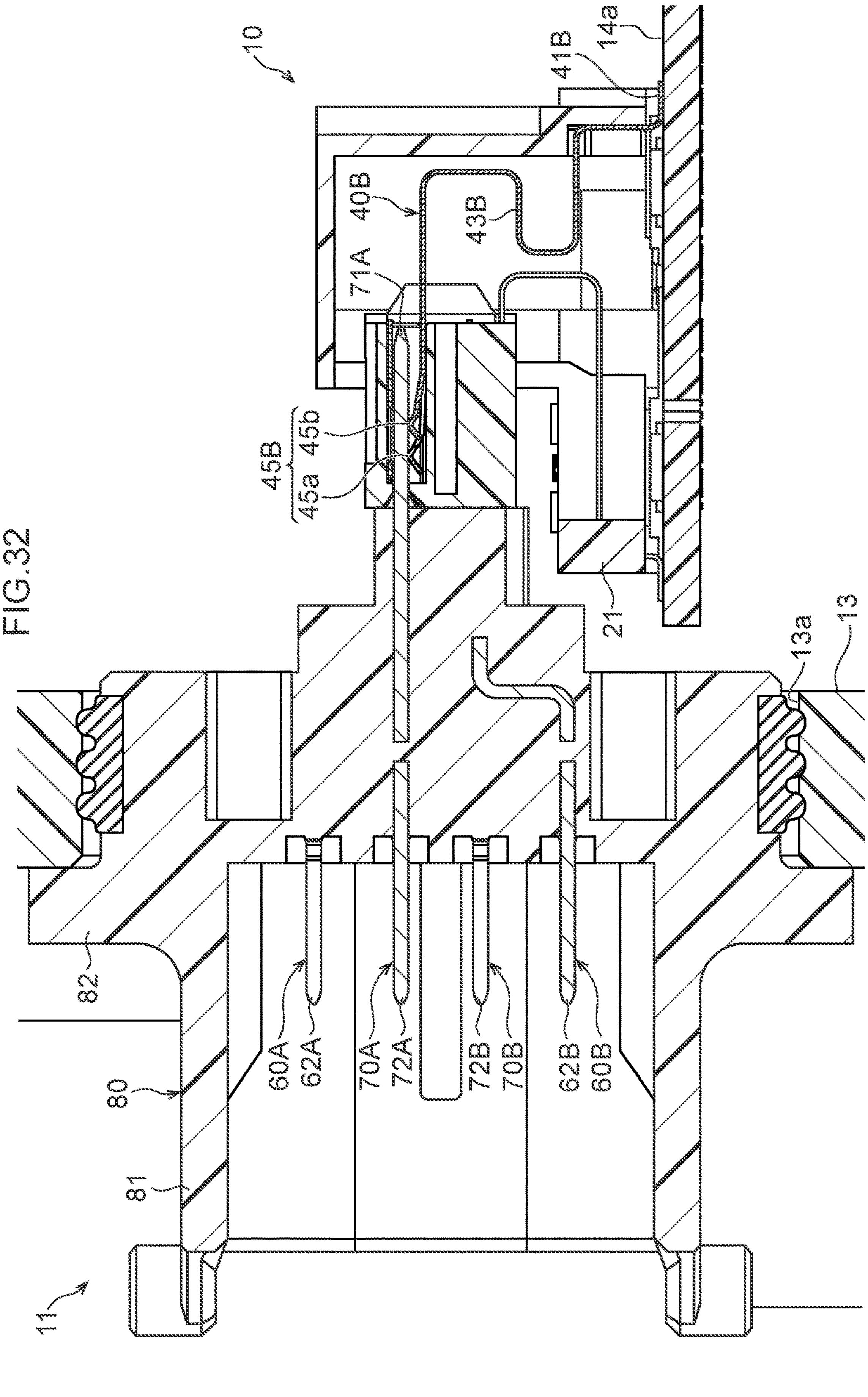
FIG. 32 is another cross-portion illustrating a fitted together state.
Figure 33:
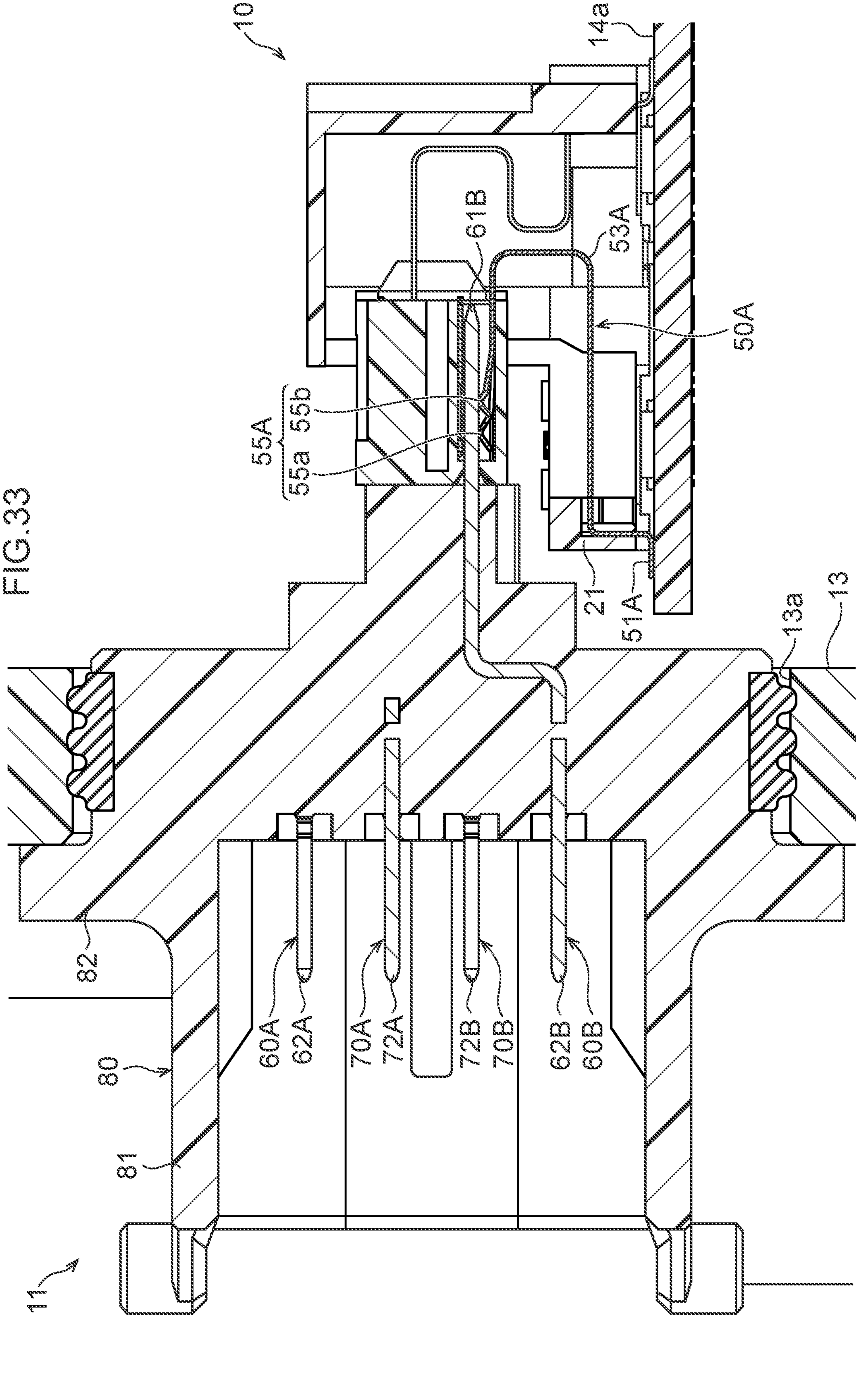
FIG. 33 is another cross-portion illustrating a fitted together state.

Furthermore, as illustrated in FIG. 21 and FIG. 29, the counterpart housing 80 includes the downward abutting protrusions 87 projecting toward the installation face side (lower side) from the lower face 85*a* of the adjacent support portion 85. The downward abutting protrusions 87 are provided at positions abutting the displacement restricting portion 21 when the relay connector 11 has been displaced in the direction toward the installation face 14*a* in a state fitted together with the movable housing 30 or in a state partway through fitting together.

Therefore, by providing the downward abutting protrusions 87, excessive displacement of the movable housing 30 can be suppressed while also making the relay connector 11 lighter in weight than an embodiment in which the adjacent support portion 85 is simply enlarged in up-down dimension and the lower face 85*a* of the terminal projection portion 85 is abutted against the displacement restricting portion 21 of the inner connector 10.

Fourth Perspective

Next description follows regarding the operation and advantageous effects of the present exemplary embodiment, from a fourth perspective.

In the present exemplary embodiment, as illustrated in FIG. 10 and FIG. 15 etc., the inner connector 10 includes the housing 20 and the terminals 40 press-fitted into the fixed housing 20 in a specific press-fit direction and retained thereby.

The upper terminals 40 include the first press-fit portions 421 formed to the first extending portion 401 extending along the press-fit direction, the displacing portions 44, 45 that are displaceable with respect to the first press-fit portions 421, and an intermediate portion 402, 422, 43 between the first extending portion 401 and the displacing portions 44, 45. The intermediate portion 402, 422, 43 includes the plural bent portions 402, 432, 434, 436, 438 that have been bent in the plate thickness direction.

The intermediate portion 402, 422, 43 includes the second extending portion 403 connected to the first extending portion 401 through the bent portion 402 and extending along a direction perpendicular to the press-fit direction. The second press-fit portion 422 is formed to the second extending portion 403.

The second press-fit portion 422 formed to the second extending portion 403 is accordingly retained in the fixed housing 20, and so deformation of the bent portion 402 is suppressed, and stress is suppressed from concentrating at the bent portion 402.

Moreover, in the present exemplary embodiment, the lower terminal 50 includes the first press-fit portion 521 formed to the first extending portion 501 extending along the press-fit direction, the displacing portions 54, 55 capable of displacing with respect to the first press-fit portion 521, and the intermediate portion 502, 522, 53 between the first extending portion 501 and the displacing portions 54, 55. The intermediate portion 502, 522, 53 includes the plural bent portions 502, 532, 534 that have been bent in the plate thickness direction.

The intermediate portion 502, 522, 53 includes the second extending portion 503 connected to the first extending portion 501 through the bent portion 502 and extending along a direction perpendicular to the press-fit direction. The second press-fit portion 522 is formed to the second extending portion 503.

Thus due to the second press-fit portion 522 formed to the second extending portion 503 being retained in the fixed housing 20, deformation of the bent portion 502 is suppressed, and stress is suppressed from concentrating at the bent portion 502.

In particular, in the present exemplary embodiment the bent portions 402, 502 are near to the first press-fit portions 421, 521, and so stress concentrating at the bent portions 402, 502 would be particularly liable to be an issue supposing, for example, the second press-fit portions 422, 522 were not formed.

Moreover, in the present exemplary embodiment, the parts of the second extending portions 403, 503 further to the displacing portion 44, 45, 54, 55 side than the second press-fit portions 422, 522 include the gradually reducing extending portions (the forward extending portion 431 and the rearward extending portion 531) formed so as to have a plate width that gradually reduces on progression away from the second press-fit portions 422, 522.

This enables the stress to be suppressed from concentrating at particular portions of the second extending portions 403, 503.

Moreover, in the present exemplary embodiment, the second press-fit portions 422, 522 are formed with plate widths larger than portions adjacent to the second press-fit portions 422, 522. The rate of change in plate width at the first press-fit portion 421, 521 side with respect to a position on the second press-fit portions 422, 522 where the plate width is at a maximum (see FIG. 16) is greater than the rate of change in plate width at the displacing portion 44, 45, 54, 55 side thereof. Note that the rate of change in plate width means the quantity of change in plate width with respect to distance toward the first press-fit portion 421, 521 side or toward the displacing portion 44, 45, 54, 55 side.

The position of the second press-fit portions 422, 522 can accordingly be set near to the bent portions 402, 502, enabling stress to be suppressed from concentrating at portions in close proximity to the second press-fit portions 422, 522 and on the displacing portions 44, 45, 54, 55 side thereof. When the position of the second press-fit portions 422, 522 can be set near to the bent portions 402, 502, this enables a long region (intermediate deforming portions 43, 53) to be secured where deformation is actually able to occur in the intermediate portions 402, 422, 43, 502, 522, 53.

Note that similar operation and advantageous effects to the operation and advantageous effects from the above fourth perspective described above are exhibited even in an embodiment in which the upper terminals 40 are not press-fitted into the fixed housing 20 in a specific press-fit direction and retained therein, but instead terminals are retained by being inserted molded into a housing. In such cases the first press-fit portions and the second press-fit portions described above may be respectively read as first retained portions and second retained portions etc.

Fifth Perspective

Next description follows regarding the operation and advantageous effects of the present exemplary embodiment, from a fifth perspective.

The connector set 10, 11 of the present exemplary embodiment includes the right angle type inner connector 10 mounted to the substrate 14 and disposed inside the case 13, and the relay connector 11 that is installed at the opening 13*a* of the case 13 and relays between the inner connector 10 and an external connection target (not illustrated in the drawings) external to the case 13.

The inner connector 10 includes first inner terminals 40A, second inner terminals 40B, third inner terminals 50A, and fourth inner terminals 50B. The relay connector 11 includes the first relay terminals 60A for connecting to the first inner terminals 40A, the second relay terminals 70A for connecting to the second inner terminals 40B, the third relay terminals 60B for connecting to the third inner terminals 50A, and the fourth relay terminals 70B for connecting to the fourth inner terminals 50B (see FIG. 22 to FIG. 28).

The first inner terminals 40A include first contact portions 45A for contacting the first relay terminals 60A, and the first connection portions 41A for connecting to the substrate 14.

The second inner terminals 40B include second contact portions 45B for contacting the second relay terminals 70A, and the second connection portions 41B for connecting to the substrate 14.

The third inner terminals 50A include third contact portions 55A for contacting the third relay terminals 60B, and the third connection portions 51A for connecting to the substrate 14.

The fourth inner terminals 50B include fourth contact portions 55B for contacting the fourth relay terminals 70B, and the fourth connection portions 51B for connecting to the substrate 14.

The first relay terminals 60A include the first inner-side contact portions 61A for contacting the first inner terminals 40A, and the first external-side contact portions 62A for contacting the external connection target.

The second relay terminals 70A include the second inner-side contact portions 71A for contacting the second inner terminals 40B, and the second external-side contact portions 72A for contacting the external connection target.

The third relay terminals 60B include the third inner-side contact portions 61B for contacting the third inner terminals 50A, and the third external-side contact portions 62B for contacting the external connection target.

The fourth relay terminals 70B include the fourth inner-side contact portions 71B for contacting the fourth inner terminals 50B, and the fourth external-side contact portions 72B for contacting the external connection target.

The first external-side contact portions 62A, the second external-side contact portions 72A, the third external-side contact portions 62B, and the fourth external-side contact portions 72B are disposed at different positions in a direction perpendicular to the substrate (the up-down direction). The first inner-side contact portions 61A and the second inner-side contact portions 71A are disposed at the same position in the substrate perpendicular direction, and the third inner-side contact portions 61B and the fourth inner-side contact portions 71B are disposed at the same position in the substrate perpendicular direction.

Thus due to making the distance from the substrate 14 of the first contact portions 45A the same as the distance from the substrate 14 of the second contact portions 45B, the shape of the first inner terminals 40A can be made the same as the shape of the second inner terminals 40B, or can be made a similar shape if not the same shape. As a result thereof the design cost of the inner connector 10 can be reduced.

Moreover, due to making the distance from the substrate 14 of the third contact portions 55A the same as the distance from the substrate 14 of the fourth contact portions 55B, the shape of the third inner terminals 50A can be made the same as the shape of the fourth inner terminals 50B, or can be made a similar shape if not the same shape. As a result thereof the design cost of the inner connector 10 can be reduced.

Moreover, in the present exemplary embodiment the first inner terminals 40A include the first intermediate deforming portions 43A that are positioned between the first contact portions 45A and the first connection portions 41A and that by deforming permit displacement of the first contact portions 45A with respect to the first connection portions 41A. The second inner terminals 40B include the second intermediate deforming portions 43B that are positioned between the second contact portions 45B and the second connection portions 41B and that by deforming permit displacement of the second contact portions 45B with respect to the second connection portions 41B.

The first contact portions 45A and the second contact portions 45B are thereby able to displace with respect to the substrate 14, and are able to accommodate any positional misalignment between the substrate 14 and the relay connector 11 and any positional misalignment between the inner connector 10 and the relay connector 11.

Moreover, the inner terminals 40 include the intermediate deforming portions 43, and so the design of the inner terminals 40 is particularly complicated. This means that this would increase the design cost greatly supposing there were to be an increase in the number of shape types for the inner terminals 40. In particular, consider a case in which the inner connector 10 is employed in an environment in which a strong vibration is imparted thereto over a prolonged period of time such as in onboard equipment, this issue would be significant in such a case due to demands for the intermediate deforming portions 43 to be given a high ability to maintain performance in such an environment.

In particular, in the present exemplary embodiment the first intermediate deforming portions 43A and the second intermediate deforming portions 43B have the same shape as each other. This accordingly reduces the design cost.

Note that the above statement not only applies to the inner terminals 40, but also applies to the inner terminals 50.

Moreover, in the present exemplary embodiment the plural first external-side contact portions 62A and the plural fourth external-side contact portions 72B are disposed at the same position as each other in the array direction (the width direction), and the plural second external-side contact portions 72A and the plural third external-side contact portions 62B are disposed at the same position as each other in the array direction. The first inner-side contact portions 61A, the second inner-side contact portions 71A, the third inner-side contact portions 61B, and the fourth inner-side contact portions 71B are disposed at different positions in the array direction.

This enables the positions of the first contact portions 45A, the second contact portions 45B, the third contact portions 55A, and the fourth contact portions 55B of the inner connector 10 to be disposed at different respective positions in the array direction.

In particular, in the present exemplary embodiment, by disposing the first contact portions 45A, the second contact portions 45B, the third contact portions 55A, and the fourth contact portions 55B at different respective positions in the array direction, the contact portions 55 of the third inner terminals 50A and the fourth inner terminals 50B are not obscured by the intermediate deforming portions 43 of the first inner terminals 40A and the second inner terminals 40B when viewed from the connector direction side.

The present disclosure has been described by way of exemplary embodiments, however obviously configurations of the connector, counterpart connector, the connector set and the like of the present disclosure are not limited to the configurations of the above exemplary embodiments.

EXPLANATION OF THE REFERENCE NUMERALS

- 10, 11 connector set
- 10 inner connector (connector)
- 11 relay connector (connection target)
- 13 case
- 13*a* opening
- 14 substrate (mounting target)
- 14*a* installation face
- 20 fixed housing (housing)
- 21 front frame portion (displacement restricting portion, lower terminal retaining portion)
- 22 rear frame portion (upper terminal retaining portion)
- 25 ceiling plate (upward limiting portion)
- 29 through-pass space
- 30 movable housing (housing)
- 40 upper terminal (inner terminal, terminal)
- 40A terminal for connecting to first relay terminal of upper terminal (first inner terminal)
- 40B terminal for connecting to second relay terminal of upper terminal (second inner terminal)
- 401 first extending portion
- 402, 422, 43 intermediate portion
- 402, 432, 434, 436, 438 plural bent portions
- 402 bent portion (first bent portion)
- 403 second extending portion

41 connection portion
41A first connection portion
41B second connection portion
42 fixed-side retained portion
421 first press-fit portion (first retained portion)
422 second press-fit portion (second retained portion)
43 intermediate deforming portion
43A first intermediate deforming portion
43B second intermediate deforming portion
431 forward extending portion (gradually reducing extending portion)
44, 45 displacing portion
45 contact portion (terminal-side contact portion, one-side contact portion)
45A first contact portion
45B second contact portion
45*a*, 55*a* first contact tab
45*b*, 55*b* second contact tab
50 lower terminal (inner terminal, terminal)
50A terminal for connecting to third relay terminal of lower terminal (third inner terminal)
50B terminal for connecting to fourth relay terminal of lower terminal (fourth inner terminal)
501 first extending portion
502 bent portion (first bent portion)
502, 522, 53 intermediate portion
502, 532, 534 plural bent portions
503 second extending portion
51 connection portion
52 fixed-side retained portion
521 first press-fit portion (first retained portion)
522 second press-fit portion (second retained portion)
53 intermediate deforming portion
531 rearward extending portion (gradually reducing extending portion)
54, 55 displacing portion
55 contact portion (terminal-side contact portion, one-side contact portion)
55A third contact portion
55B fourth contact portion
60A, 60B, 70A, 70B relay terminal (counterpart terminal)
60A first relay terminal
60B third relay terminal
61 leading-end-side narrow-width portion (inner-side contact portion)
61A inner-side contact portion of first relay terminal (first inner-side contact portion)
61B inner-side contact portion of third relay terminal (third inner-side contact portion)
62 leading-end-side portion (external-side contact portion)
62A first external-side contact portion
62B third external-side contact portion
70A second relay terminal
70B fourth relay terminal
71 leading-end-side narrow-width portion (inner-side contact portion)
71A inner-side contact portion of second relay terminal (second inner-side contact portion)
71B inner-side contact portion of fourth relay terminal (fourth inner-side contact portion)
72 leading-end-side portion (external-side contact portion)
72A external-side contact portion of second relay terminal (second external-side contact portion)
72B external-side contact portion of fourth relay terminal (fourth external-side contact portion)
80 relay housing (counterpart housing)
85 terminal projection portion (adjacent support portion)
85*a* lower face
87 downward abutting protrusion
90 add member
90A add member
91 bulge portion (add-side contact portion, other-side contact portion)
91A bulge portion (add-side contact portion, other-side contact portion)

The invention claimed is:

1. A connector set comprising:
a right-angle type inner connector for mounting to a substrate disposed inside a case, and
a relay connector for installing at an opening of the case to relay between the inner connector and an external connection target that is external to the case, wherein:
the inner connector includes a first inner terminal and a second inner terminal;
the relay connector includes a first relay terminal for connecting to the first inner terminal, and a second relay terminal for connecting to the second inner terminal;
the first inner terminal includes a first contact portion for contacting the first relay terminal, and a first connection portion for connecting to the substrate;
the second inner terminal includes a second contact portion for contacting the second relay terminal, and a second connection portion for connecting to the substrate;
the first relay terminal includes a first inner-side contact portion for contacting the first inner terminal, and a first external-side contact portion for contacting the external connection target;
the second relay terminal includes a second inner-side contact portion for contacting the second inner terminal, and a second external-side contact portion for contacting the external connection target;
the first external-side contact portion and the second external-side contact portion are disposed at different positions from each other in a substrate perpendicular direction that is a direction perpendicular to the substrate; and
the first inner-side contact portion and the second inner-side contact portion are disposed at a same position in the substrate perpendicular direction.

2. The connector set of claim 1, wherein:
the first inner terminal includes a first intermediate deforming portion that is positioned between the first contact portion and the first connection portion, and that, by deforming, permits displacement of the first contact portion with respect to the first connection portion; and
the second inner terminal includes a second intermediate deforming portion that is positioned between the second contact portion and the second connection portion, and that, by deforming, permits displacement of the second contact portion with respect to the second connection portion.

3. The connector set of claim 1, wherein:
the inner connector includes a third inner terminal and a fourth inner terminal;
the relay connector includes a third relay terminal for connecting to the third inner terminal, and a fourth relay terminal for connecting to the fourth inner terminal;

the third inner terminal includes a third contact portion for contacting the third relay terminal, and a third connection portion for connecting to the substrate;

the fourth inner terminal includes a fourth contact portion for contacting the fourth relay terminal, and a fourth connection portion for connecting to the substrate;

the third relay terminal includes a third inner-side contact portion for contacting the third inner terminal, and a third external-side contact portion for contacting the external connection target;

the fourth relay terminal includes a fourth inner-side contact portion for contacting the fourth inner terminal and a fourth external-side contact portion for contacting the external connection target;

the first external-side contact portion, the second external-side contact portion, the third external-side contact portion, and the fourth external-side contact portion are arranged at different positions from each other in the substrate perpendicular direction;

the first inner-side contact portion and the second inner-side contact portion are arranged at a same position in the substrate perpendicular direction; and the third inner-side contact portion and the fourth inner-side contact portion are arranged at a same position in the substrate perpendicular direction.

4. The connector set of claim 3, wherein:

the first external-side contact portion and the fourth external-side contact portion are arranged at a same position in an array direction that is a direction perpendicular to the substrate perpendicular direction;

the second external-side contact portion and the third external-side contact portion are arranged at a same position in the array direction; and the first inner-side contact portion, the second inner-side contact portion, the third inner-side contact portion, and the fourth inner-side contact portion are arranged at different positions from each other in the array direction.

5. The connector set of claim 1, wherein:

the shape of the first inner terminal and the shape of the second inner terminal are the same shape.

6. The connector set of claim 2, wherein:

the first contact portion includes a contact tab for resiliently contacting the first relay terminal; and the second contact portion includes a contact tab for resiliently contacting the second relay terminal.

* * * * *